US012604348B2

(12) United States Patent
Chitrakar et al.

(10) Patent No.: US 12,604,348 B2
(45) Date of Patent: Apr. 14, 2026

(54) COMMUNICATION APPARATUS AND COMMUNICATION METHOD FOR MULTI-LINK PEER TO PEER COMMUNICATION

(71) Applicant: Panasonic Intellectual Property Corporation of America, Torrance, CA (US)

(72) Inventors: Rojan Chitrakar, Singapore (SG); Yoshio Urabe, Nara (JP); Rajat Pushkarna, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 363 days.

(21) Appl. No.: 18/256,585

(22) PCT Filed: Mar. 10, 2021

(86) PCT No.: PCT/SG2021/050122
§ 371 (c)(1),
(2) Date: Jun. 8, 2023

(87) PCT Pub. No.: WO2022/124979
PCT Pub. Date: Jun. 16, 2022

(65) Prior Publication Data
US 2024/0040639 A1 Feb. 1, 2024

(30) Foreign Application Priority Data
Dec. 10, 2020 (SG) .......................... 10202012386U

(51) Int. Cl.
*H04W 76/12* (2018.01)
*H04W 48/16* (2009.01)

(52) U.S. Cl.
CPC ........... *H04W 76/12* (2018.02); *H04W 48/16* (2013.01)

(58) Field of Classification Search
None
See application file for complete search history.

(56) References Cited

U.S. PATENT DOCUMENTS

| | | | |
|---|---|---|---|
| 12,284,702 B2 * | 4/2025 | Jang ...................... | H04W 76/15 |
| 2012/0151089 A1 * | 6/2012 | Ponmudi .............. | H04W 76/14 |
| | | | 709/237 |

(Continued)

FOREIGN PATENT DOCUMENTS

| | | | | |
|---|---|---|---|---|
| WO | WO 2014152853 A2 | 9/2014 | | |
| WO | WO-2024023041 A1 * | 2/2024 | ............ | H04W 76/14 |

OTHER PUBLICATIONS

International Search Report, mailed Jun. 18, 2021, for PCT Patent Application No. PCT/SG2021/050122. (5 pages).

(Continued)

*Primary Examiner* — German Viana Di Prisco

(74) *Attorney, Agent, or Firm* — Seed Intellectual Property Law Group LLP

(57) ABSTRACT

The present disclosure provides communication apparatuses and methods for multi-link peer-to-peer communication, the communication apparatus being a communication apparatus of a plurality of communication apparatuses affiliated with a first multi-link device (MLD), each of the plurality of communication apparatuses operating in a corresponding link of the first MLD, the communication apparatus comprising: circuitry, which in operation, generates a request frame, the request frame being one of a discovery request frame to discover a peer-to-peer communication capability of another communication apparatus, or a setup request frame to request setup of one or more direct links, the request frame carrying a multi-link (ML) indication identi- (Continued)

fying that the communication apparatus is affiliated with the first MLD; and a transmitter, which in operation, transmits the request frame in a link.

14 Claims, 35 Drawing Sheets

(56)                    References Cited

U.S. PATENT DOCUMENTS

| | | | |
|---|---|---|---|
| 2015/0373758 A1 | 12/2015 | Kim et al. | |
| 2021/0321243 A1 * | 10/2021 | Patil | H04W 48/10 |
| 2022/0039183 A1 * | 2/2022 | Chu | H04W 76/12 |
| 2022/0124857 A1 * | 4/2022 | Patil | H04W 76/14 |
| 2023/0119901 A1 * | 4/2023 | Viger | H04W 76/15 |
| | | | 370/329 |
| 2023/0224989 A1 * | 7/2023 | Kim | H04W 88/06 |
| | | | 370/329 |
| 2023/0413165 A1 * | 12/2023 | Kim | H04W 76/20 |
| 2023/0413368 A1 * | 12/2023 | Gan | G06F 21/64 |

OTHER PUBLICATIONS

Patil et al., "TDLS Handling in MLO," Qualcomm Inc., IEEE 802.11-20/1692r2, Oct. 12, 2020. (25 pages).
Communication pursuant to Article 94(3) EPC, dated Aug. 20, 2025, for European Patent Application No. 21903966.6. (5 pages).

* cited by examiner

AP link direct link

ANQP Request

ANQP Response

TDLS Discovery Request

TDLS Discovery Response

TDLS Discovery Request

AP link direct link

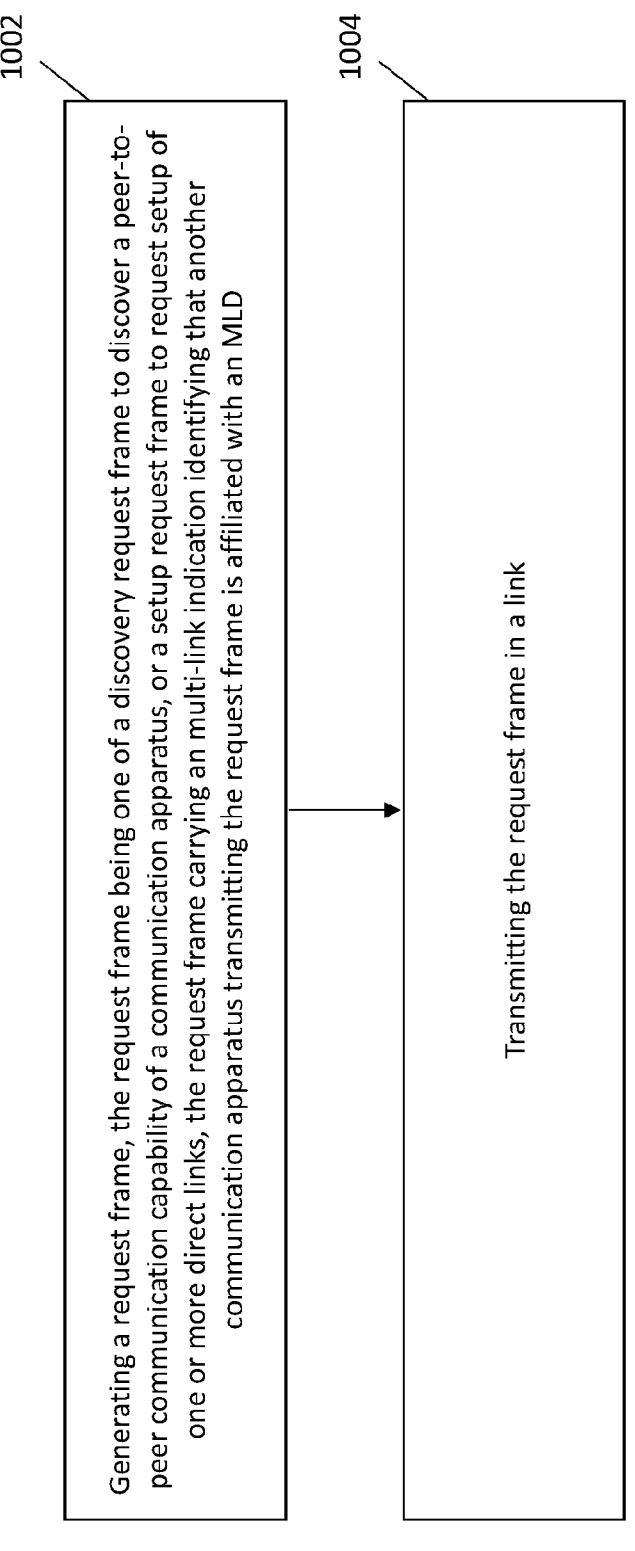

1002

Generating a request frame, the request frame being one of a discovery request frame to discover a peer-to-peer communication capability of a communication apparatus, or a setup request frame to request setup of one or more direct links, the request frame carrying an multi-link indication identifying that another communication apparatus transmitting the request frame is affiliated with an MLD

1004

Transmitting the request frame in a link

FTE element

| Element ID | Length | MIC Control | MIC | ANonce | SNonce |
|---|---|---|---|---|---|

2202

Link Identifier element

| Element ID | Length | BSSID | TDLS initiator STA Address | TDLS responder STA Address |
|---|---|---|---|---|

2222

Link Identifier element

| Element ID | Length | BSSID | TDLS initiator STA Address | TDLS responder STA Address | MLD Info |
|---|---|---|---|---|---|

| Number of Supported Links | MLD MAC |
|---|---|

COMMUNICATION APPARATUS AND COMMUNICATION METHOD FOR MULTI-LINK PEER TO PEER COMMUNICATION

BACKGROUND

1. Technical Field

The present embodiments generally relate to communication apparatuses, and more particularly relate to methods and apparatuses for multi-link peer to peer communication.

2. Description of the Related Art

In today's world, communication devices are expected to wirelessly operate with the same capabilities as wired computing devices. For example, a user expects to be able to seamlessly watch a high definition movie streamed to the user's wireless communication device. This presents challenges for communication devices as well as the access points to which the communication devices wirelessly connect.

The Institute of Electrical and Electronics Engineers (IEEE) 802.11 group has recently formed the 802.11 Task Group (TG) to address these challenges. Multi-link operation in the 2.4 GHz, 5 GHz and 6 GHz frequency bands has been identified as a key candidate technology for such communication. Multi-channel aggregation over multiple links is a natural way to create multi-fold increase in communication data throughput.

In order to enable such multi-link operations between an access point (AP) multi-link device (MLD) and a non-AP MLD, multi-link setup may be performed over one of the supported links to establish association for affiliated stations (STAs) in one or more links.

However, there has been no discussion so far concerning multi-link peer to peer communication between non-AP MLD STAs or between a non-AP MLD and a legacy STA.

There is thus a need for a communication apparatus and a communication method that can solve the above-mentioned issues. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for multi-link peer-to-peer communication.

In a first aspect, the present disclosure provides a communication apparatus of a plurality of communication apparatuses affiliated with a first multi-link device (MLD), each of the plurality of communication apparatuses operating in a corresponding link of the first MLD, the communication apparatus comprising: circuitry, which in operation, generates a request frame, the request frame being one of a discovery request frame to discover a peer-to-peer communication capability of another communication apparatus, or a setup request frame to request setup of one or more direct links, the request frame carrying a multi-link (ML) indication identifying that the communication apparatus is affiliated with the first MLD; and a transmitter, which in operation, transmits the request frame in a link.

In a second aspect, the present disclosure provides an access point (AP) of a plurality of APs affiliated with an AP MLD, each of the plurality of APs operating in a corresponding link of the AP MLD, the AP comprising: a receiver, which in operation, receives in a link, from an associated communication apparatus affiliated with an MLD, a Data frame with a Destination Address (DA) field set to another associated communication apparatus that is not affiliated with an MLD; circuitry, which in operation, sets a source address (SA) field of the Data frame as a MAC address of the associated communication apparatus; and a transmitter, which in operation, transmits the Data frame to the other associated communication apparatus.

In a third aspect, the present disclosure provides a communication method comprising: generating a request frame, the request frame being one of a discovery request frame to discover a peer-to-peer communication capability of a communication apparatus, or a setup request frame to request setup of one or more direct links, the request frame carrying an ML indication identifying that another communication apparatus transmitting the request frame is affiliated with an MLD; and transmitting the request frame in a link.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 10 shows a flow chart illustrating a communication method in accordance with the present disclosure.

FIG. 31 shows an example format of a Link Identifier Element included in TDLS Discovery Request frame as an ML indication.

Figure 1:
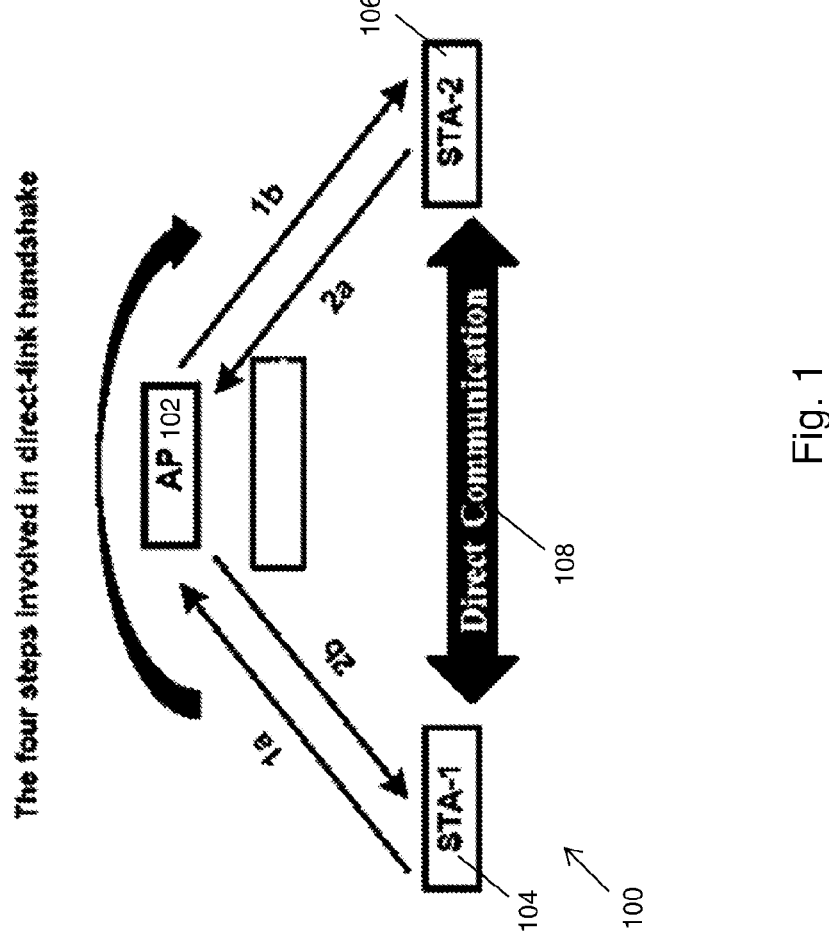
FIG. 1 depicts a tunneled direct-link setup between two non-AP (access point) stations (STAs) associated with an AP in a basic service set (BSS).

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

The following detailed description is merely exemplary in nature and is not intended to limit the embodiments or the application and uses of the embodiments. Furthermore, there is no intention to be bound by any theory presented in the preceding Background or this Detailed Description. Furthermore, other desirable features and characteristics will become apparent from the subsequent detailed description and the appended claims, taken in conjunction with the accompanying drawings and this background of the disclosure.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In various embodiments of the present disclosure, a multi-link device (MLD) may refer to a device that operates in two or more frequency bands or links (2.4 GHz, 5 GHz or 6 GHz). The MLD may comprise two or more communication apparatus corresponding to the two or more links, each operating in a specific frequency band or link. For the sake of simplicity, each link of an MLD shown in the present disclosure relates to one of many communication apparatuses affiliated with the MLD which is primarily configured to operate in a specific frequency band (2.4 GHz, 5 GHz or 6 GHz) to transmit/receive signals to/from another communication apparatus that is not affiliated with the MLD operating also in that specific frequency band.

In various embodiments of the present disclosure, a non-MLD STA may refer to a legacy (HE/VHT/HT) STA or EHT STA that is not affiliated with a non-AP MLD. Similarly, a non-MLD AP may refer to an EHT AP that is not affiliated with an AP MLD.

In various embodiments of the present disclosure, the term "L2 MAC address" refers to the MAC address of a transmitting/receiving STA or AP; whereas the term "MLD MAC address" refers to the MAC address that represents the MLD. For the sake of simplicity, a letter "M" may be appended to a device name (e.g. STA, AP or MLD) to denote as the MAC address of the device. For example, the MLD MAC addresses of an AP MLD and a non-AP MLD are denoted as "AP-MLD-M" and "STA-MLD-M" respectively. When there are two non-AP MLDs named under "non-AP MLD1" and "non-AP MLD2", their MLD MAC addresses will be denoted as "STA-MLD1-M" and "STA-MLD2-M" respectively. Similarly, the MAC addresses of an AP and a STA are denoted as "AP-M" and "STA-M" respectively. When there are two APs and two STAs named under "A-P1", "AP2", "STA1" and "STA2", their MAC addresses will be denoted as "AP1-M", "AP2-M", "STA1-M" and "STA2-M" respectively.

A similar denotation is applied to IP addresses in the present disclosure. In particular, letters "IP" are appended to a device name (e.g. STA, AP or MLD) to denote as the IP address of the device. For example, the IP addresses of an AP MLD and a non-AP MLD are denoted as "AP-MLD-IP" and "STA-MLD-IP" respectively. When there are two non-AP MLDs named under "non-AP MLD1" and "non-AP MLD2", their IP addresses will be denoted as "STA-MLD1-IP" and "STA-MLD2-IP" respectively. Similarly, the IP addresses of an AP and a STA (whether affiliated with an MLD or not) are denoted as "AP-IP" and "STA-IP" respectively. When there are two APs and two STAs named under "AP1", "AP2", "STA1" and "STA2", their IP addresses will be denoted as "AP1-IP", "AP2-IP", "STA1-IP" and "STA2-IP" respectively.

In various embodiments of the present disclosure, a data frame may be used and exchanged between STAs and APs to resolve ARP/ND queries. A data frame may comprise a Recipient Address (RA) field, a Transmitter Address (TA) field, a Destination Address (DA) field and/or a Source Address (SA) field. The RA field states the MAC address of the next immediate recipient the data frame is being sent to. The TA field states the MAC address of the immediate sender that transmits the data frame. The DA field states the MAC address of the destination of the data frame. The SA field states the MAC address of the original sender of the data frame.

To resolve an ARP query, the data frame may further carry an ARP message (ARP Request or ARP Reply) comprising a Source Hardware (Src. Hw.) field, a Source IP (Src. IP) field, a Target Hardware (Hw) field and a Target IP field. The Source Hardware field states the MAC address of the sender that transmits the message. The Source IP field states the IP address of the sender that transmits the message. The Target Hardware field states the MAC address of the recipient the message is being transmitted to. The Target IP field states the IP address of the recipient the message is being transmitted to.

Tunneled direct-link setup (TDLS) allows direct peer to peer communication between two non-AP STAs in 802.11 basic service set (BSS). FIG. 1 depicts a tunneled direct-link setup between two non-AP STAs, i.e. STA-1 104 and STA-2 106, associated with an AP 102 in a BSS 100. Arrows 1*a* and 1*b* depict transmission of first management frames such as TDLS Setup Request frames from STA-1 104 to STA-2 106 via AP path, and arrows 2*a* and 2*b* depict subsequent transmission of management frames such as TDLS Setup Response frame from STA-2 106 to STA-1 104 in response to the first management frames via AP path. All management frames involved in the setup of TDLS (except TDLS Discovery Response) are encapsulated within Data frames, so the setup of TDLS is completely transparent to the AP 102, regardless of whether the AP 102 is TDLS capable. Once TDLS is setup, the two TDLS peer STAs, i.e. STA-1 104 and STA-2 106, can communicate directly with each other via a direct path, as indicated by two-war arrow 108. The direct path may also be switched to a channel different from the operating channel of the BSS (base channel) and may even be on a different band. Such direct path channel is called "off channel".

Currently, APs do not have any control over TDLS setup/usage. However, in the 6 GHz band, client devices are permitted to operate in the 6 GHz band only while under the control of an AP. When operating in the 5 GHz dynamic frequency selection (DFS) band, a TDLS initiator STA acts as the DFS owner (DO); in the 6 GHZ band, however, TDLS STAs may not have such capability.

Enhanced direct link communication procedure that allows the AP more control over the direct link communication in specific bands/channels has been proposed. Without such enhancements, direct link such as TDLS may be disallowed in the 6 GHz band.

When operating in some sub-bands of the 6 GHz band (e.g. U-NII-5 and U-NII-7), the AP may be required to consult an AFC Database (Automatic Frequency Control Database) to determine permissible operating frequency and transmission parameters. Such APs may be known as AFC Database Dependent (ADD) enabling STAs while non-AP STAs associated with such APs may be known as ADD dependent STAs. Non-AP STAs may only communicate on channels on these sub-bands when "enabled" by the enabling STAs and such non-AP STAs may be said to be "under the control" of the AP. An AP may indicate its presence on a channel that requires enablement by periodically transmitting enabling signals on the channel, for example by including such enabling signals in the Beacon frames.

When two ADD dependent STAs negotiate a TDLS direct link on a base channel, they can use the same transmission parameters used for the AP link for transmissions on the TDLS direct link.

Figures 2A, 2B:
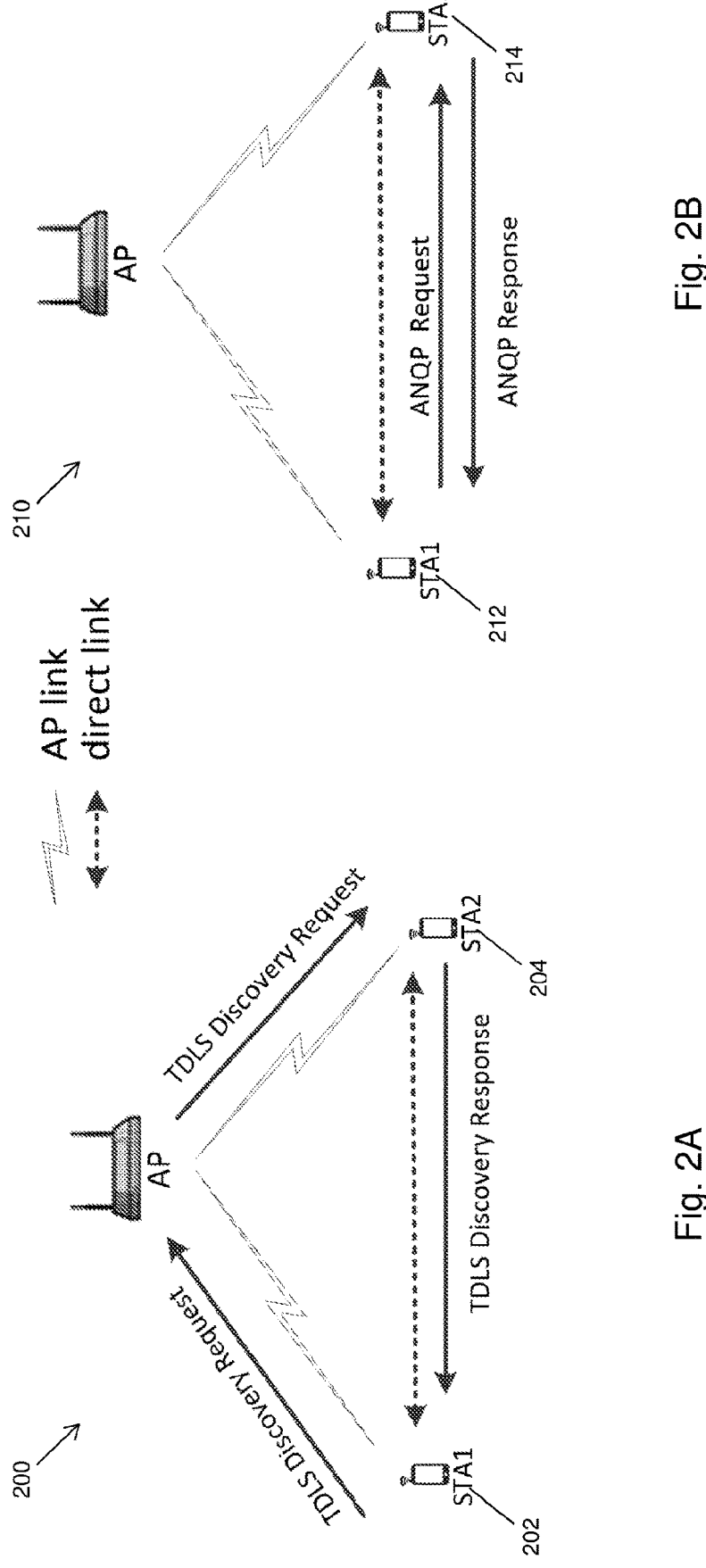
FIG. 2A depicts a method for TDLS discovery performed using Tunneled Direct Link Setup (TDLS) Discovery frames.
FIG. 2B depicts another method for TDLS discovery performed by exchanging Access Network Query Protocol (ANQP) Request/Response frames over the direct path between two STAs.

FIGS. 2A and 2B depict two schematic diagrams 200, 210 illustrating a method performed for TDLS discovery. FIG. 2A depicts a method for TDLS discovery performed using TDLS Discovery frames. In particular, TDLS Initiator STA, in this case STA1 202, transmits a TDLS Discovery Request frame via the AP path to another STA 204. If the other STA 204 supports TDLS, it transmits a TDLS Discovery Response frame via the direct path. FIG. 2B depicts another method for TDLS discovery performed by exchanging Access Network Query Protocol (ANQP) Request/Response frames (type of Group Address Generic Advertisement Service (GAS) Request/Response frames) over the direct path between STA1 212 and STA2 214. In particular, TDLS Initiator STA, in this case STA1 212, transmits an ANQP Request frame to another STA 214 via the direct path. If the other STA 214 supports TDLS, it transmits an ANQP Response frame via the direct path.

Figure 3:
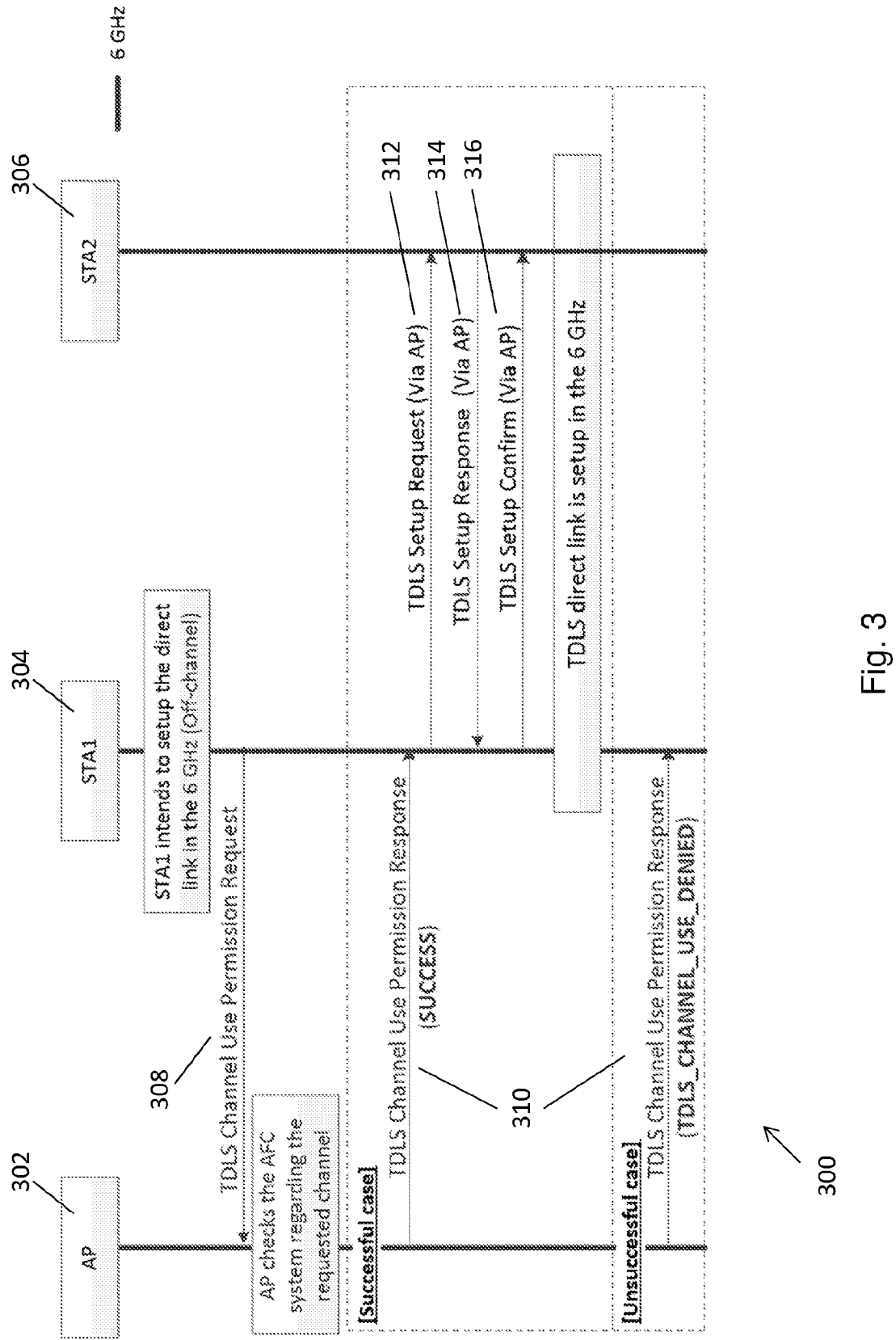
FIG. 3 depicts a flow diagram illustrating a TDLS setup in an off-channel in a 6 GHz band.

The issue of setting up a TDLS link in the 6 GHz band is addressed by a solution or method disclosed in Singapore application number 1020196255Q. In particular, FIG. 3 depicts a flow diagram 300 illustrating a TDLS setup in an off-channel in the 6 GHz band. AP 302 may be an ADD enabling STA. Non-AP STA 304 and non-AP STA 306 are associated with the AP 302 in a channel in the 6 GHz band. For various reasons, non-AP STA 304 and non-AP STA 306 may choose to communicate over a direct link in a channel that is different from the operating channel of the BSS. Due to regulatory requirements in the 6 GHz band, prior to any transmissions on a channel, it may be mandatory to ensure the availability of the channel from an AFC system. Non-AP STA 304, as a TDLS initiator STA, may seek permission from the AP 302 to use a different channel in the 6 GHz band for direct link communication with non-AP STA 306 by transmitting a TDLS Channel Use Permission Request frame 308 to the AP 302. The channel may for example be a channel in the U-NII-5 or the U-NII-7 sub-bands of the 6 GHz band that is different from the base channel in the 6 GHz band used for communication among the AP 302 and the STAs 304 and 306.

After receiving the TDLS Channel Use Permission Request frame 208 from the STA 204, the AP 202 checks the AFC Database (for example via the AFC system) regarding availability of the requested channel. In a successful case, the AP 202 may transmit a TDLS Channel Use Permission Response frame 210 with a status of SUCCESS to the STA 204 to indicate the requested channel is available for direct link communication. The STA 204 may then initiate the setting up of a direct link on the requested channel with the STA 204 by transmitting, via the AP 202, a TDLS Setup Request frame 212 to the STA 206. The STA 206 may then respond by transmitting, via the AP 202, a TDLS Setup Response frame 214 to the STA 204. Thereafter, the STA 204 transmits, via the AP 202, a TDLS Setup Confirm frame 216 to the STA 206, and the TDLS direct link is setup on the requested channel in the 6 GHz band. In an unsuccessful case where the requested channel is not available based on the AFC Database check, the AP 202 may transmit a TDLS Channel Use Permission Response frame 210 with an unsuccessful status (for example TDLS_CHANNEL_USE_DENIED) to the STA 204 to indicate that permission to use the requested channel for direct link communication is denied.

However, it is unclear how to discover and setup multi-link TDLS and direct link communications in the 6 GHz band in the context of MLDs.

Further, due to assumptions about how address resolution protocol (ARP) and neighbor discovery (ND) operations on MLDs, there are address mismatch issues during TDLS and TDLS direct link communication. According to an IEEE 802.11 submission (IEEE 802.11-2/1692r2) submission, to address the address mismatch issues during TDLS setup and TDLS direct path communication, the following solutions are proposed:

setting transmitter address (TA) field to non-AP MLD's MAC address for frames sent directly to a TDLS peer STA;

using MLD MAC addresses in the link identifier element; and using MLD MAC address during TDLS PeerKey (TPK) handshake.

Figure 4:
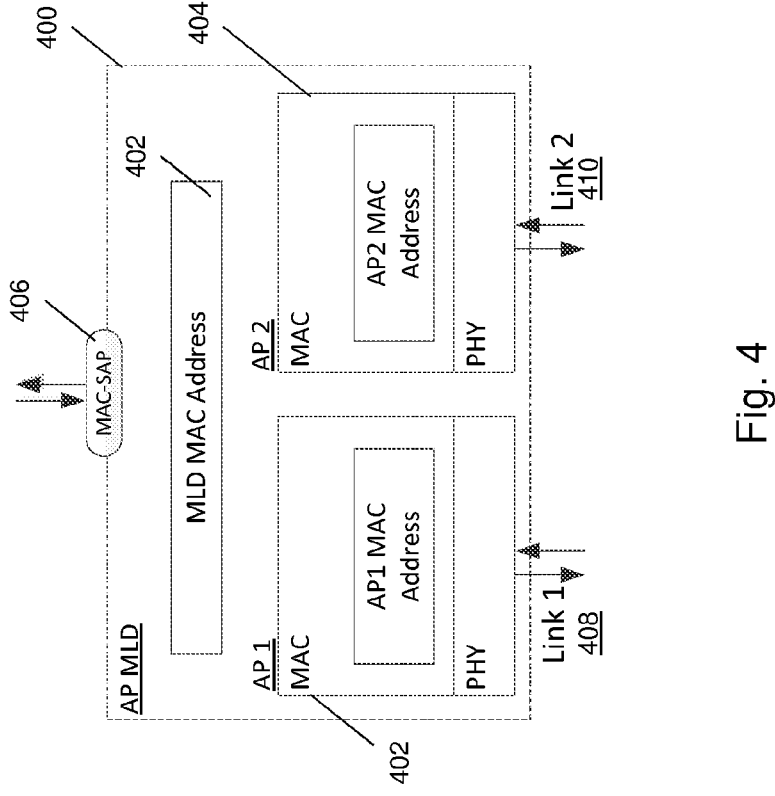
FIG. 4 shows a configuration of an Access Point (AP) multi-link device (MLD).

FIG. 4 shows a configuration of an MLD 400. According to 802.1 be document 0.3 (D0.3) specification, it is stated that a multi-link device (MLD) (e.g. AP MLD 400) is a device that has more than one affiliated AP (or STA) and has a single MAC SAP 406 to logical link control (LLC), which includes one MAC data service. The value of the address 2 (transmitted address (TA)) field in the MAC header of a frame sent over-the-air by an AP shall be the MAC address of the transmitting AP affiliated with the MLD 400 corresponding to that link (e.g. Link 1 408, Link 2 410) except the Individual/Group bit, which is set to 1 when the TA field value is a bandwidth signaling TA and otherwise set to 0. Similarly the value of Address 1 (recipient address (RA)) field in the MAC header of an individually addressed frame sent over-the-air to an AP shall be the MAC address of the receiving AP affiliated with the MLD corresponding to that link (e.g. Link 1 408, Link 2 410).

However, the above definition/addressing rules are for EHT MLDs. However, an EHT AP is also a high efficiency (HE)/very high throughput (VHT)/high throughput (HT) AP and needs to support legacy STAs (HE/VHT/HT STAs). Legacy STAs do not understand the concept of MLD MAC address. Instead, they will only be aware of the BSSID (i.e. L2 MAC address) of the AP with which they are associated. This may also be true for non-MLD EHT STAs that are EHT STAs not affiliated with an MLD.

Figure 5:
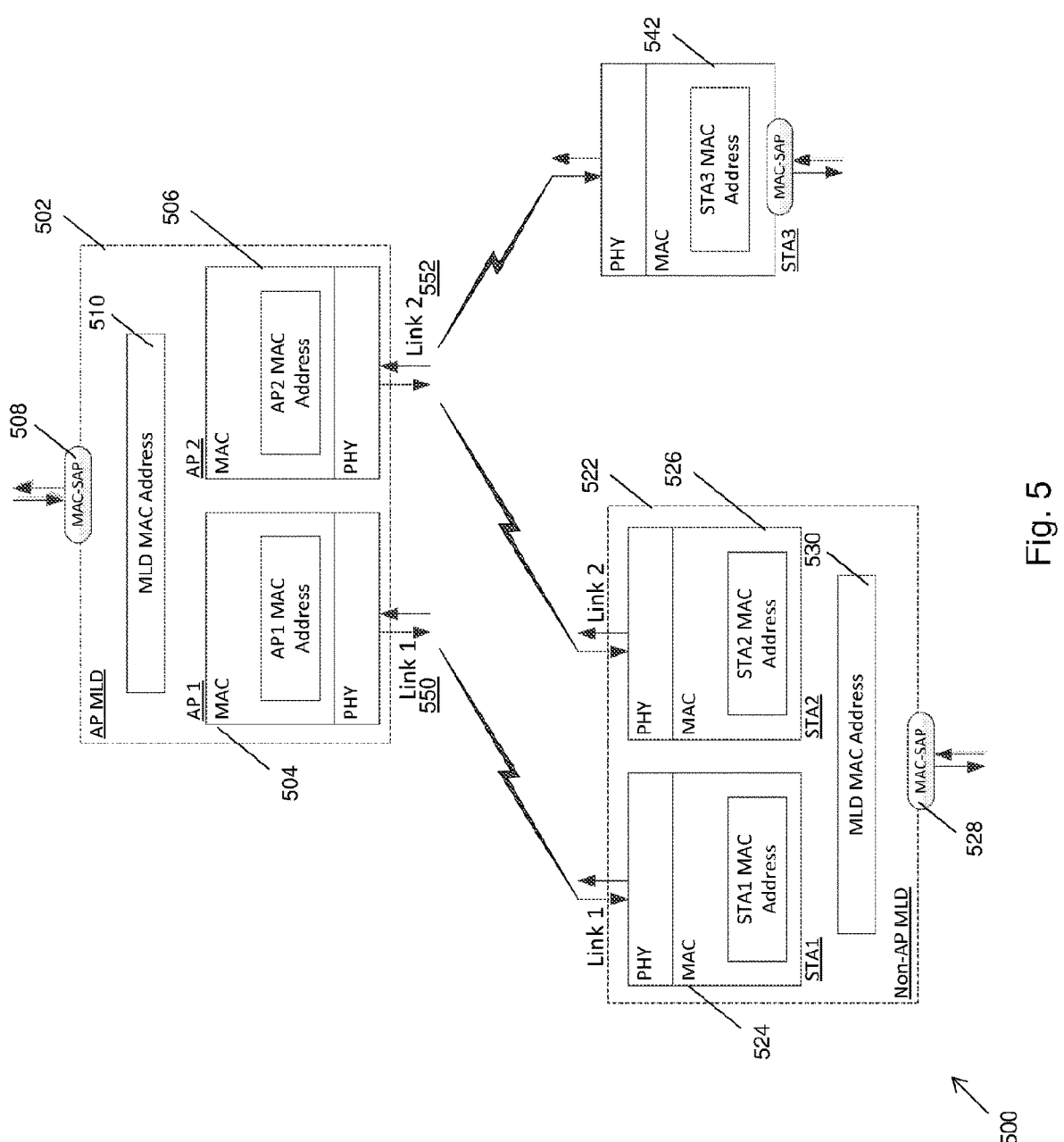
FIG. 5 shows a schematic diagram illustrating communications between APs affiliated with an AP-MLD and a non-MLD STA and STAs affiliated with a non-AP MLD.
Figures 6A, 6B, 6C, 6D:
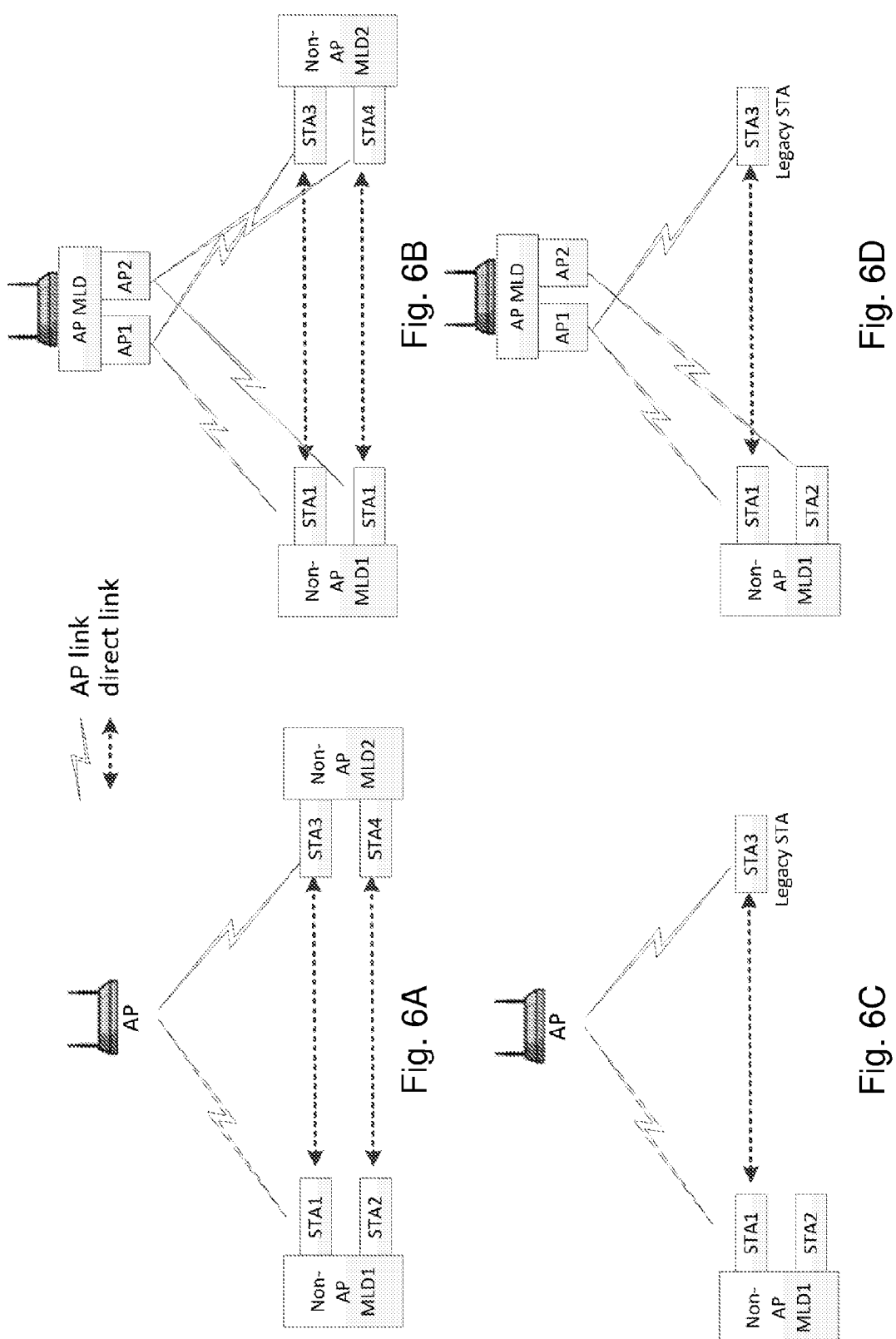
FIG. 6A depicts a schematic diagram illustrating communications between two non-AP MLDs associated with a non-MLD AP.
FIG. 6B depicts a schematic diagram illustrating communications between two non-AP MLDs associated with an AP MLD.
FIG. 6C depicts a schematic diagram illustrating communications between a non-AP MLD and a non-MLD STA associated with a non-MLD AP.
FIG. 6D depicts a schematic diagram illustrating communications between a non-AP MLD and a non-MLD STA associated with an AP MLD.

FIG. 5 shows a schematic diagram 500 illustrating communications between APs 504, 506 affiliated with an AP-MLD 502 and a non-MLD STA 542 and STAs 524, 526 affiliated with a non-AP MLD 522. Each MLD, i.e. AP MLD 502 or non-AP MLD 522, has a single MAC SAP 508, 528 respectively. If the MAC SAPs 508, 528 are tied to their respective MLD MAC addresses 510, 530, their IP addresses will be mapped to the MLD MAC addresses correspondingly. Here, it is assumed that the non-AP MLD 522 is associated with the AP MLD 502 and the non-MLD STA 542 is associated with the AP 506.

In other words, the APs 504, 506 of the AP MLD 502 may communicate with STAs 524, 526 of non-AP MLD 522 directly via Link 1 550 and Link 2 552 respectively, while AP2 506 may also communicate with a legacy STA 542 directly via Link 2 552.

It is unclear how to discover and setup multi-link TDLS between two non-AP MLDs, or between a non-AP MLD and a legacy STA when the non-AP MLD(s) and the legacy STA are associated with a legacy (pre-EHT) AP or an AP MLD.

Hence, there is thus a need for communication apparatuses and methods that provide feasible technical solutions for multi-link peer to peer communication to address one or more of the above challenges.

In various embodiments below, the communication apparatuses and methods illustrate the discovery and setup of multi-link peer to peer communication in the context of (a) two non-AP MLDs via an associated non-MLD AP, (b) two non-AP MLDs via an associated MLD AP, (c) a non-AP MLD and a non-MLD STA via an associated non-MLD AP and (d) a non-AP MLD and a non-MLD STA via an associated AP-MLD, as depicted in FIGS. 6A-6D respectively.

According to various embodiments below, an MLD discovers and sets up one or more direct links with another MLD or non-MLD STA by exchanging discovery and setup frames (e.g. TDLS Discovery Request/Response frames or ANQP Request/Response frames) over a single link. In one embodiment, A multi-link (ML) indication is included in a request frame (e.g. TDLS Discovery Request frame or ANQP Request frame) to identify a transmitting STA is affiliated with an MLD. In another embodiment, an ML element/field is included in a response frame (e.g. TDLS Discovery Response frame or ANQP Response frame) transmitted response to a request frame received from a STA of an MLD, the ML element/field carrying information about the MLD and information of at least one other link supported by the MLD. Yet in another embodiment, an ML element is included in a TDLS Setup Request/Response/Confirm frame carrying information of the one or more direct links to be setup between the two MLDs.

Also, in an embodiment, the 3-way TPK handshake protocol performed over the setup link is used to derive the security key (TPK) which is used for providing confidentiality and authentication of the frame exchanged over all the direct links.

According to various embodiments, all multi-link features (e.g. ML BlockAck, ML Retransmission, ML encapsulation/decapsulation etc., and ML Power Save) that are enabled between the non-AP MLDs and the AP MLD are also available in the direct links. TDLS Channel Switch protocol is repurposed for ML-TDLS Link Switching. Quiet time protocol (QTP) mechanism is enhanced to provide QTP for multiple direct links. Target wake time (TWT) mechanism is enhanced to provide TWT service periods (SPs) for one or more direct links. Essentially, one effect is that, by enabling communication over one or more direct links, the benefits of EHT Multi-Link features are extended to peer-to-peer communications.

Figure 7:
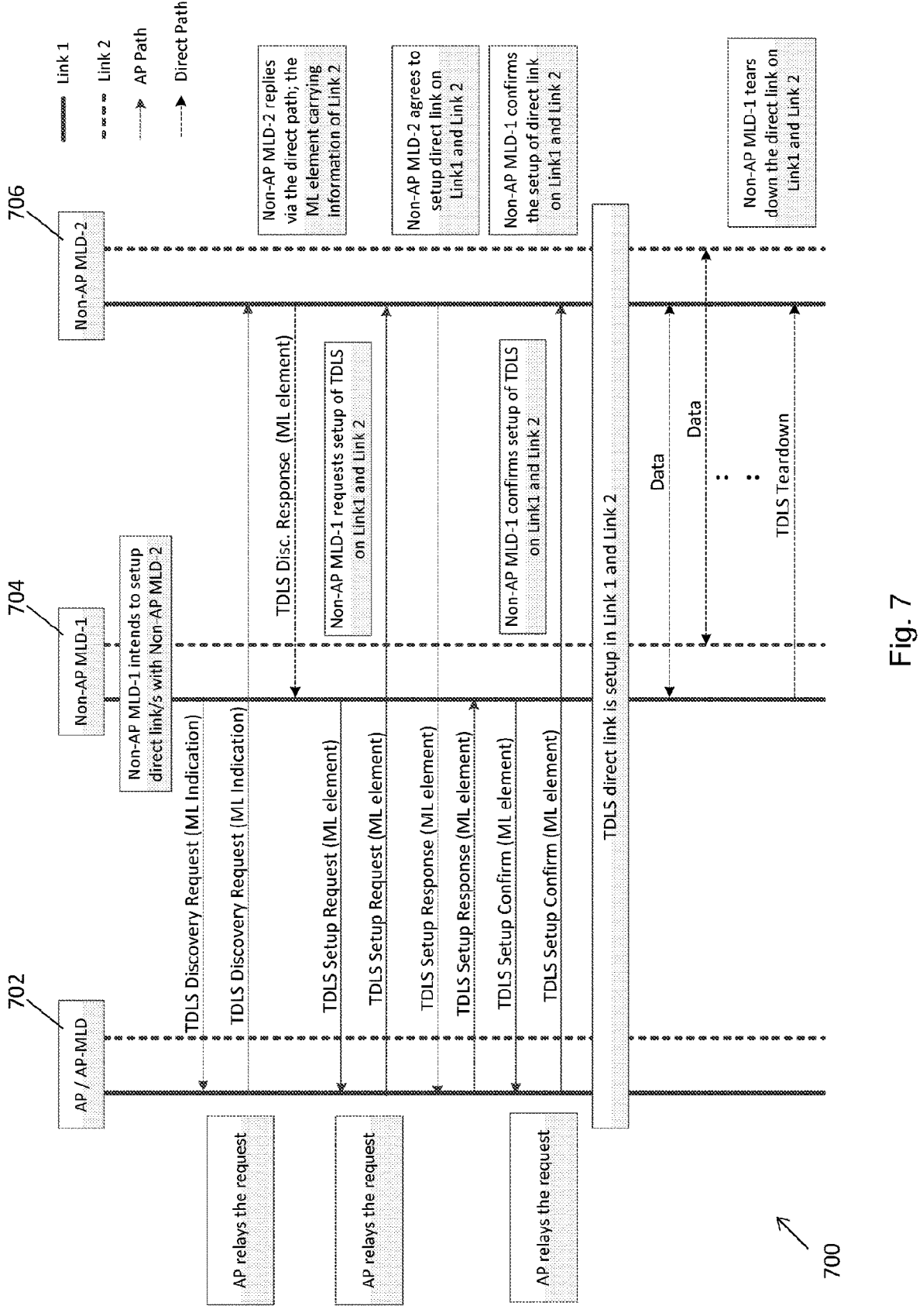
FIG. 7 depicts a flow diagram illustrating a setup of direct links between two non-AP MLDs by using single link via an associated AP or AP MLD according to an embodiment of the present disclosure.

FIG. 7 depicts a flow diagram 700 illustrating a setup of direct links in Link 1 and Link 2 between two non-AP MLDs (non-AP MLD-1 704 and non-AP MLD-2 706) by using single Link 1 via associated AP/AP-MLD 702 according to an embodiment of the present disclosure. In this embodiment, non-AP MLD-1 704 intends to setup direct links with non-AP MLD-2 706. A STA of non-AP MLD-1 704 may initiate a TDLS Discovery by transmitting a data frame carrying a TDLS Discovery Request to non-AP MLD-2 706 in Link 1 via AP/AP-MLD 702, the TDLS Discovery Request comprising an ML indication identifying that the transmitting STA is affiliated with non-AP MLD-1 704.

AP MLD 702, which receives the data frame, identifies that the TDLS Discovery Request carried in the data frame is directed to non-AP MLD-2 706 based on MAC address carried in the DA field of the data frame, and relays the data frame from non-AP MLD-1 704 to non-AP MLD-2 706.

A STA of non-AP MLD-2 706 operating in Link 1, which receives the TDLS Discovery Request, may transmit a TDLS Discovery Response Action frame back to non-AP MLD-1 704 on the direct link (Link 1), the TDLS Discovery Response Action frame carrying information of Link 1 and also comprising an ML element carrying information of Link 2.

With the information of operating links of non-AP MLD-2 706, non-AP MLD-1 704 may requests a setup of TDLS in Link 1 and Link 2 by transmitting a data frame carrying a TDLS Setup Request to non-AP MLD-2 706 in Link 1 via AP/AP-MLD 702, the TDLS Setup Request comprising an ML element carrying information of Link 1 and Link 2 to be setup with non-AP MLD2 706. AP MLD 702, which receives the data frame, identifies that the TDLS Setup Request carried in the data frame is directed to non-AP MLD-2 706 based on MAC address carried in DA field of the data frame, and relays the data frame from non-AP MLD-1 704 to non-AP MLD-2 706.

A STA of non-AP MLD-2 706 operating in Link 1, which receives the TDLS Setup Request, may agree to setup direct links with non-AP MLD-1 704 in Link 1 and Link 2 and transmit a TDLS Setup Response Action frame back to non-AP MLD-1 704 in Link 1 via AP/AP MLD 702. AP MLD 702, which receives the data frame, identifies that the TDLS Setup Response carried in the data frame is directed to non-AP MLD-1 704 based on MAC address carried in the DA field of data frame, and relays the data frame from non-AP MLD-2 7066 to non-AP MLD-1 704.

A STA of non-AP MLD-1 704 operating in Link 1, which receives the TDLS Setup Response, will confirm the setup of TDLS in Link 1 and Link 2 by transmitting a data frame carrying a TDLS Setup Confirm to non-AP MLD-2 706 in Link 1 via AP/AP-MLD 702, the TDLS Setup Confirm comprising an ML element carrying information of operating links (Link 1 and Link 2) that have successfully setup with non-AP MLD-2 706. AP MLD 702, which receives the data frame, identifies that the TDLS Setup Confirm carried in the data frame is directed to non-AP MLD-2 706 based on MAC address carried in the DA field of the data frame, and relays the data frame from non-AP MLD-1 704 to non-AP MLD-2 706. A STA of non-AP MLD-2 706 operating in Link 1 receives the TDLS Setup Confirm. Now, multi-link TDLS setup between two non-AP MLDs 704, 706 is completed and the two non-AP MLDs 704, 706 can perform TDLS direct link communications on both Link 1 and Link 2.

In one embodiment, all direct links between the two non-AP MLDs 704, 706 can be torn down through transmission of a single TDL Teardown frame on any one link, in this case by non-AP MLD-1 704, to non-AP MLD-2 706 on link 1.

Figure 8:
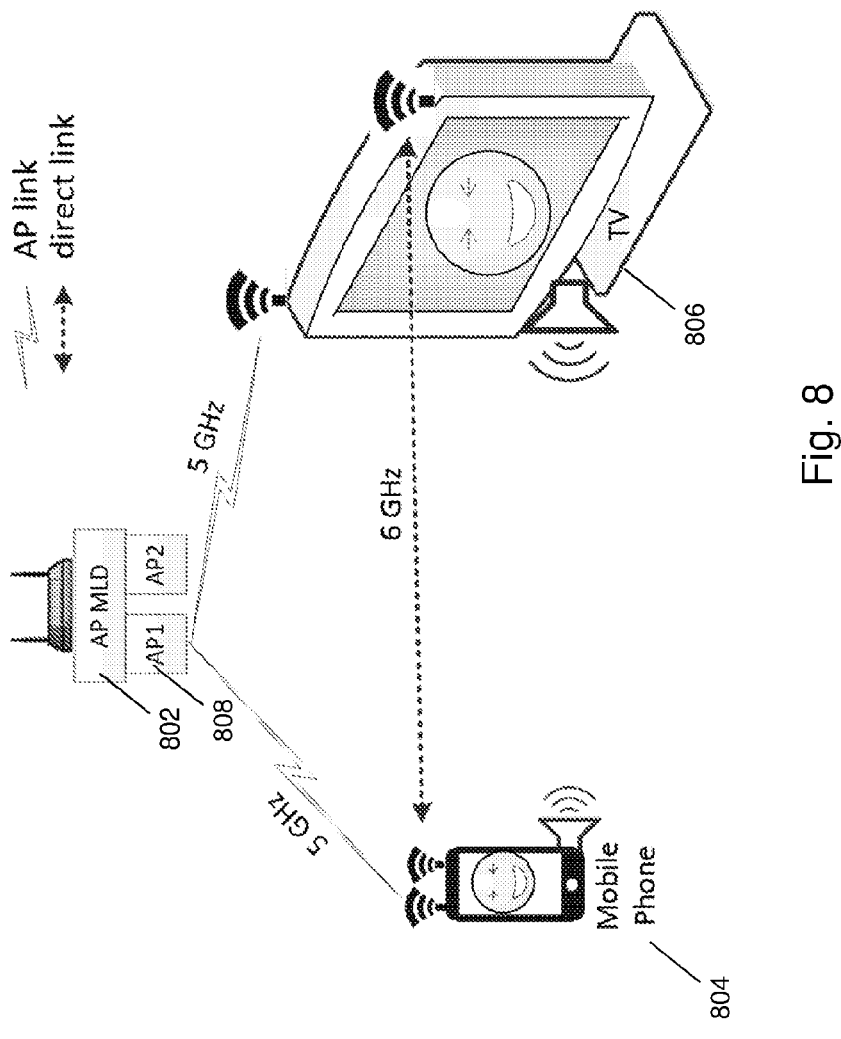
FIG. 8 depicts an example use case of a setup of direct links in one link by using another link for home video conference using mobile phone and TV.

FIG. 8 depicts an example use case of a setup of direct links in Link 2 (e.g. 6 GHz link) by using Link 1 (e.g. 5 GHz link) for home video conference using mobile phone and TV. A mobile phone 804 and a Smart TV 806 are both MLDs and are connected to an AP MLD 802 on the 5 GHz and the 6 GHz links. User initiates a video call on the mobile phone 804 and wants to use the TV 806 for larger display/louder audio while the phone's microphone and front camera are used as inputs. An ML-TDLS setup is initiated on the 5 GHz link via AP1 808 of AP MLD 802 and a direct link is setup between the mobile phone 804 and the TV 806 on the 6 GHz link and is used to relay the video/audio output to the TV 806, while the 5 GHz link is used for the actual video call. While the direct link is active in the 6 GHz link, the STAs of both the mobile phone 804 and the TV 806 in the 6 GHz operates in power save modes with the AP MLD 802, or may even be disabled (e.g. using TID-to-Link mapping). Alternatively, the ML-TDLS setup may be setup by exchanging the TDLS setup frames on the 6 GHz link itself.

Another example use case of a setup of direct links in Link 2 by using Link 1 is video casting from a smart phone 804 to a connected TV 806. The smart phone user wants to cast a video and/or audio to a connected TV 806 in the same network (i.e. both the smartphone 804 and the TV 806 are associated to the same AP/AP-MLD 802). Here, it is assumed that the TV 806 has already been discovered in upper layer discovery protocol or using out-of-band methods e.g. NFC/Bluetooth etc. The user operates video casting app to cast a video to the TV 806. In response to an operation that a user of a smartphone 804 selects the TV 806 for casting destination in an application user interface (UI), WLAN middleware (such as wpa_supplicant) is instructed to initiate TDLS discovery through an API. The STA in the smartphone 804 transmits TDLS Discovery Request in link 1 (via the common associated AP) to discover the TDLS capabilities of the TV 806. The TV 806 transmits back a TDLS Discovery Response indicating its ML-TDLS capabilities via the direct path (e.g. link 2). The STA in the smartphone 804 proceeds to setup one or more direct link connections (link 1 & 2) with the TV 806 using ML-TDLS Setup procedure in link 1. Once the setup is complete, the video casting app starts casting the video from the smartphone 804 to the TV 806 over the one or more direct links.

Figure 9:
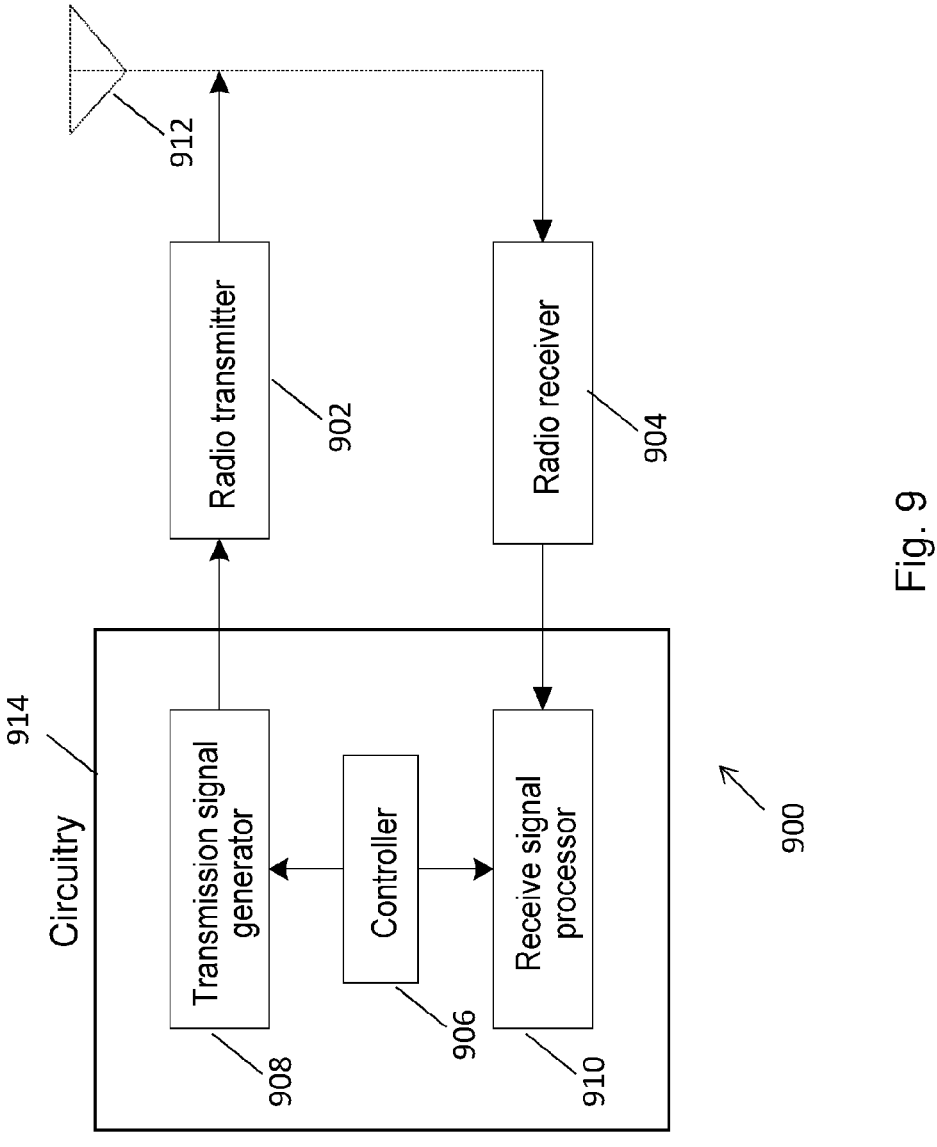
FIG. 9 shows an example configuration of a communication apparatus in accordance with the present disclosure.

FIG. 9 shows an example configuration of a communication apparatus in accordance with the present disclosure. The communication apparatus may be implemented as an AP and a STA and configured for multi-link peer-to-peer communication in accordance with the present disclosure. As shown in FIG. 9, the communication apparatus 900 may include circuitry 914, at least one radio transmitter 902, at least one radio receiver 904, and at least one antenna 912 (for the sake of simplicity, only one antenna is depicted in FIG. 9 for illustration purposes). The circuitry 914 may include at least one controller 906 for use in software and hardware aided execution of tasks that the at least one controller 906 is designed to perform, including control of communications with one or more other communication apparatuses in a multiple input and multiple output (MIMO) wireless network. The circuitry 914 may furthermore include at least one transmission signal generator 908 and at least one receive signal processor 910. The at least one controller 906 may control the at least one transmission signal generator 908 for generating MAC frames (for example Data frames, Management frame and Action frames) to be sent through the at least one radio transmitter 902 and the at least one receive signal processors 910 for processing MAC frames (for example Data frames, Management frame and Action frames) received through the at least one radio receiver 904 from the one or more other communication apparatuses. The at least one transmission signal generator 908 and the at least one receive signal processor 910 may be stand-alone modules of the communication apparatus 900 that communicate with the at least one controller 906 for the above-mentioned functions, as shown in FIG. 9. Alternatively, the at least one transmission signal generator 908 and the at least one receive signal processor 910 may be included in the at least one controller 906. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 902, at least one radio receiver 904, and at least one antenna 912 may be controlled by the at least one controller 906.

The communication apparatus 900, when in operation, provides functions required for multi-link peer to peer communication. For example, the communication apparatus 900 may be a STA of a plurality of STAs affiliated with a first MLD operating in a corresponding link of the first MLD, and the circuitry (for example the at least one transmission signal generator 908 of the circuitry 914) may, in operation, generate a request frame, the request frame being one of a discovery request frame to discover a peer-to-peer communication capability of another communication apparatus (a non-MLD STA or a STA of a non-AP MLD), or a setup request frame to request setup of one or more direct links, the request frame carrying a multi-link (ML) indication identifying that the communication apparatus is affiliated with the first MLD. The ratio transmitter 902 may, in operation, transmit the request frame in a link.

The radio receiver 904 of the communication apparatus 900 may, in operation, further receive, from another communication apparatus, a response frame carrying an ML element or an ML field carrying information about a second MLD with which the other communication apparatus is affiliated and information of at least one link supported by the second MLD.

Alternatively or additionally, the radio receiver 904 may, in operation, receives, from another communication apparatus, a request frame, the request frame being one of a discovery request frame to discover a peer-to-peer communication capability of the communication apparatus 900, or a setup request frame to request setup of one or more direct link. The circuitry 914 (for example the receive signal processor 910 of the circuitry 914) may, in operation, determine if the received request frame carries an ML indication identifying that the other communication apparatus is affiliated with a second MLD, and in response to determining the received request frame carries the ML indication identifying that the other communication apparatus is affiliated with the second MLD, set a Transmitter Address (TA) field of frames transmitted over the one of the one or more direct links to an address carried in a TDLS Responder Station (STA) Address field of a Link Identifier element of the received request frame, and in response to determining the received request frame does not carry the ML indication identifying that the other communication apparatus is affiliated with the second MLD, set the TA field of the frames transmitted over the one of the one or more direct links to a media access control (MAC) address of an affiliated communication apparatus of the second MLD transmitting the frames over the one of the one or more direct links.

The circuitry 914 (for example the transmission signal generator 908 of the circuitry 917) may, in operation, further generate a response frame carrying an ML element or an ML field carrying information about the first MLD with which the other communication apparatus is affiliated and information of at least one link supported by the first MLD. The ratio transmitter 902 may, in operation, transmit the response frame in a link.

For example, the communication apparatus 900 may be an AP of a plurality of APs affiliated with an AP MLD operating in a corresponding link of the AP MLD and the radio receiver 904 may, in operation, receives on a link, from an associated communication apparatus affiliated with an MLD, a data frame with a destination address field set another associated communication apparatus that is not affiliated with an MLD. The circuitry 914 may, in operation, set a source address field of the data frame as a MAC address of the associated communication apparatus. The radio transmitter 902 may, in operation, transmit the data frame with the set source address field to the other associated communication apparatus.

FIG. 10 shows a flow chart 1000 illustrating a communication method in accordance with the present disclosure. In step 1002, a step of generating a request frame is carried out. The request frame is one of a discovery request frame to discover a peer-to-peer communication capability of a communication apparatus, or a setup request frame to request setup of one or more direct links, the request frame carrying an multi-link indication identifying that another communication apparatus transmitting the request frame is affiliated with an MLD. In step 1004, a step of transmitting the request frame is carried out in a link.

Figure 11:
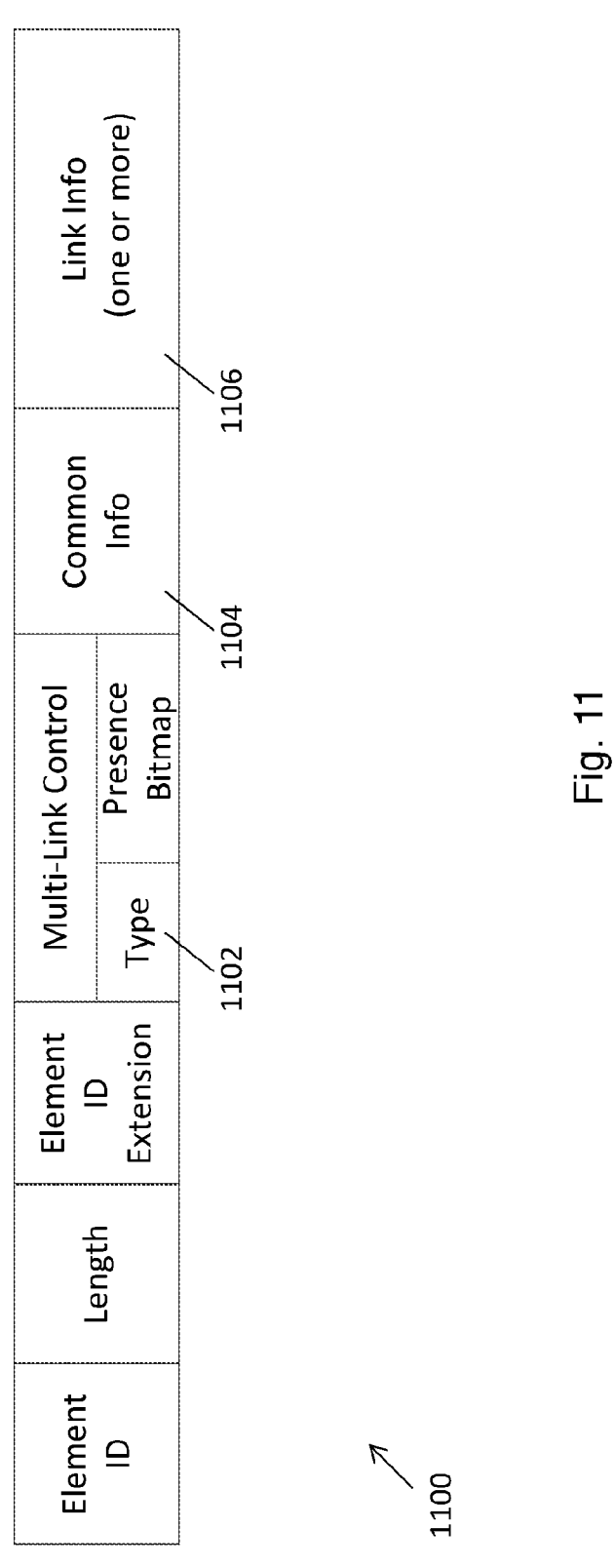
FIG. 11 depicts an example TDLS multi-link (ML) element according to an embodiment of the present disclosure.

In an embodiment, a new variant of ML element called TDLS ML element is used as an ML indication to indicate that a transmitting STA is affiliated with an MLD and also to carry relevant information related to the MLD and the links of the MLD. FIG. 11 depicts an example TDLS ML element 1100 according to an embodiment of the present disclosure. The TDLS ML element 1100 comprises an Element ID field, a Length field, an Element ID Extension field, a Multi-link Control field comprising a Type subfield 1102 set to correspond to a TDLS and a Presence Bitmap subfield, a Common Info field 1104 and one or more Link Info fields 1106.

The Common Info field 1104 carries information about the MLD and other information common to all links. The one or more Link Info field 1106 carries information about the other links involved in ML-TDLS. Advantageously, the multi-link operation signaling can be reused for peer-to-peer signaling.

Figure 12:
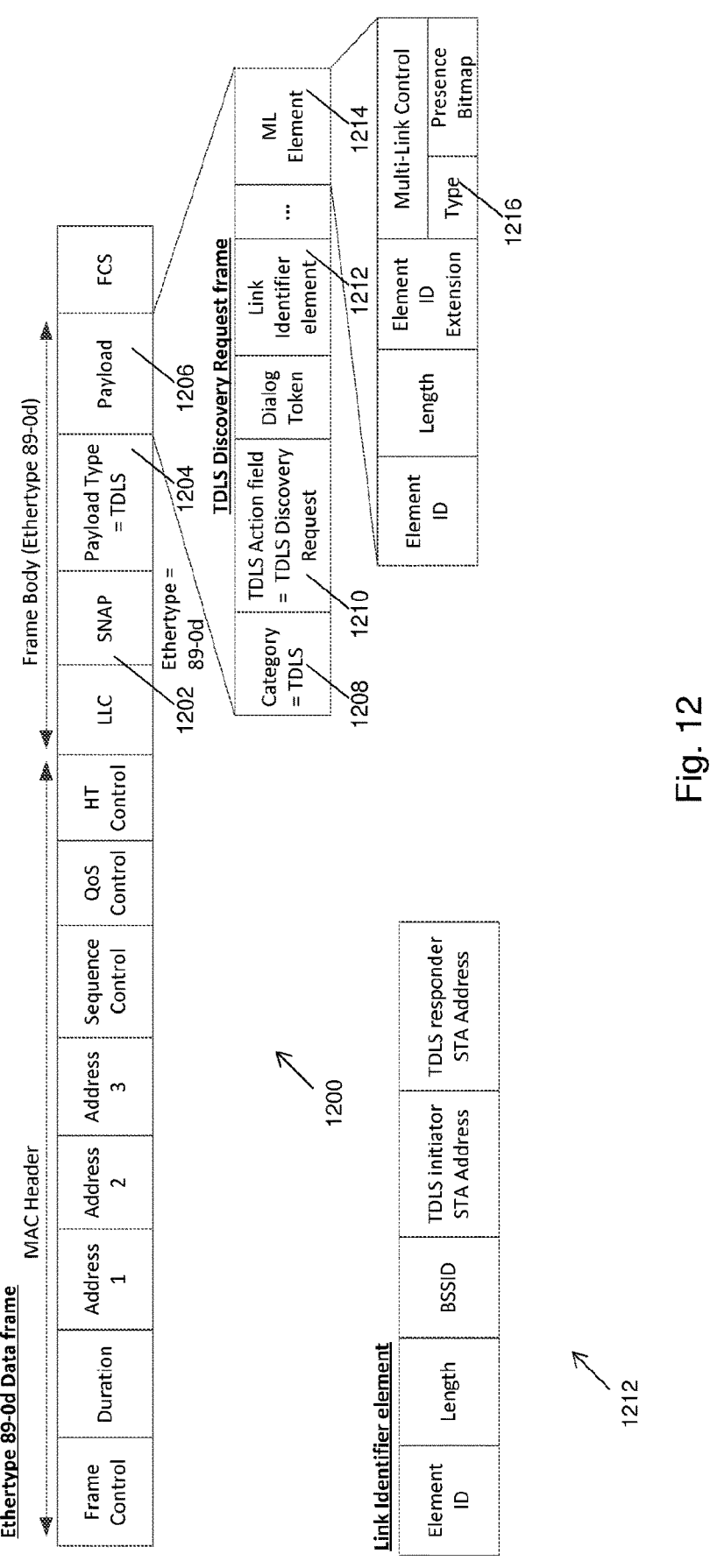
FIG. 12 shows an example format of an Ethertype 89-0d data frame used to carry a TDLS Discovery Request frame and a Link Identifier Element of the TDLS Discovery Request frame.

An encapsulated data frame (e.g. Ethertype 89-0d Data frame carrying TDLS payload) may be used as a TDLS Discovery Request frame. FIG. 12 shows an example format of an Ethertype 89-0d data frame 1200 and a Link Identifier Element 1212 of the data frame 1200.

The Ethertype 89-0d data frame comprises a Frame Control field, a Duration field, an Address 1 field, an Address 2 field, an Address 3 field, a Sequence Control field, a Quality of Service (QoS) Control field, a HT field, a Logical Link Control (LLC) field, a Subnetwork Access Protocol (SNAP) field 1202, a Payload Type field 1204, a Payload field 1206 and a frame check sequence (FCS). The Frame Control field, the Duration field, the Address 1 field, the Address 2 field, the Address 3 field, the Sequence Control, the QOS Control field and the HT Control field may be grouped as MAC header; and the LLC field, the SNAP field 1202, the Payload Type field 1204 and the Payload field 1206 may be grouped as Frame Body. The SNAP field 1202 is set to an Ethertype of 89-0d, and the Payload Type field 1204 is set to correspond to a TDLS. The Payload field 1206 comprises a Category field 1208, a TDLS Action field 1210, a Dialog Token field, a Link Identifier Element 1212 and an ML element 1214. The Category field 1208 is set to correspond to a TDLS. The TDLS Action field 1210 is set to correspond to a TLDS Discovery Request. The Link Identifier Element 1212 comprises an Element ID subfield, a Length subfield, a BSSID subfield, a TDLS Initiator STA Address subfield set to correspond to the MAC address of the STA initiating the TDLS Discovery request, a TDLS Responder STA Address subfield set to correspond to the MAC address of the STA responding to the TDLS Discovery request. The ML element 1214 comprises an Element ID subfield, a Length subfield an Element ID Extension subfield, a Multi-Link Control subfield comprising a Type field 1216 and a Presence Bitmap field.

In this embodiment, the ML Element included in the TDLS Discovery Request frame 1200 may be a TDLS ML Element and acts as an ML indication identifying that the transmitting STA is affiliated with a non-AP MLD (transmitted over the AP Path). Unlike the TDLS ML Element 1100 depicted in FIG. 11, the TDLS ML Element 1214 included in the TDLS Discovery Request frame 1200 may not carry the Common Info field and the one or more Link Info field like that depicted in FIG. 10. Alternatively, a Probe Request ML Element may be used as the ML indicator in the TDLS Discovery Request frame 1200.

Upon receiving a TDLS Discovery Request frame carrying the ML indication, if the receiving STA is also affiliated with an MLD, it transmits a TDLS Response frame carrying a TDLS ML element that carry information of the MLD and the capabilities, MAC address etc. of the STA on the other links (excluding the link indicated in the Link Identifier element) of the MLD via the direct path.

Figure 13:
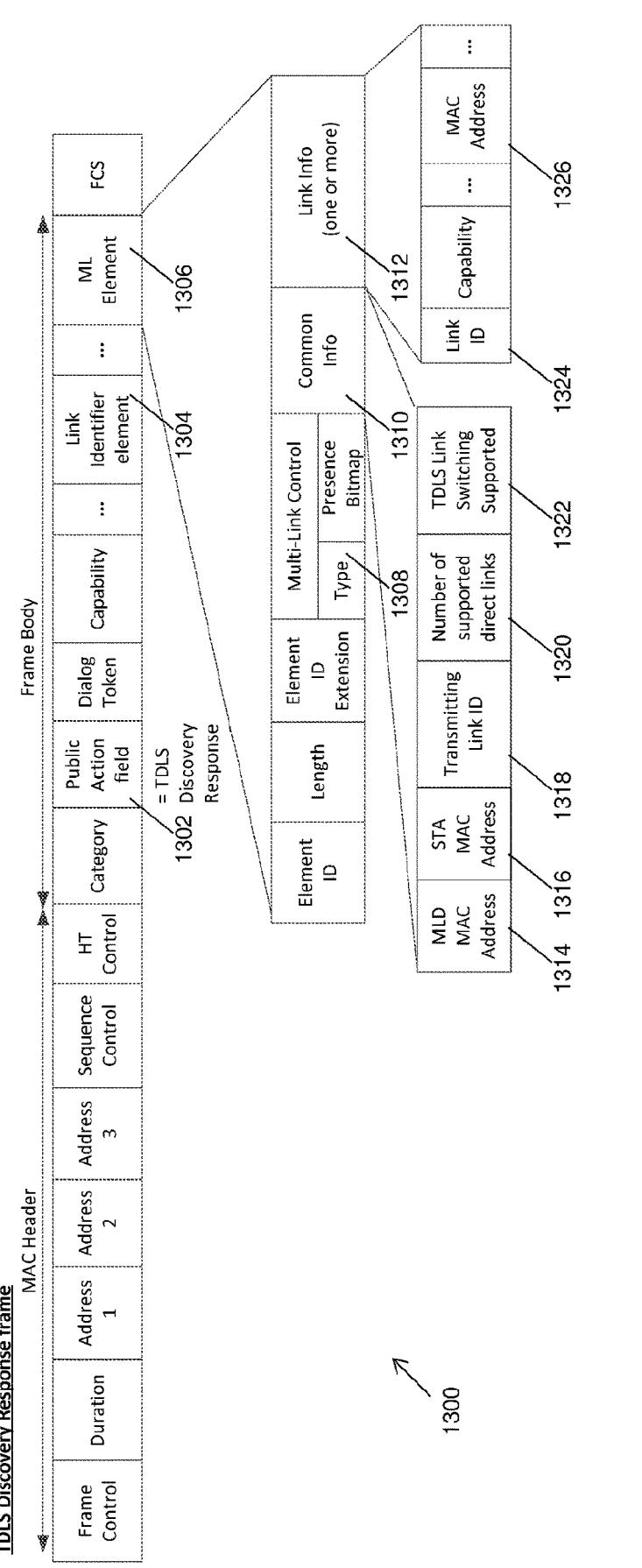
FIG. 13 shows an example format of TDLS Discovery Response frame according to an embodiment of the present disclosure.

FIG. 13 shows an example format of TDLS Discovery Response frame 1300 according to an embodiment of the present disclosure. The TDLS Discovery Response frame 1300 comprises a Frame Control field, a Duration field, an Address 1 field, an Address 2 field, an Address 3 field, a Sequence Control field, a HT field, a Category field, a Public Action field, a Dialog Token field, a Link Identifier Element, an ML Element and a FCS. The Frame Control field, the Duration field, the Address 1 field, the Address 2 field, the Address 3 field, the Sequence Control, and the HT Control field may be grouped as MAC header; and the Category field, the Public Action field, the Dialog Token field, the Link Identifier Element, the ML Element may be grouped as Frame Body. The Public Action field 1302 is set to correspond to a TDLS Discovery Response. The Link Identifier Element 1304 is same as that in TDLS Discovery Request frame depicted in FIG. 12.

The ML Element 1306 included in the TDLS Discovery Response frame 1300 may be a TDLS ML Element and acts as an ML indication identifying that the transmitting STA is affiliated with a non-AP MLD (transmitted over the AP Path). Similar to the TDLS ML Element depicted in FIG. 11, the ML Element 1306 comprises an Element ID field, a Length field, an Element ID Extension field a Multi-Link control field comprising a Type field 1308 and a Presence Bitmap field, a Common Info field 1310 and one or more Link Info field 1312, where the Common Info field 1310 carries information about the MLD and other information common to all links. The one or more Link Info fields 1312 carries information about the other links (excluding the link indicated in the Link Identifier element) involved in ML-TDLS.

In particular, the Common Info field 1310 comprises an MLD MAC Address subfield 1314 set to correspond to the transmitting non-AP MLD's MLD MAC address, a STA MAC Address subfield 1316 set to correspond to the transmitting STA's MAC address, a Transmitting Link ID subfield 1318 set to correspond to the Link ID assigned to the link in which the TDLS Response frame is transmitted, a Number of Supported Direct Links subfield 1320 set to indicate the number of direct links supported by the MLD and a TDLS Link Switching Supported subfield 1322 set to indicate whether the MLD supports switching of TDLS links. Each of the Link Info fields 1312 comprises a Link ID subfield 1324 set to correspond to the Link ID assigned to one other link of the MLD, a Capability subfield and a MAC Address subfield 1326 set to the corresponding MAC Address of the one other link.

For easier identification, the TDLS responding MLD may also assign Links ID to its links, which may be same as the Link IDs assigned to the links by the associated AP MLD. If the STA receiving the TDLS Discovery Request is not affiliated with an MLD, it sends back a regular TLD Discovery Response frame without the ML Element 1306.

As per legacy rules the TA field of the Data frame carrying the Discovery Response frame and the TDLS Responder field shall carry the same address, however when the TDLS responder is an MLD, the TDLS Responder field may be set as the MLD MAC Address of the TDLS responder. In such case, the STA MAC address included in the Common Info field 1310 of the ML Element 1306 in the TDLS Discovery Response frame 1300 may be used by the TDLS Initiator STA to verify the TA field of the Discovery Response frame. The MAC address(es) in the Link Info field of the ML element indicate the MAC address(es) of the STA(s) affiliated with the Peer MLD on the other links and may be used for communications with the STA over the other direct link.

Figure 14:
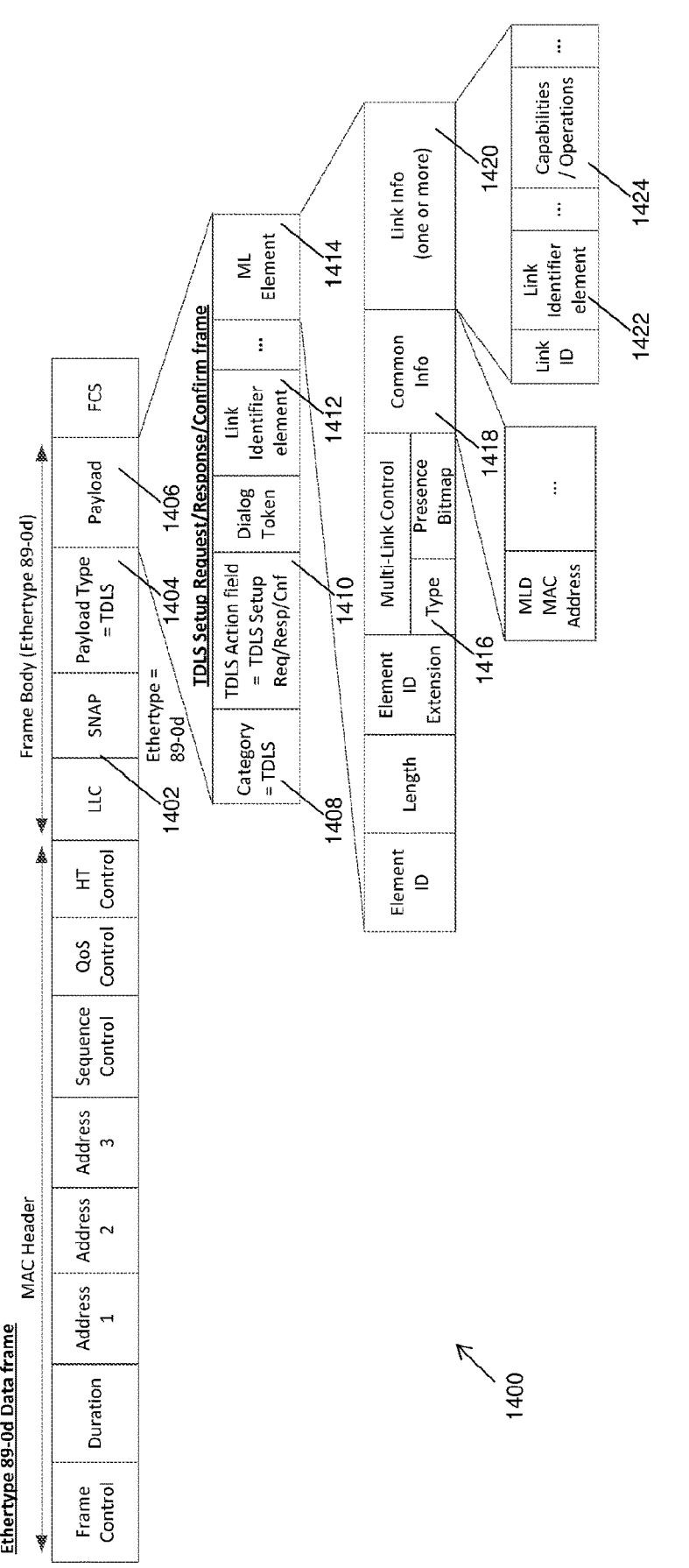
FIG. 14 shows an example format of Ethertype 89-0d data frame used to carry a TDLS Setup frame according to an embodiment of the present disclosure.

To setup multiple direct links between two MLDs, the two MLDs may exchange TDLS Setup (Request/Response/Confirm) frames carrying the TDLS ML Element via the AP path. Encapsulated data frames (e.g. Ethertype 89-0d Data frame carrying TDLS payload) may be used as TDLS Setup frames. FIG. 14 shows an example format of Ethertype 89-0d data frame 1400 used as a TDLS Setup frame according to an embodiment of the present disclosure.

The Ethertype 89-0d data frame comprises a Frame Control field, a Duration field, an Address 1 field, an Address 2 field, an Address 3 field, a Sequence Control field, a QoS Control field, a HT field, a LLC field, a SNAP field 1402, a Payload Type field 1404, a Payload field 1406 and a FCS. The Frame Control field, the Duration field, the Address 1 field, the Address 2 field, the Address 3 field, the Sequence Control, the QOS Control field and the HT Control field may be grouped as MAC header; and the LLC field, the SNAP field 1402, the Payload Type field 1404 and the Payload field 1406 may be grouped as Frame Body. The SNAP field 1402 is set to an Ethertype of 89-0d, and the Payload Type field 1404 is set to correspond to a TDLS. The Payload field 1406 comprises a Category field 1408, a TDLS Action field 1410, a Dialog Token field, a Link Identifier Element 1412 and an ML element 1414. The Category field 1408 is set to correspond to a TDLS. The TDLS Action field 1410 is set to correspond to a TLDS Setup Request/Response/Confirm.

The Link Identifier Element 1412 is used for TPK generation. The ML Element 1414 included in the TDLS Setup frame 1400 may be a TDLS ML Element and acts as an ML indication identifying that the transmitting STA is affiliated with a non-AP MLD (transmitted over the AP Path). Similar to the TDLS ML Element depicted in FIG. 11, the ML Element 1414 comprises an Element ID field, a Length field, an Element ID Extension field a Multi-Link control field comprising a Type field 1416 and a Presence Bitmap field, a Common Info field 1418 and one or more Link Info field 1420. The Common Info field 1418 comprises an MLD MAC Address subfield set to correspond to the transmitting non-AP MLD's MLD MAC address. Each of the Link Info fields 1420 comprises a Link ID subfield, a Link Identifier Element 1422 and a Capabilities/Operations subfield 1424. The Link Identifier Element 1422 to correspond to Link ID of one other link including the MAC Address(es) of the STA(s) of the transmitting MLD operating on the one or more other link. Alternatively, the MAC address of the transmitting STA is included instead of the Link Identifier Element. The Capabilities/Operations subfield 1424 comprises parameters of the one or more other link(s).

TDLS Setup Request/Response may carry HT/VHT/HE/EHT Capabilities elements while the TDLS Setup Confirm frame carries the HT/VHT/HE/EHT Operation element etc. in the Capabilities/Operations field 1424. If only a single direct link is to be setup on the transmitting link itself, the ML Element 1412 only includes the Common Info field 1418 carrying the MLD MAC Address of the transmitting MLD. Other fields such as the STA MAC Address of the transmitting STA, Link ID assigned to the transmitting link, ML-TDLS capabilities etc. may also be included in the Common Info field 1412. The MLD MAC Address may be used to generate the AAD and Nonce fields used to protect the frames exchanged over the direct link.

In the following paragraphs, an embodiment is explained with reference to an ML-TDLS setup between two non-AP MLDs via a non-MLD (legacy) AP for multi-link peer-to-peer communication.

Figure 15:
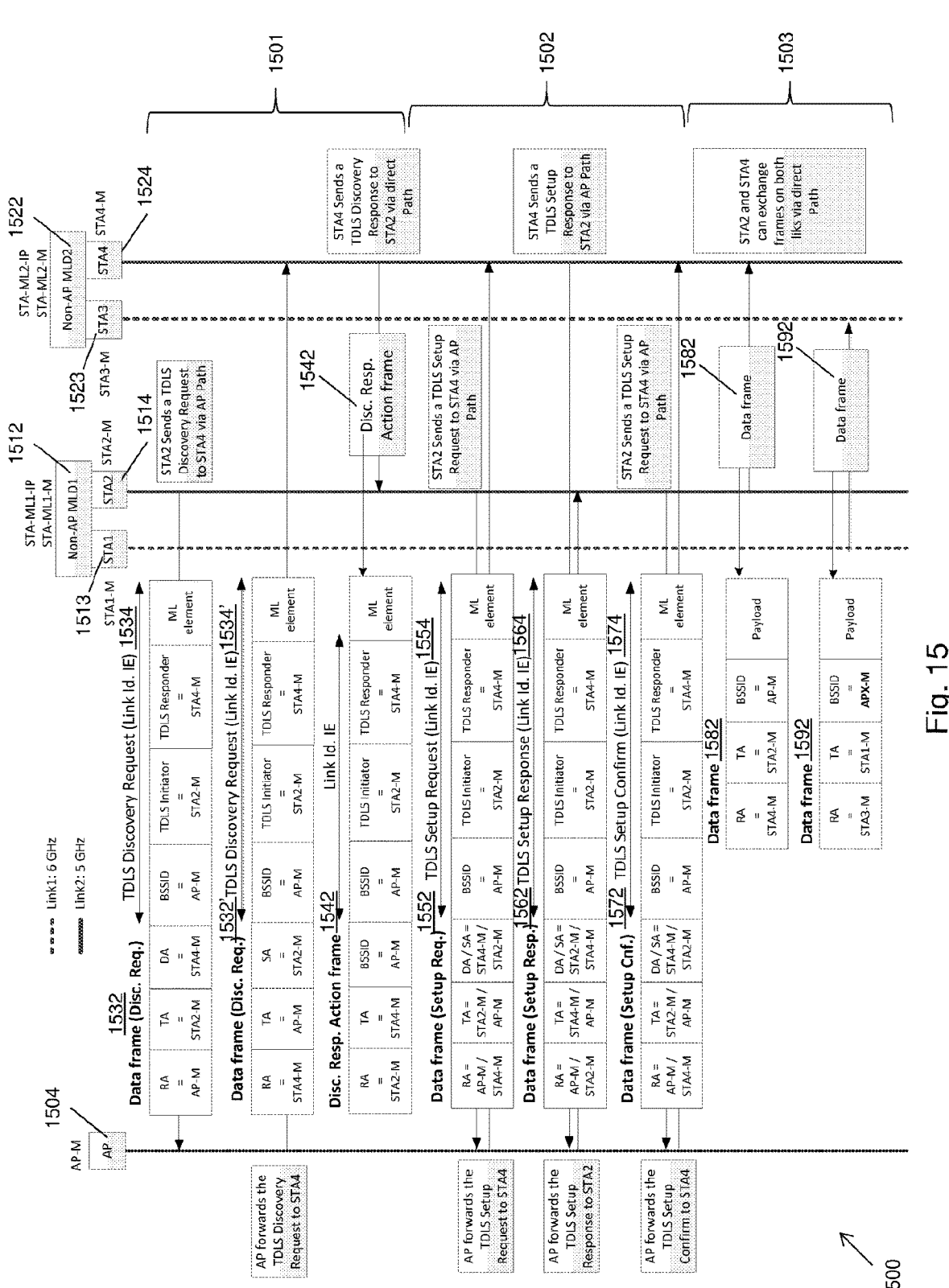
FIG. 15 depicts a flow chart illustrating communications between two non-AP MLDs via a non-MLD AP for multi-link peer-to-peer communication according to an embodiment of the present disclosure.

FIG. 15 depicts a flow chart 1500 illustrating communications between two non-AP MLDs 1512, 1522 via a non-MLD AP 1504 for multi-link peer-to-peer communication according to an embodiment of the present disclosure. The communications can be divided into discovery phase 1501, setup phase 1502 and direct link communication 1503. Here, the non-AP MLDs 1512, 1522 are associated with the AP 1504 on Link2 (in the 5 GHz band).

In the discovery phase 1501, STA2 1514 of non-AP MLD1 1512 may initiate a TDLS Discovery by transmitting a data frame 1532 carrying a TDLS Discovery Request 1534 to STA4 1524 of non-AP MLD2 1522 via AP 1504. The TDLS Discovery Request 1534 comprises a TDLS Initiator field set to the STA2's MAC address (STA2-M) and a TDLS Responder field set to the STA4's MAC address (STA4-M) as well as an ML element to indicate that STA2 1514 is affiliated with non-AP MLD1 1512.

AP 1504, which receives the data frame 1532, identifies that the TDLS Discovery Request 1534 carried in the data frame 1532 is directed to STA4 1524 of its associated non-AP MLD2 1522 based on STA4's MAC address in the DA field, and forwards the Data frame 1532' received from non-AP MLD1 1512 carrying STA2's MAC address (STA2-M) in the SA field and the TDLS Discovery Request 1534' to STA4 1524. AP 1502 also sets the STA4's MAC address (STA4-M) in the RA field when forwarding the data frame 1532' to STA4 1524. As such, the data frame will be correctly received by STA4 1524.

STA4 1524, which receives the TDLS Discovery Request 1534', may transmit a TDLS Discovery Response Action frame 1542 back to STA2 1514 on a direct link, i.e. STA2's operating link (Link 2) carrying an ML element that includes information of non-AP MLD2 1522 as well information of the other STA affiliated with non-AP MLD2 1522 (STA3 1523). STA4 1524 is able to set the RA field of the TDLS Discovery Response Action frame 1542 to STA2's MAC address (STA2-M) based on the TDLS Initiator field. As such, this leads to the frames such as the TDLS Discovery Response Action frame 1542 sent by STA4 1524 to the non-AP MLD 1512 on a direct link to be correctly received via STA2 1514.

In the subsequent setup phase 1502, non-AP MLD1 1512 may initiate a TDLS Setup with non-AP MLD2 1522 via AP 1504 by transmitting a further data frame 1552 carrying a TDLS Setup Request 1554 from STA2 1514 to STA4 1524 via AP 1504. The data frame 1552 comprises a DA field set to STA4's MAC address (STA4-M). The TDLS Setup Request 1534 comprises and a TDLS Responder field set to STA4's MAC address (STA4-M), and a TDLS Initiator field set to the STA2's MAC address (STA2-M) as well as an ML element to indicate that STA2 is affiliated with non-AP MLD1 1512. The ML element includes information of non-AP MLD1 1512 as well information of the other STA affiliated with non-AP MLD1 1512 (i.e., STA1 1513).

AP 1504 identifies that the further data frame 1552 is directed to STA4 1524 of its associated non-AP MLD2 1522 based on the STA MAC address in the DA field, and forward the further data frame 1552 to STA4 1524. AP 1504 also sets the RA field to the STA4's MAC address (STA4-M) when forwarding the data frame 1552 to STA4 1524. As such, the data frame 1552 is correctly received by STA4 1524.

STA4 1524, which receives the TDLS Setup Request 1554 may, in response, transmit another data frame 1562 carrying a TDLS Setup Response 1564 back to STA2 1514 via AP 1504 in Link 2. The TDLS Setup Response 1562 comprise a DA field set to STA2's MAC address (STA2-M), as well as a TDLS Initiator field and TDLS Responder field, both set to the same MAC addressees as that of the TDLS Setup Request 1554 respectively as well as an ML element that includes information of non-AP MLD2 1522 as well information of the other STA affiliated with non-AP MLD2 1522 (i.e., STA3 1523).

AP 1504, which receives the data frame 1562, identifies that the data frame 1562 is directed to STA2 1514 of its associated non-AP MLD1 1512 based on STA2's MAC address in the DA field, and forwards the Data frame 1562 to STA2 1514. AP 1504 also sets the STA2's MAC address (STA2-M) in the RA field when forwarding the Data frame 1562 to STA2 1514. As such, the data frame will be correctly received by STA2 1514.

Subsequently, STA2 1514 transmit a data frame 1572 comprising a TDLS Setup Confirm 1574 to STA4 1524 via AP 1504. The TDLS Setup Confirm 1574 comprises a DA field set to STA4's MAC address (STA4-M), as well as a TDLS Initiator field and TDLS Responder field, both set to the same MAC addressees as that of the TDLS Setup Request 1554, respectively as well as an ML element that includes information of non-AP MLD1 1512 as well information of the other STA affiliated with non-AP MLD1 1512 (i.e., STA1 1513).

AP 1504 identifies that the data frame 1572 is directed to STA4 1524 of its associated non-AP MLD2 1522 based on the STA MAC address in the DA field, and forward the data frame 1572 to STA4 1524. AP 1504 also sets the RA field to the STA4's MAC address (STA4-M) when forwarding the data frame 1572 to STA4 1524. As such, the data frame 1572 is correctly received by STA4 1524 and the Multi-Link TDLS setup phase is complete.

Once TDLS setup between non-AP MLD1 1512 and non-AP MLD2 1522 has been completed, any two STAs from non-AP MLD1 1512 and non-AP MLD2 1522 respectively are able to perform direct multi-link peer-to-peer communication with each other and transmit data frames in Link 1 and Link 2 via direct path. For example, STA2 and STA4 can exchange data frames 1582, 1592 on both Link 1 and Link 2 respectively via direct path.

When non-AP MLDs 1512, 1522 are associated with legacy AP 1504, the respective MLD MAC addresses may be used as the link MAC Address by STA1 1513 and STA3 1523. In this case, the addressing in the frames (on both AP path and direct path) as well as in the Link ID element are straightforward as STA MAC Addresses are used in all cases. When the other link is setup on a DFS channel or in a channel in the 6 GHz band, since the STAs are not associated with any AP on the other link, the STAs shall only operate on a channel in which they can hear at least one AP and that BSSID of the APs BSS may be used. Receiver can verify the TA field based on the MAC address included in the ML element in the Setup phase. When the other link is setup on a normal channel (i.e. not a DFS channel or not in the 6 GHz band, the requirement to hear at least one AP in the channel may be waived and the BSSID field may be set to one of the Peer STAs MAC address, or even to the BSSID of the BSS with which the STAs are associated.

In the following paragraphs, an embodiment is explained with reference to an ML-TDLS setup between two non-AP MLDs via an AP MLD for multi-link peer-to-peer communication.

Figure 16:
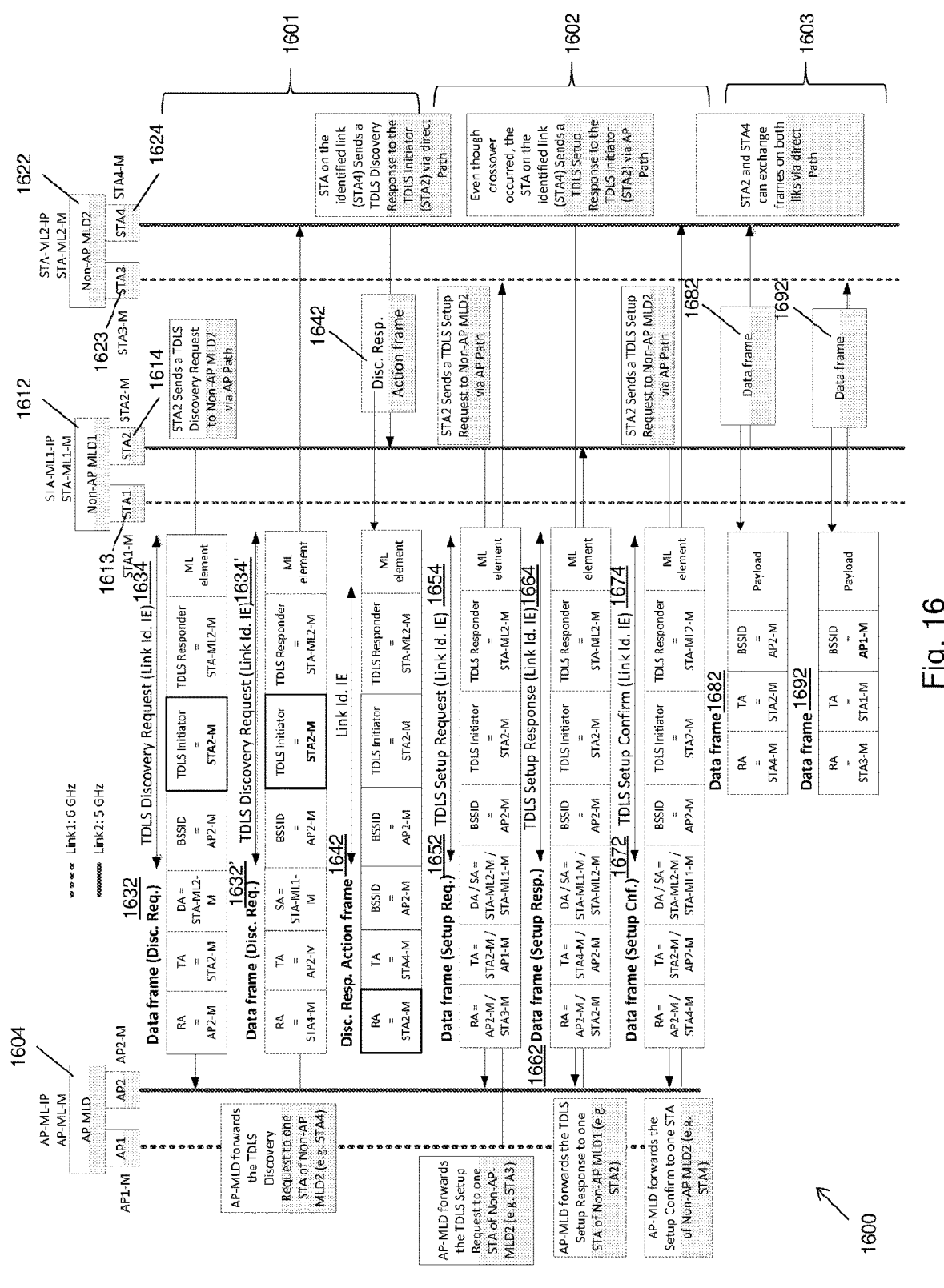
FIG. 16 depicts a flow chart illustrating communications between two non-AP MLDs via a non-MLD AP for multi-link peer-to-peer communication according to an embodiment of the present disclosure.

FIG. 16 depicts a flow chart 1600 illustrating communications between two non-AP MLDs 1612, 1622 via a non-MLD AP 1604 for multi-link peer-to-peer communication according to an embodiment of the present disclosure. The communications can be divided into discovery phase 1601, setup phase 1602 and direct link communication 1603.

In the discovery phase 1601, STA2 1614 of non-AP MLD1 1612 may initiate a TDLS Discovery by transmitting a data frame 1632 carrying a TDLS Discovery Request 1634 to non-AP MLD2 1622 via AP MLD 1604. The data frame 1632 comprises a DA field set to non-AP MLD2's MAC address (STA-ML2-M). The TDLS Discovery Request 1634 comprises a TDLS Initiator field set to the STA2's MAC address (STA2-M) and a TDLS Responder field set to the non-AP MLD2's MLD MAC address (STA-ML2-M) as well as an ML element to indicate that STA2 1614 is affiliated with non-AP MLD1 1612.

AP MLD 1604, which receives the data frame 1632, identifies that the TDLS Discovery Request 1634 carried in the data frame 1632 is directed to non-AP MLD2 1622 based on non-AP MLD2's MLD MAC address in the DA field, and forwards the data frame 1632' received from non-AP MLD1 1612 to one of the affiliated STAs of non-AP MLD2 1622, for example in this embodiment STA4 1624. AP MLD 1604 also sets the STA4's MAC address (STA4-M) in the RA field when forwarding the Data frame 1632' to STA4 1624. As such, the data frame will be correctly received by STA4 1624.

STA4 1624, which receives the TDLS Discovery Request 1634', may transmit a TDLS Discovery Response Action frame 1642 back to STA2 1614 on a direct link, i.e. STA2's operating link (Link 2) carrying an ML element that includes information of non-AP MLD2 1622 as well information of the other STA affiliated with non-AP MLD2 1622 (STA3 1623). STA4 1624 is able to set the RA field of the TDLS Discovery Response Action frame 1642 to STA2's MAC address (STA2-M) based on the TDLS Initiator field of the TDLS Discovery Request 1634'. As such, this leads to the frames such as the TDLS Discovery Response Action frame 1642 sent by STA4 1624 to the non-AP MLD 1612 on a direct link to be correctly received via STA2 1614.

In the subsequent setup phase 1602, non-AP MLD1 1612 may initiate a TDLS Setup with non-AP MLD2 1622 via AP MLD 1604 by transmitting a further data frame 1652 carrying a TDLS Setup Request 1654 from STA2 1614 to non-AP MLD2 1622 via AP MLD 1604. The data frame 1652 comprises a DA field set to non-AP MLD2's MAC address (STA-ML2-M). The TDLS Setup Request 1654 comprises a TDLS Responder field set to non-AP MLD2's MLD MAC address, and a TDLS Initiator field set to the STA2's MAC address (STA2-M) as well as an ML element to indicate that STA2 is affiliated with non-AP MLD1 1612. The ML element includes information of non-AP MLD1 1612 as well information of the other STA affiliated with non-AP MLD1 1612 (i.e., STA1 1613).

AP MLD 1604 identifies that the further data frame 1652 is directed to its associated non-AP MLD2 1622 based on the non-AP MLD2's MLD MAC address in the DA field, and forward the further data frame 1652 to one of the affiliated STAs of non-AP MLD2 1622, for example in this embodiment STA3 1623. AP MLD 1604 also sets the RA field to the STA3's MAC address (STA3-M) when forwarding the data frame 1652 to STA3 1623. As such, the data frame 1652 is correctly received by STA3 1623.

Since the TDLS frame indicates the DA as the MLD MAC Address, it is possible that crossover may occur when the AP MLD relays the TDLS frames (i.e. the frame is relayed on a different link e.g. the TDLS Setup Request frame 1652 above). However, the receiving Non-AP MLD can correctly identify the transmitting STA and its link by referring to the TDLS Initiator address and the BSSID fields of the Link Identifier element carried in the TDLS frame (not in the ML element) and respond accordingly.

In this regard, even though a crossover from Link 2 to Link 1 has occurred, non-AP MLD2 1622, which receives the TDLS Setup Request 1654, may, in response, transmit another data frame 1662 carrying a TDLS Setup Response 1664 back to STA2 1614, i.e. the TDLS Initiator, from STA4 1624 via AP MLD 1604. The data frame 1662 comprises a DA field set to non-AP MLD1's MLD MAC address (STA-ML1-M). The TDLS Setup Response 1664 comprise a TDLS Initiator field and TDLS Responder field, both set to the same MAC addressees as that of the TDLS Setup Request 1654, respectively as well as an ML element that includes information of non-AP MLD2 1622 as well information of the other STA affiliated with non-AP MLD2 1622 (i.e., STA3 1623).

AP MLD 1604, which receives the data frame 1662, identifies that the data frame 1662 is directed non-AP MLD1 1612 based on the MAC address in the DA field, and forwards the data frame 1662 to one of the affiliated STAs of non-AP MLD1 1612 (e.g., STA2 1614). AP MLD 1604 also sets the STA2's MAC address (STA2-M) in the RA field when forwarding the Data frame 1662 to STA2 1614. As such, the data frame will be correctly received by STA2 1614.

Subsequently, STA2 1614 transmit a data frame 1672 comprising a TDLS Setup Confirm 1674 to STA4 1624 via AP MLD 1604. The TDLS Setup Confirm 1674 comprises a DA field set to non-AP MLD2's MLD MAC address (STA-ML2-M), as well as a TDLS Responder field and a TDLS Initiator field, both set to the same MAC addressees as that of the TDLS Setup Request 1654 respectively as well as an ML element that includes information of non-AP MLD1 1612 as well information of the other STA affiliated with non-AP MLD1 1612 (i.e., STA1 1613).

AP MLD 1604 identifies that the data frame 1672 is directed to non-AP MLD2 1622 based on the MAC address in the DA field, and forward the data frame 1672 to one of the affiliated STAs of non-AP MLD2 1622, for example in this embodiment STA4 1624. AP MLD 1604 also sets the RA field to the STA4's MAC address (STA4-M) when forwarding the data frame 1672 to STA4 1624. As such, the data frame 1672 is correctly received by STA4 1624 and the setup phase is complete.

Once TDLS setup between non-AP MLD1 1612 and non-AP MLD2 1622 has been completed, any two STAs from non-AP MLD1 1612 and non-AP MLD2 1622 respectively are able to perform direct multi-link peer-to-peer communication with each other and transmit data frames in Link 1 and Link 2 via direct path. For example, STA2 and STA4 can exchange data frames 1682, 1692 on both Link 1 and Link 2 respectively via direct path. In this case, the BSSID field of the Data frames transmitted on the direct links are set to the respective associated BSSIDs. Below are some subtle points regarding the flow 1600.

Since IP address is tied to the MLD MAC Address (return by ARP), initially STA1 1613 will only know non-AP MLD2s MLD MAC Address. The TDLS Initiator STA Address and the BSSID field in the Link Identifier element identifies the initiator STA and the link in which the TDLS Discovery Response frame 1642 should be transmitted.

The content of the TDLS Discovery Request frame 1632 is same even if the recipient is a non-MLD (since transmitter would not know whether it is an MLD or not), except that the TDLS responder STA Address in this case will be the STA2's MAC address.

Here, it is to be noted that in the TDLS Discovery Response frame 1642, the TA field is set as the MAC Address of the transmitting STA (STA4-M) and is different from the TDLS Responder STA Address field in the Link Identifier element. This behaviour is different from the baseline TDLS behaviour, however since the recipient is also an MLD, and it is already aware of the STA MAC Address through the ML Element (included in the Common Info field of the ML Element) so it can verify the TA field of the Discovery Response frame even if the TDLS Responder STA Address field is set as the MLD MAC Address.

In the following paragraphs, an embodiment is explained with reference to an ML-TDLS setup between a non-AP MLD and a non-MLD STA via an AP MLD for multi-link peer-to-peer communication, where the setup is initiated by the non-AP MLD.

Figure 17:
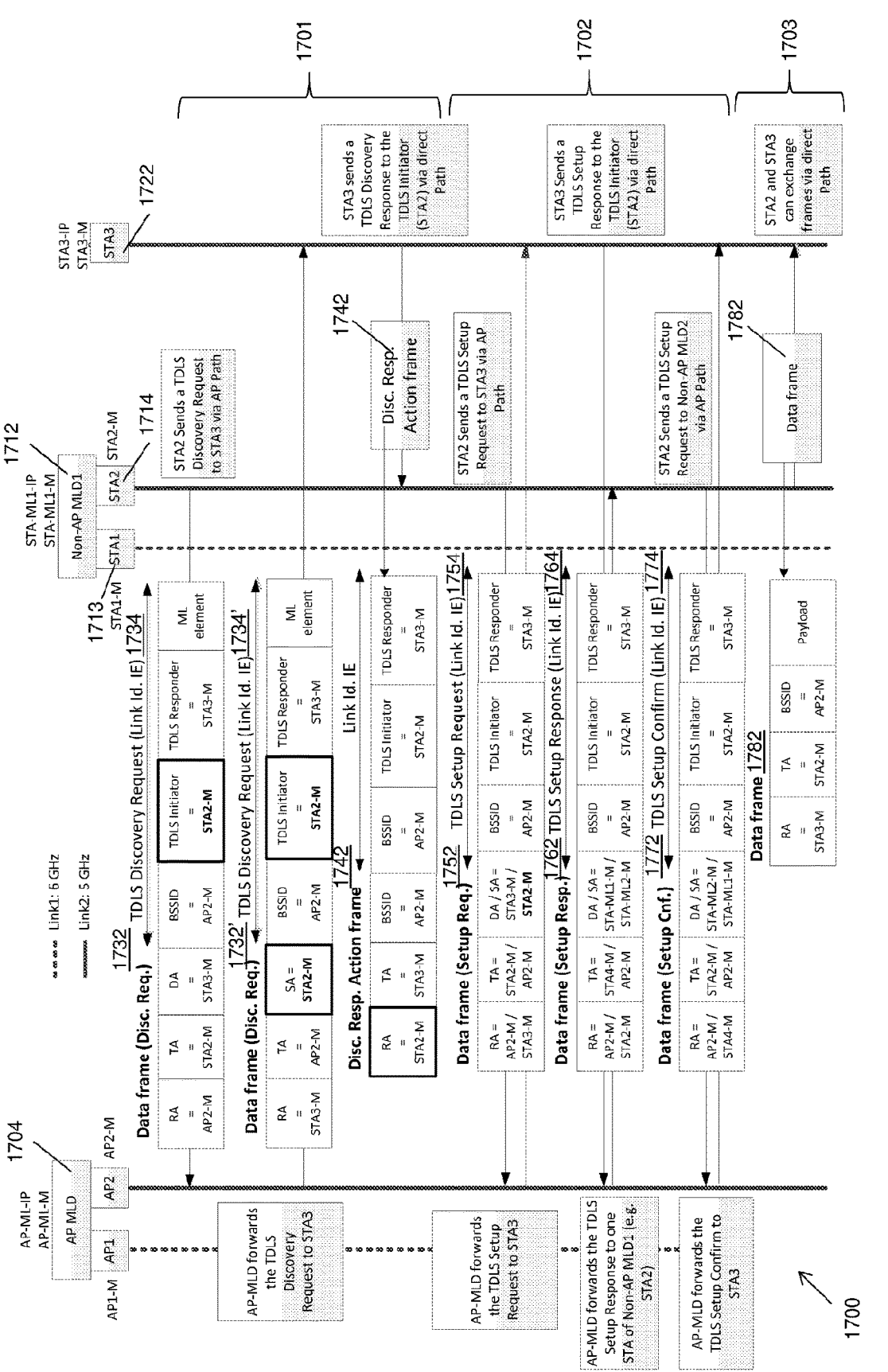
FIG. 17 depicts a flow chart illustrating communications between a non-AP MLD and a non-MLD STA (STA3) via a non-MLD AP for multi-link peer-to-peer communication according to an embodiment of the present disclosure.

FIG. 17 depicts a flow chart 1700 illustrating communications between a non-AP MLD 1712 and a non-MLD STA (STA3) 1722 via a non-MLD AP 1704 for multi-link peer-to-peer communication according to an embodiment of the present disclosure. The communications can be divided into discovery phase 1701, setup phase 1702 and direct link communication 1703.

In the discovery phase 1701, STA2 1714 of non-AP MLD1 1712 may initiate a TDLS Discovery by transmitting a data frame 1732 carrying a TDLS Discovery Request 1734 to STA3 1722 via AP MLD 1704. The data frame comprises a DA field set to STA3's MAC address. The TDLS Discovery Request 1734 comprises a TDLS Initiator field set to the STA2's MAC address (STA2-M) and a TDLS Responder field set to STA3's MAC address as well as an ML element to indicate that STA2 1714 is affiliated with non-AP MLD1 1712.

AP MLD 1704, which receives the data frame 1732, identifies that the TDLS Discovery Request 1734 carried in the data frame 1732 is directed to STA3 1722 based on STA3's MAC address in the DA field, and forwards the data frame 1732' carrying the TDLS Discovery Request 1734' received from non-AP MLD1 1712 to STA3 1722.

AP MLD 1704 may typically set the SA field of a forwarded data frame as the non-AP MLD's MLD MAC Address, but when it is forwarding to a non-MLD STA (e.g. a legacy STA STA3 1722), the SA field is set as the MAC Address of the transmitting STA of the non-AP MLD1 1712, in this case, the STA2's MAC address (STA2-M). The TDLS Responder (STA3 1722) can correctly set the RA of the subsequent Discovery response action frame sent over the direct path based on the SA and/or the TDLS Initiator MAC address of the received Data frame carrying the Discovery Request frame. This avoids the STAs of the non-AP MLD having to filter received frames based on MLD MAC Address.

When forwarding the data frame 1732', AP MLD 1704 also sets the STA3's MAC address (STA3-M) in the RA field when forwarding the Data frame 1732' to STA3 1722. As such, the data frame will be correctly received by STA3 1722.

STA3 1722, which receives the TDLS Discovery Request 1734', may transmit a TDLS Discovery Response Action frame 1742 back to STA2 1714 on a direct link (Link 2). STA3 1722 is able to set the RA field of the TDLS Discovery Response Action frame 1742 to STA2's MAC address (STA2-M). As such, this leads to the frames such as the TDLS Discovery Response Action frame 1742 sent by STA3 1722 to the non-AP MLD 1612 on a direct link to be correctly received via STA2 1714. It is to be noted that since STA3 1722 is not an MLD, the TDLS Discovery Response frame 1742 does not carry an ML Element.

In the subsequent setup phase 1702, non-AP MLD1 1712 may initiate a TDLS Setup with STA3 1722 via AP MLD 1704 by transmitting a further data frame 1752 carrying a TDLS Setup Request 1754 from STA2 1714 to STA3 1722 via AP MLD 1704. The data frame comprises a DA field set to STA3's MAC address. The TDLS Setup Request 1754 comprises a TDLS Responder field set to STA3's MAC address, and a TDLS Initiator field set to the STA2's MAC address (STA2-M). It is to be noted that since it is now known to non-AP MLD1 1712 that STA3 1722 is not an MLD (due to lack of ML Element in the TDLS Discovery Response frame), the TDLS Setup Request 1752 does not carry an ML Element.

AP MLD 1704 identifies that the further data frame 1752 is directed to STA3 1722 based on the STA3's MAC address in the DA field, and forwards the further data frame 1752 to STA3 1722. AP MLD 1704 also sets the RA field to the STA3's MAC address (STA3-M) when forwarding the data frame 1752 to STA3 1723. As such, the data frame 1752 is correctly received by STA3 1722.

STA3 1722, which receives the TDLS Setup Request 1754, may, in response, transmit another data frame 1762 carrying a TDLS Setup Response 1764 back to STA2 1714, i.e. the TDLS Initiator, via AP MLD 1704. The data frame comprises a DA field set to non-AP MLD1's MLD MAC address. The TDLS Setup Response 1764 comprise a TDLS Initiator field and TDLS Responder field, both set to the same MAC addressees as that of the TDLS Setup Request 1754 respectively.

AP MLD 1704, which receives the data frame 1762, identifies that the TDLS Setup Response 1764 carried in the data frame 1762 is directed to non-AP MLD1 1712 based on non-AP MILD1's MLD MAC address in the DA field, and forwards the data frame 1762 to one of the affiliated STAs of non-AP MLD 1712, for example in this embodiment STA2 1714. AP MLD 1704 also sets the STA2's MAC address (STA2-M) in the RA field when forwarding the Data frame 1762 to STA2 1714. As such, the data frame will be correctly received by STA2 1714.

Subsequently, STA2 1714 transmits a data frame 1772 comprising a TDLS Setup Confirm 1774 to STA3 1722 via AP MLD 1704. The data frame 1772 comprises a DA field set to STA3's MAC address (STA3-M). The TDLS Setup Confirm 1774 comprises a TDLS Initiator field and TDLS Responder field, both set to the same MAC addresses as that of the TDLS Setup Request 1754 respectively. It is to be noted that the TDLS Setup Confirm 1772 does not carry an ML Element.

AP MLD 1704 identifies that the data frame 1772 is directed to STA3 1772 based on the MAC address in the DA field, and forward the data frame 1772 to STA3 1722. AP MLD 1704 also sets the RA field to the STA3's MAC address (STA3-M) when forwarding the data frame 1772 to STA3 1722. As such, the data frame 1772 is correctly received by STA3 1722 and the setup phase is complete.

Once TDLS setup between non-AP MLD1 1712 and STA3 1722 has been completed, STA2 1714 non-AP MLD1 1712 and STA3 are able to perform direct multi-link peer-to-peer communication with each other and transmit data frames in the common operating link (Link 2) via direct path.

In the following paragraphs, an embodiment is explained with reference to an ML-TDLS setup between a non-AP MLD and a non-MLD STA via an AP MLD for multi-link peer-to-peer communication, where the setup is initiated by the non-MLD STA.

There are two possible options to perform TDLS Setup initiated by a non-MLD STA with a non-AP MLD via AP MLD. In Option 1, regardless of the TDLS Responder STA Address field in the Link Identifier element, the non-AP MLD will set the TA of the TDLS Discovery Response frame as the transmitting STA's MAC Address (STA2-M). Based on this during the direct link communication, the same MAC Address (STA's) is used in the RA field. However, with this option there is a risk that the legacy STA (STA3) may reject the TDLS Discovery Response frame due to the mismatch in the TA field and the TDLS Responder STA Address field in the Link Identifier element.

In Option 2, upon receiving a TDLS Discovery Request frame in legacy format (identified by the absence of the ML Indication), the TDLS Responder simply uses whatever address (MLD MAC Address or STA MAC Address) is used in the TDLS Responder STA Address field in the Link Identifier element of the TDLS Discovery Request frame as the TA field in the TDLS Discovery Response frame. The choice of the address set in the TDLS Responder field in the Link Identifier element in the TDLS frames as well as in the RA fields in the frames transmitted in the direct link by the legacy device depend on its knowledge of the MAC Address of the TDLS Responding STA, which may be impacted for example by the way the ARP protocol returns the MAC Address of an MLD. Or a legacy STA may learn the STA MAC Address via its past communications with the STA, or by listening on the wireless medium etc. Adapting the TA field of the TDLS Discovery Response frame (or Data frames transmitted over the direct path) ensures that the legacy STA does not reject the TDLS Discovery Response frame due to mismatch between the TA field and the TDLS Responder STA Address field. The same address is also used as the TA for all frames transmitted on the direct link.

Figure 18:
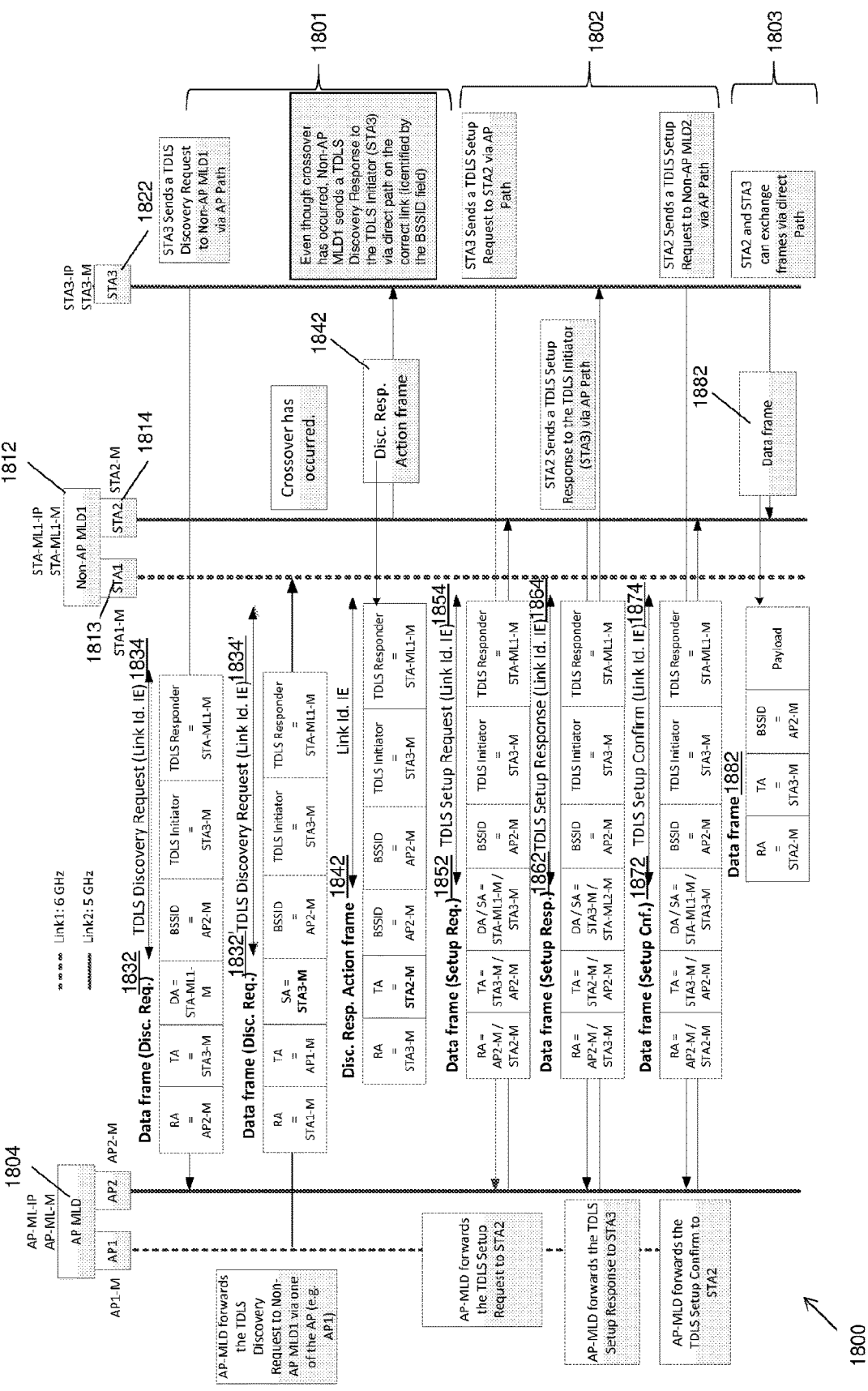
FIG. 18 depicts a flow chart illustrating communications between a non-AP MLD and a non-MLD STA (STA3) via a non-MLD AP for multi-link peer-to-peer communication according to another embodiment of the present disclosure.

FIG. 18 depicts a flow chart 1800 illustrating communications between a non-AP MLD 1812 and a non-MLD STA (STA3) 1822 via a non-MLD AP 1804 for multi-link peer-to-peer communication according to another embodiment of the present disclosure following Option 1 described above. The communications can be divided into discovery phase 1801, setup phase 1802 and direct link communication 1803.

In the discovery phase 1801, STA3 1822 may initiate a TDLS Discovery by transmitting a data frame 1832 carrying a TDLS Discovery Request 1834 to non-AP MLD1 1812 via AP MLD 1804. The data frame 1832 comprises a DA field set to non-AP MLD1's MAC address (STA-ML1-M). Since IP address is tied to the MLD MAC Address (return by ARP), initially STA3 1822 may only know non-AP MLD1's MLD MAC Address. The TDLS Discovery Request 1834 comprises a TDLS Initiator field set to STA3's MAC address (STA3-M) and a TDLS Responder field set to non-AP MLD1's MLD MAC address (STA-ML1-M). The TDLS Initiator STA Address and the BSSID field in the Link Identifier element identifies the initiator STA 1822 and the link in which the TDLS Discovery response frame 1832 should be transmitted. The content of the TDLS Discovery Request frame is same even if the recipient is a non-MLD (since STA3 1822 would not know whether the recipient is an MLD or not).

AP MLD 1804, which receives the data frame 1832, identifies that the TDLS Discovery Request 1834 carried in the data frame 1832 is directed to non-AP MLD based on MLD MAC address in the DA field, and forwards the data frame 1832' carrying the TDLS Discovery Request 1834' received from STA3 1822 to one of the affiliated STA of non-AP MLD1 1812, for example in this case STA1 1813 and thus a crossover to Link 1 has occurred. AP MLD 1804 sets the STA1's MAC address (STA1-M) in the RA field when forwarding the Data frame 1832' to STA1 1813. As such, the data frame will be correctly received by STA1 1813.

Non-AP MLD 1812, which receives the TDLS Discovery Request 1834', may transmit a TDLS Discovery Response Action frame 1842 back to STA3 1822 on a direct link from one of the affiliated STAs, for example in this embodiment STA2 1814 operating in a same link as non-MLD STA3 1822. Non-AP MLD 1812 sets the TA field of the TDLS Discovery Response Action frame 1842 as the MAC address of the transmitting STA (STA2 1814), and also the RA field of the TDLS Discovery Response Action frame 1842 to STA3's MAC address (STA3-M). As such, this leads to the frames such as the TDLS Discovery Response Action frame 1842 sent by STA2 1814 to STA3 1822 on a direct link to be correctly received via STA3 1822. Importantly, under Option 1, the MAC address of the transmitting STA in TA field of the TDLS Discovery Response Action frame 1842 may be used to set the RA field of data frame transmitted by STA3 1822 in the direct link communication 1803.

In the subsequent setup phase 1802, STA3 1822 may initiate a TDLS Setup with non-AP MLD 1812 via AP MLD 1804 by transmitting a further data frame 1852 carrying a TDLS Setup Request 1854 from STA3 1822 to non-AP MLD 1822 via AP MLD 1804. The data frame 1852 comprises a DA field set to non-AP MLD's MLD MAC address (STA-ML1-M). The TDLS Setup Request 1854 comprises a TDLS Responder field, set to non-AP MLD's MLD MAC address, and a TDLS Initiator field set to the STA3's MAC address (STA3-M).

AP MLD 1804 identifies that the further data frame 1852 is directed to non-AP MLD1 1812 based on the MLD MAC address in the DA field, and forward the further data frame 1852 to one of the affiliated STAs of non-AP MLD1 1812, for example in this embodiment STA2 1814. AP MLD 1804 also sets the RA field to the STA2's MAC address (STA2-M) when forwarding the data frame 1852 to STA2 1814. As such, the data frame 1852 is correctly received by STA2 1814.

Non-AP MLD 1812, which receives the TDLS Setup Request 1854, may, in response, transmit another data frame 1862 carrying a TDLS Setup Response 1864 back to STA3 1822, i.e. the TDLS Initiator, via AP MLD 1804. The data frame 1862 comprises a DA field set to STA3's MAC address. The TDLS Setup Response 1864 comprise a TDLS Initiator field and TDLS Responder field, both set to the same MAC addresses as that of the TDLS Setup Request 1854 respectively.

AP MLD 1804, which receives the data frame 1862, identifies that the TDLS Setup Response 1864 carried in the data frame 1862 is directed to STA3 1822 based on STA3's MAC address in the DA field, and forwards the data frame 1862 to STA3 1822. AP MLD 1804 also sets the STA3's MAC address (STA3-M) in the RA field when forwarding the Data frame 1862 to STA3 1822. As such, the data frame will be correctly received by STA3 1822.

Subsequently, STA3 1822 transmit a data frame 1872 comprising a TDLS Setup Confirm 1874 to non-AP MLD1 1812 via AP MLD 1804. The data frame comprises a DA field set to non-AP MLD1's MAC address (STA-ML1-M). The TDLS Setup Confirm 1874 comprises a TDLS Responder field and a TDLS Initiator field, both set to the same MAC addresses as that of the TDLS Setup Request 1854 respectively.

AP MLD 1804 identifies that the data frame 1872 is directed to non-AP MLD1 1812 based on the MLD MAC address in the DA field, and forward the data frame 1872 to one of the affiliated STAs of non-AP MLD1 1812, for example in this embodiment STA2 1814. AP MLD 1804 also sets the RA field to the STA2's MAC address (STA2-M) when forwarding the data frame 1872 to STA2 1814. As such, the data frame 1872 is correctly received by STA2 1814 and the setup phase is complete.

Once TDLS setup between non-AP MLD1 1812 and STA3 has been completed, STA2 1814 non-AP MLD1 1812 and STA3 1822 are able to perform direct multi-link peer-to-peer communication with each other and transmit data frames 1882 in the common operating link (Link 2) via direct path. The RA of such data frames 1882 is set as receiving STA's MAC address based on TA of the Discovery Response Action frame 1842. However, as explained earlier, with this option there is a risk that the legacy STA (STA3) may reject the TDLS Discovery Response frame due to the mismatch in the TA field and the TDLS Responder STA Address field in the Link Identifier element and the legacy STA may not even proceed to the TDLS Setup phase.

Figure 19:
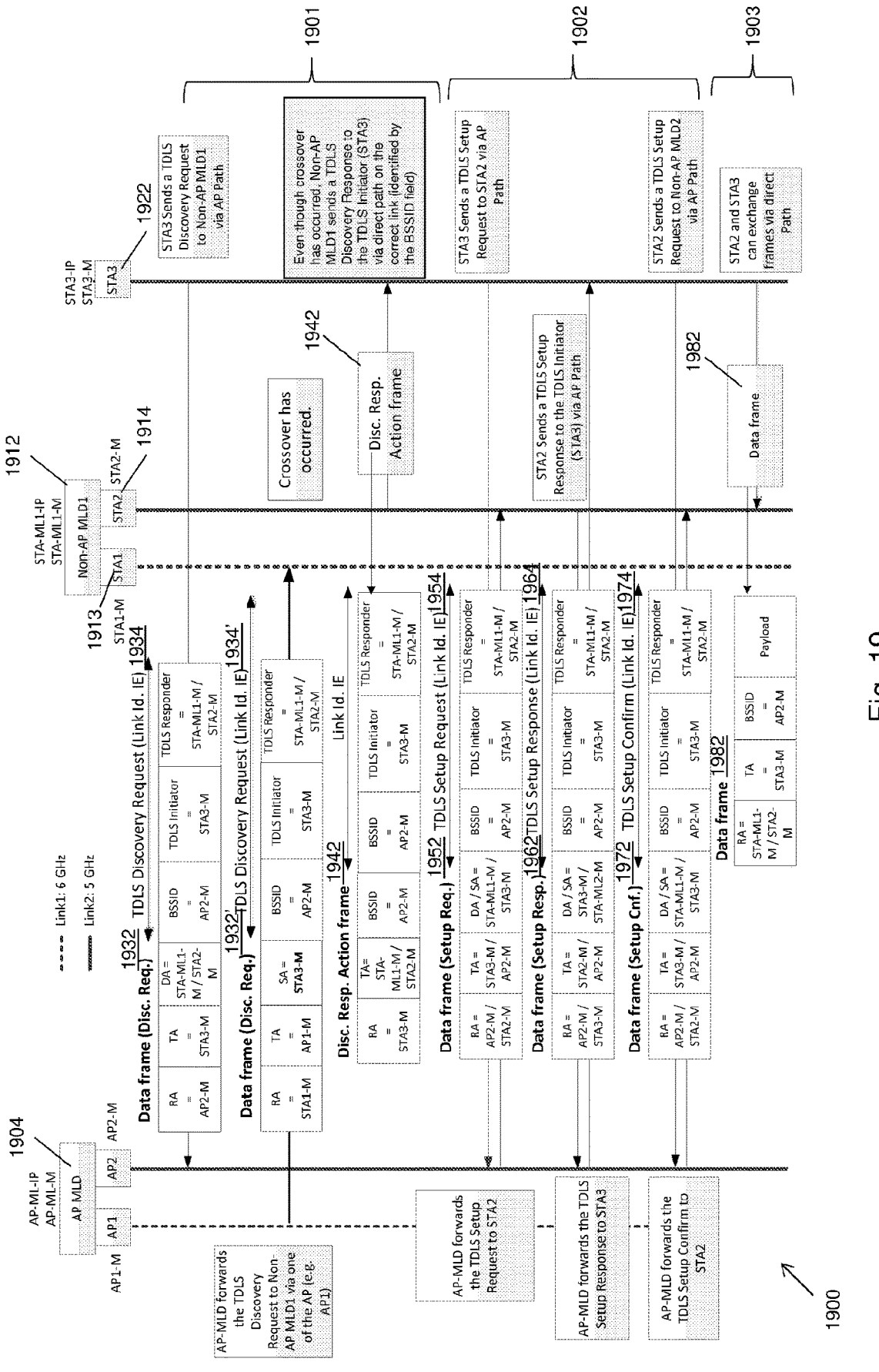
FIG. 19 depicts a flow chart illustrating communications between a non-AP MLD and a non-MLD STA (STA3) via a non-MLD AP for multi-link peer-to-peer communication according to yet another embodiment of the present disclosure.

FIG. 19 depicts a flow chart 1900 illustrating communications between a non-AP MLD 1912 and a non-MLD STA (STA3) 1922 via a non-MLD AP 1904 for multi-link peer-to-peer communication according to yet another embodiment of the present disclosure following Option 2 described above. The communications can be divided into discovery phase 1901, setup phase 1902 and direct link communication 1903. Note that, unlike all embodiments shown in the present disclosure, all address fields, especially in TDLS Responder field, expressed in FIG. 19 using two addresses separated with a dash (e.g. A/B) mean either one of the two addresses (A or B) is used for the address fields, based on the legacy STA's knowledge of the non-AP MLD's MAC Address. The non-AP MLD's MLD MAC Address is used if the legacy STA identifies the non-AP MLD by it's MLD MAC Address, else the MAC Address of the STA affiliated with the non-AP MLD that operates in the same link as the legacy STA is used.

In the discovery phase 1901, STA3 1922 may initiate a TDLS Discovery by transmitting a data frame 1932 carrying a TDLS Discovery Request 1934 to non-AP MLD1 1912 via AP MLD 1904. The data frame 1932 comprises a DA field set to either non-AP MLD1's MLD MAC address (STA-ML1-M) or STA2's MAC address (STA2-M). The TDLS Discovery Request 1934 comprises a TDLS Initiator field set to STA3's MAC address (STA3-M) and a TDLS Responder field set to either non-AP MLD1's MLD MAC address or STA2's MAC address.

AP MLD 1904, which receives the data frame 1932, identifies that the TDLS Discovery Request 1934 carried in the data frame 1932 is directed to either non-AP MLD or STA2 based on the MAC address in the DA field, and forwards the data frame 1932' carrying the TDLS Discovery Request 1934' received from STA3 1922 to STA 1914 if STA2's MAC address is used, or one of the affiliated STA of non-AP MLD1 1912, if non-AP MLD's MAC address is included, for example in this embodiment STA1 1913, and thus a crossover to Link 1 has occurred. AP MLD 1904 sets the STA1's MAC address (STA1-M) in the RA field when forwarding the Data frame 1932' to STA1 1913. As such, the data frame will be correctly received by STA1 1913.

Non-AP MLD 1912, which receives the TDLS Discovery Request 1934', may transmit a TDLS Discovery Response Action frame 1942 back to STA3 1922 on a direct link. In this case, even though crossover has occurred, non-AP MLD1 send the TDLS Discovery Response 1942 to the TDLS initiator STA3 1922 via direct path on the correct link (Link 2) identified by the BSSID field using STA2 1914.

Importantly, non-AP MLD 1912 sets the TA field of the TDLS Discovery Response Action frame 1942 to be the same as that included in the TDLS Responder field.

Non-AP MLD 1912 also sets the RA field of the TDLS Discovery Response Action frame 1942 to STA3's MAC address (STA3-M). As such, this leads to the frames such as the TDLS Discovery Response Action frame 1942 sent by STA2 1914 to STA3 1922 on a direct link to be correctly received via STA3 1922. The STA or MLD MAC address in TA field of the TDLS Discovery Response Action frame 1942 (which is also as that included in the TDLS Responder field) will be also be used to set the RA field of data frame transmitted in the direct link communication 1903. Since the TA field and the TDLS Responder field carry the same address (either the MLD MAC Address of STA MAC Address), the TDLS Responder frame will not be rejected by STA3 1922.

In the subsequent setup phase 1902, STA3 1922 may initiate a TDLS Setup with non-AP MLD 1912 via AP MLD 1904 by transmitting a further data frame 1952 carrying a TDLS Setup Request 1954 from STA3 1922 to non-AP MLD 1922 via AP MLD 1904. The data frame 1932 comprises a DA field set to non-AP MLD1's MLD MAC address (STA-ML1-M). The TDLS Setup Request 1954 comprises a TDLS Initiator field set to STA3's MAC address (STA3-M) and a TDLS Responder field set to either non-AP MLD1's MLD MAC address or STA2's MAC address.

AP MLD 1904 identifies that the further data frame 1952 is directed to non-AP MLD1 1912 based on the MLD MAC address in the DA field, and forward the further data frame 1952 to one of the affiliated STAs of non-AP MLD1 1912, for example in this embodiment STA2 1914. AP MLD 1904 also sets the RA field to the STA2's MAC address (STA2-M) when forwarding the data frame 1952 to STA2 1914. As such, the data frame 1952 is correctly received by STA2 1914.

Non-AP MLD 1912, which receives the TDLS Setup Request 1954, may, in response, transmit another data frame 1962 carrying a TDLS Setup Response 1964 back to STA3 1922, i.e. the TDLS Initiator, via AP MLD 1904. The data frame comprises a DA field set to STA3's MAC address (STA3-M). The TDLS Setup Response 1964 comprise a TDLS Initiator field and TDLS Responder field, both set to the MAC addresses same as that of the TDLS Setup Request 1954 respectively.

AP MLD 1904, which receives the data frame 1962, identifies that the TDLS Setup Response 1964 carried in the data frame 1962 is directed to STA3 1922 based on STA3's MAC address in the DA field, and forwards the data frame 1962 to STA3 1922. AP MLD 1904 also sets the STA3's MAC address (STA3-M) in the RA field when forwarding the Data frame 1962 to STA3 1922. As such, the data frame will be correctly received by STA3 1922.

Subsequently, STA3 1922 transmit a data frame 1972 comprising a TDLS Setup Confirm 1974 to non-AP MLD1 1812 via AP MLD 1904. The data frame 1972 comprises a DA field set to non-AP MLD1's MAC address (STA-ML1-M). The TDLS Setup Confirm 1974 comprises a TDLS Initiator field and TDLS Responder field, both set to the same MAC addresses as that of the TDLS Setup Request 1954 respectively.

AP MLD 1904 identifies that the data frame 1972 is directed to non-AP MLD1 1912 based on the MLD MAC address in the DA field, and forward the data frame 1972 to one of the affiliated STAs of non-AP MLD1 1912, for example in this embodiment STA2 1914. AP MLD 1904 also sets the RA field to the STA2's MAC address (STA2-M) when forwarding the data frame 1972 to STA2 1914. As such, the data frame 1972 is correctly received by STA2 1914 and the setup phase is complete.

Once TDLS setup between non-AP MLD1 1912 and STA3 has been completed, STA2 1914 non-AP MLD1 1912 and STA3 1922 are able to perform direct peer-to-peer communication with each other and transmit data frames 1982 in the common operating link (Link 2) via direct path. The RA of such data frames 1982 is set as the same MLD or STA MAC address as that in TA field of the TDLS Discovery Response Action frame 1942 (which is same as that included in the TDLS Responder field).

Figure 20:
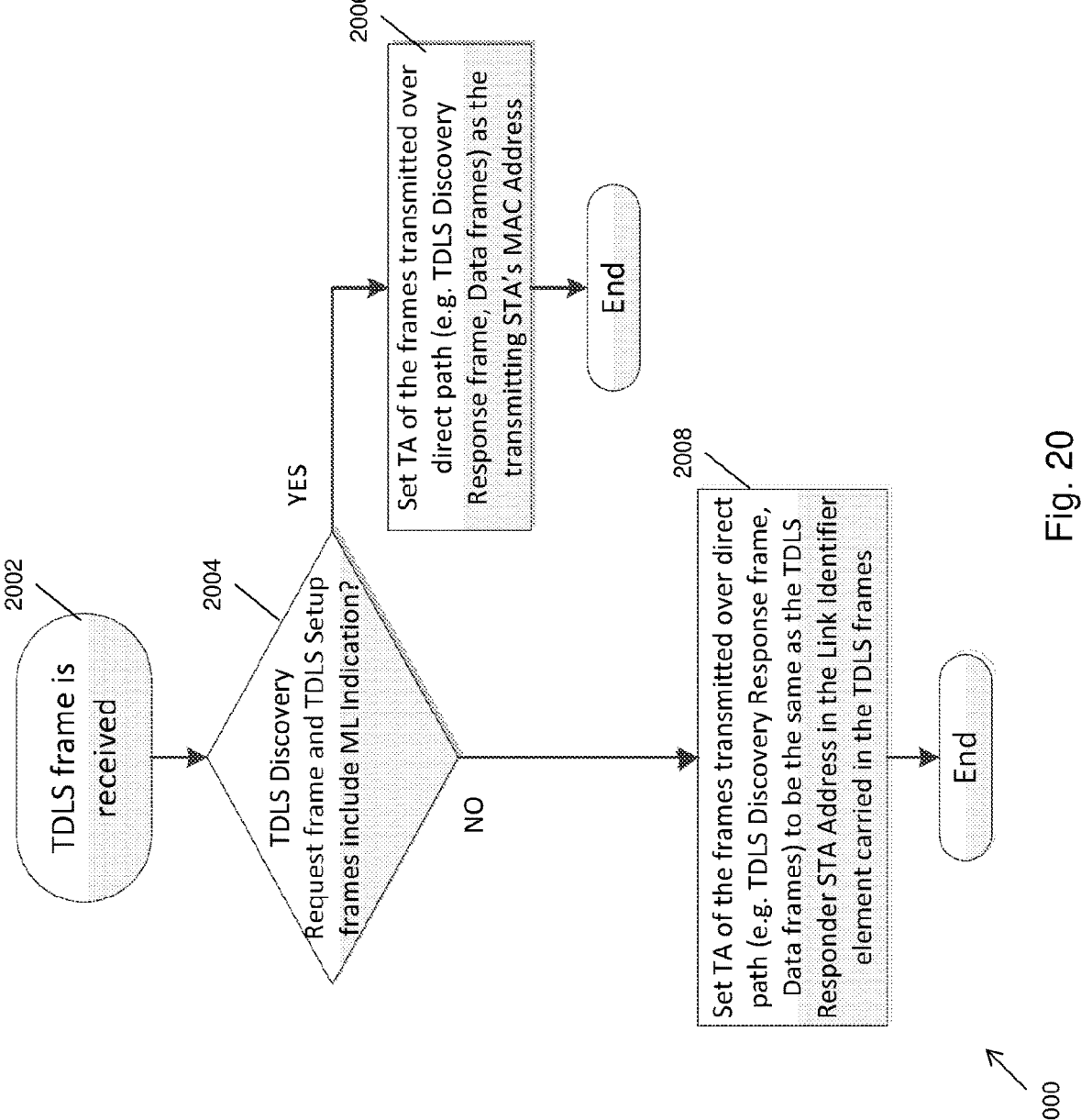
FIG. 20 depicts a flow chart illustrating an address setting process for an MLD according to an embodiment of the present disclosure.

FIG. 20 depicts a flow chart 2000 illustrating an address setting process for an MLD that is a TDLS responding STA according to an embodiment of the present disclosure. In step 2002, a TDLS frame is received. In step 2004, it is determined if the received TDLS frame is a TDLS Discovery Request frame or a TDLS Setup frame and whether the TDLS Discovery Request frame or the TDLS Setup frame includes an ML indication. If Yes, step 2006 is carried out; otherwise step 2008 is carried out. In step 2006, a step of setting TA of the frames, e.g. TDLS Discovery Response frame, Data frames, transmitted by the TDLS responding STA over direct path, as the transmitting STA's MAC address is performed. In step 2008, a step of setting TA of the frames transmitted by the TDLS responding STA over direct path to be the same as the address carried in the TDLS Responder STA Address field in the Link Identifier element carried in the TDLS frames. The address setting process after carrying out step 2006 or 2008 may then end. Alternatively, it is also possible that a TDLS responding STA always sets the TA of the frames transmitted by the TDLS responding STA over direct path to be the same as the address carried in the TDLS Responder STA Address field in the Link Identifier element carried in the TDLS frames.

Figure 21:
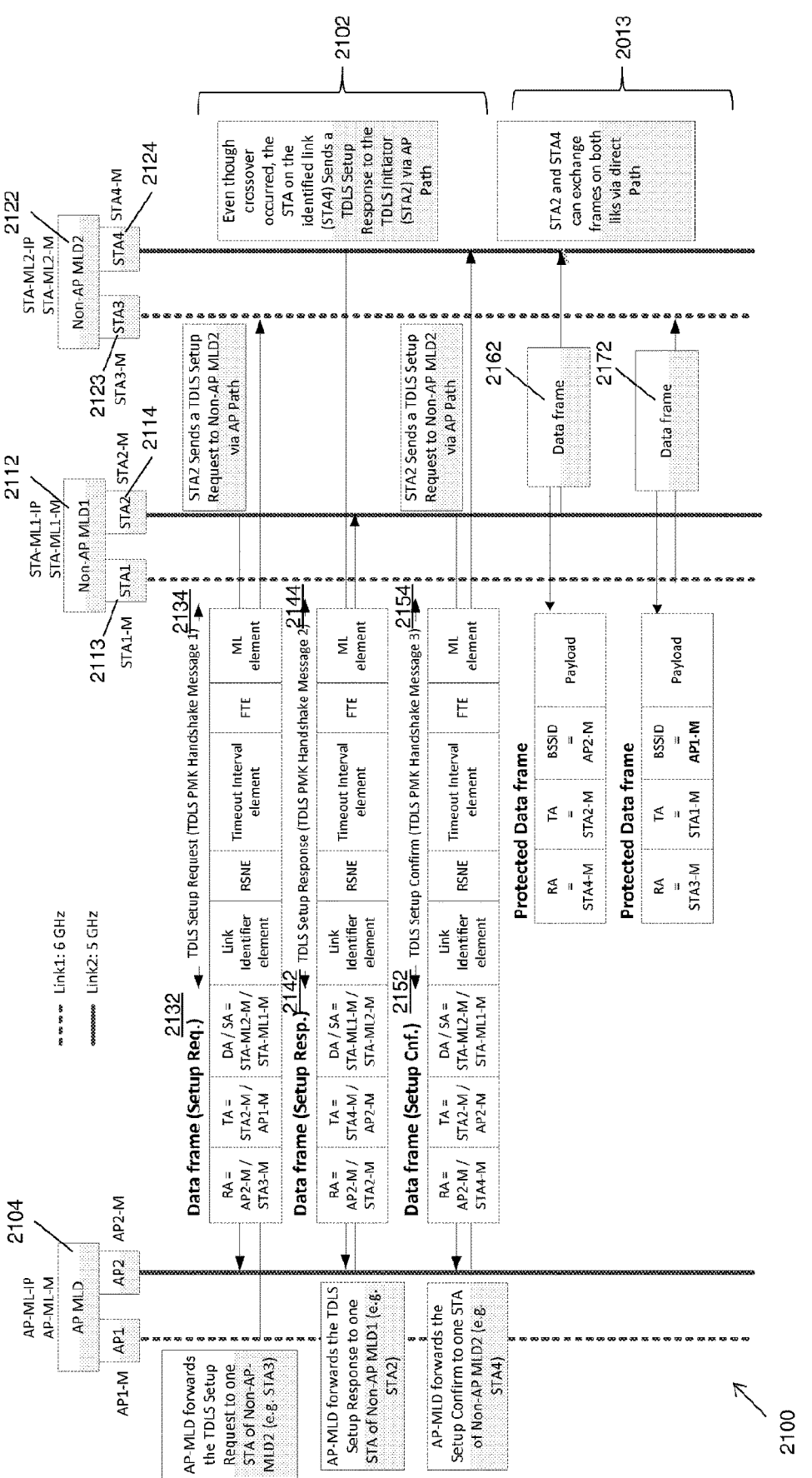
FIG. 21 depicts a flow chart illustrating communications between two non-AP MLDs via a non-MLD AP for multi-link peer-to-peer communication according to an embodiment of the present disclosure.

According to an embodiment of the present disclosure, 3-way TDLS PeerKey (TPK) handshake protocol performed over the TLDS setup phase is used to derive the security key (TPK) which is used for providing confidentiality and authentication of the frame exchanged over all the direct links. FIG. 21 depicts a flow chart 2100 illustrating communications between two non-AP MLDs 2112, 2122 via a non-MLD AP 2104 for multi-link peer-to-peer communication according to an embodiment of the present disclosure. This embodiment illustrates TPK setup phase 2102 and direct link communication 2103.

In the TPK setup phase 2102, non-AP MLD1 2112 may initiate a TPK Setup with non-AP MLD2 2122 via AP MLD 2104 by transmitting a data frame 2132 carrying a TDLS Setup Request (in turn carrying TDLS pairwise master key (PMK) handshake message 1) 2134 from STA2 2114 to non-AP MLD2 2122 via AP MLD 2104. The data frame 2132 comprises DA field set to non-AP MLD2's MLD MAC address (STA-ML2-M). The TDLS Setup Request 2134 comprises a Link Identifier Element and a Fast BSS Transition Element (FTE) as well as an ML element that includes information of non-AP MLD1 and its affiliated STAs operating on the one or more links requested for ML-TDLS.

AP MLD 2104 identifies that the data frame 2132 is directed to its associated non-AP MLD2 2122 based on the non-AP MLD2's MAC address in the DA field, and forward the data frame 2132 to one of the affiliated STAs of non-AP MLD2 2122, for example in this embodiment STA3 2123. AP MLD 2104 also sets the RA field to the STA3's MAC address (STA3-M) when forwarding the data frame 2132 to STA3 2113. As such, the data frame 2132 is correctly received by STA3 2123.

Even though a crossover from Link 2 to Link 1 has occurred, non-AP MLD2 2122, which receives the TDLS Setup Request 2134, may, in response, transmit another data frame 2142 carrying a TDLS Setup Response (in turn carrying TDLS PMK handshake message 2) 2144 back to non-AP MLD1 2112 via AP MLD 2104. The TDLS Setup Response 2144 comprise a DA field set to non-AP MLD1's MAC address (STA-ML1-M). The TDLS Setup Response 2144 comprises a Link Identifier Element and a Fast BSS Transition Element (FTE) as well as an ML element that includes information of non-AP MLD2 and its affiliated STAs operating on the one or more links agreed for ML-TDLS.

AP MLD 1604, which receives the data frame 2142, identifies that the TDLS Setup Response 2144 carried in the data frame 2142 is directed to non-AP MLD1 2112, and forwards the data frame 2142 to one of the affiliated STAs of non-AP ML1 2112, for example in this embodiment STA2 2114. AP MLD 2104 also sets the STA2's MAC address (STA2-M) in the RA field when forwarding the Data frame 2142 to STA2 2114 As such, the data frame will be correctly received by STA2 2114.

Subsequently, STA2 2114 transmit a data frame 2152 comprising a TDLS Setup Confirm (in turn carrying TDLS PMK handshake message 3) 2154 to non-AP MLD2 2122 via AP MLD 2104. The data frame 2152 comprises a DA field set to non-AP MLD2's MAC address (STA-ML2-M). The TDLS Setup Confirm 2154 comprises a Link Identifier Element and a Fast BSS Transition Element (FTE) as well as an ML element that includes information of non-AP MLD1 and its affiliated STAs operating on the one or more links confirmed for ML-TDLS.

AP MLD 2104 identifies that the data frame 2152 is directed to non-AP MLD2 2122 based on the MAC address in the DA field, and forward the data frame 2152 to one of the affiliated STAs of non-AP MLD2 2122, for example in this embodiment STA4 2124. AP MLD 2104 also sets the RA field to the STA4's MAC address (STA4-M) when forwarding the data frame 2151 to STA4 2124. As such, the data frame 2152 is correctly received by STA4 2124 and the setup phase is complete.

Once TDLS setup between non-AP MLD1 2112 and non-AP MLD2 2122 has been completed, any two STAs from non-AP MLD1 2112 and non-AP MLD2 2122 respectively are able to perform direct multi-link peer-to-peer communication with each other and transmit data frames in Link 1 and Link 2 via direct path. For example, STA2 and STA4 as well as STA1 and STA3 can exchange data frames 2162 and 2172 on both Link 2 and Link 1 respectively via direct path.

Figures 22A, 22B:
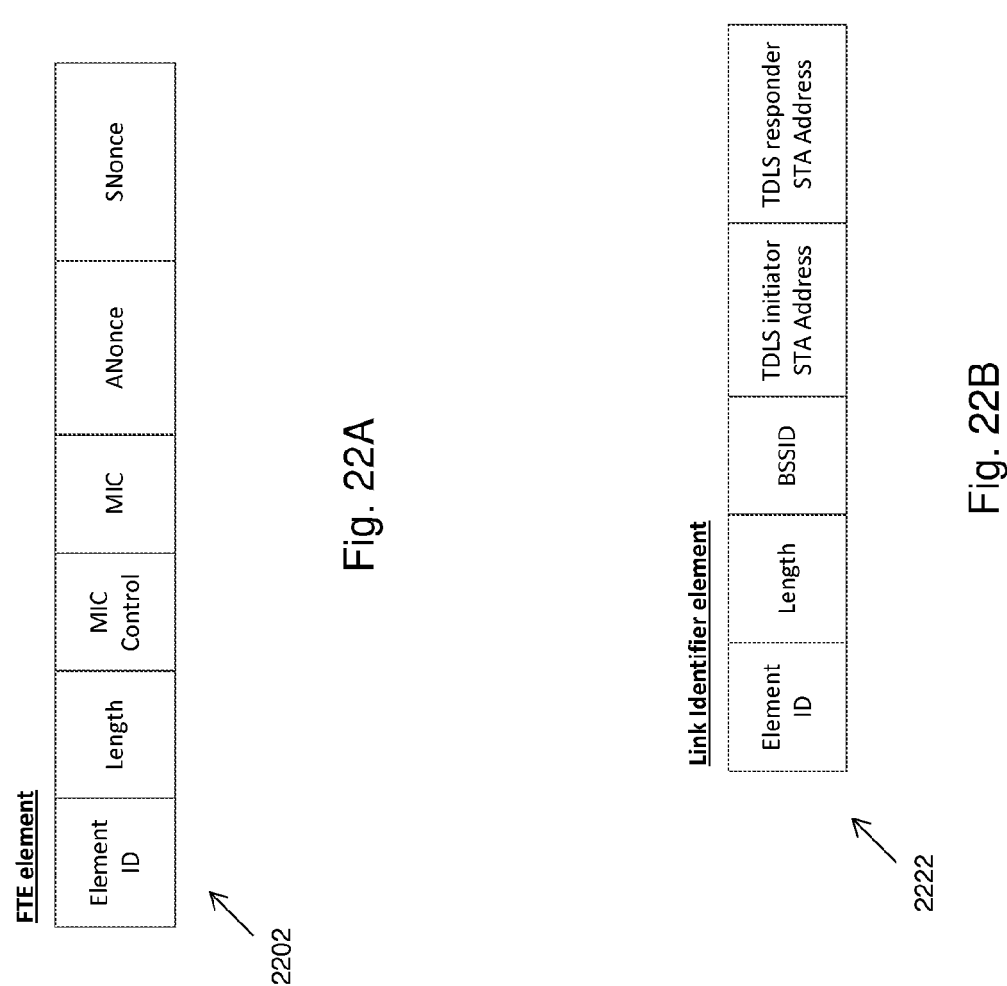
FIG. 22A depicts an example format of a Fast BSS Transition (FTE) element.
FIG. 22B depicts an example format of a Link Identifier Element.

FIG. 22A depicts an example format of an FTE 2202. The FTE 2202 comprises an Element ID field, a Length field, a Message Integrity Code (MIC) Control field, an MIC field, an Anonce field and a SNonce field. The TPK derivation is shown in the following equations:

$$\text{TPK-Key-Input} = \text{Hash}(\min(\text{SNonce,ANonce})\|\max(\text{SNonce,ANonce})) \quad \text{(Equation 1)}$$

$$\text{TPK} = \text{KDF-Hash-Length}(\text{TPK-Key-Input,“TDLS PMK”},\min(\text{MAC\_}I,\text{MAC\_}R)\|\max(\text{MAC\_}I,\text{MAC\_}R)\|\text{BSSID}) \quad \text{(Equation 2)}$$

$$\text{TPK-KCK} = L(\text{TPK},0,128) \quad \text{(Equation 3)}$$

$$\text{TPK-TK} = L(\text{TPK},128,\text{Length}-128) \quad \text{(Equation 4)}$$

where BSSID, MAC_I and MAC_R are the values of the BSSID, TDLS Initiator STA Address field and the TDLS Responder STA Address fields of the Link Identifier Element carried in the TDLS Setup frames respectively. This is regardless of whether the Link Identifier element carries the MLD MAC address or the affiliated STA's MAC address.

In an embodiment, key confirmation key (KCK) is used to provide data origin authenticity in TDLS Setup Response and TDLS Setup Confirm frames while the same TPK-TK is used to provide confidentiality for all protected frames transmitted over all the direct links.

FIG. 22B depicts an example format of a Link Identifier Element 2222. The Link Identifier Element 2222 comprises an Element ID field, a Length field, a BSSID field, a TDLS Initiator STA Address field and a TDLS Responder STA Address field.

During the Message Integrity Code (MIC) calculation for the TPK handshake messages 2 and 3, i.e. Setup Response and Setup Confirm, the values of the TDLS Initiator STA Address field and the TDLS Responder STA Address field of the Link Identifier element carried in the TDLS Setup frames are used as the TDLS Initiator STA MAC address and TDLS Responder STA MAC address respectively, regardless of whether the Link Identifier element carries the MLD MAC address or the affiliated STA's MAC address. The MIC shall be calculated on the concatenation, in the following order, of:

TDLS initiator STA MAC address (6 octets)

TDLS responder STA MAC address (6 octets)

Transaction Sequence number (1 octet) which shall be set to the value 2 or 3

Link Identifier element

RSNE

Timeout Interval element

FTE, with the MIC field of the FTE set to 0.

ML element (if an ML element is included in the TDLS Setup frames).

Importantly, ML element is included in the MIC calculation. In one embodiment, the above MIC calculation is performed using TPK-KCK and AES-128-CMAC algorithm.

According to the present disclosure, in ML-TDLS direct link communication, the BlockAck agreement negotiated between two non-AP MLDs for a traffic identifier (TID), over any one direct link, shall be applicable to all direct links between the two non-AP MLDs. In other words, common multi-link features supported by both non-AP MLDs are available all direct links, such common multi-link features including multi-link BlockAck cross link retransmission of frames, MLD MAC address based Additional Authentication Data (ADD) and Nonce construction during an encapsulation or a decapsulation of frames under a Counter Mode with Cipher Block Chaining Message Authentication Code Protocol (CCMP) or a Galois/Counter Mode Protocol (GCMP).

The same sequence number space and Packet Number (PN) space shall be used for frames of the TID exchanged over any of the direct links. Retransmission of failed frames may also occur over any direct link. The same PN is also used when a protected frame is retransmitted on a different direct link.

Figure 23A:
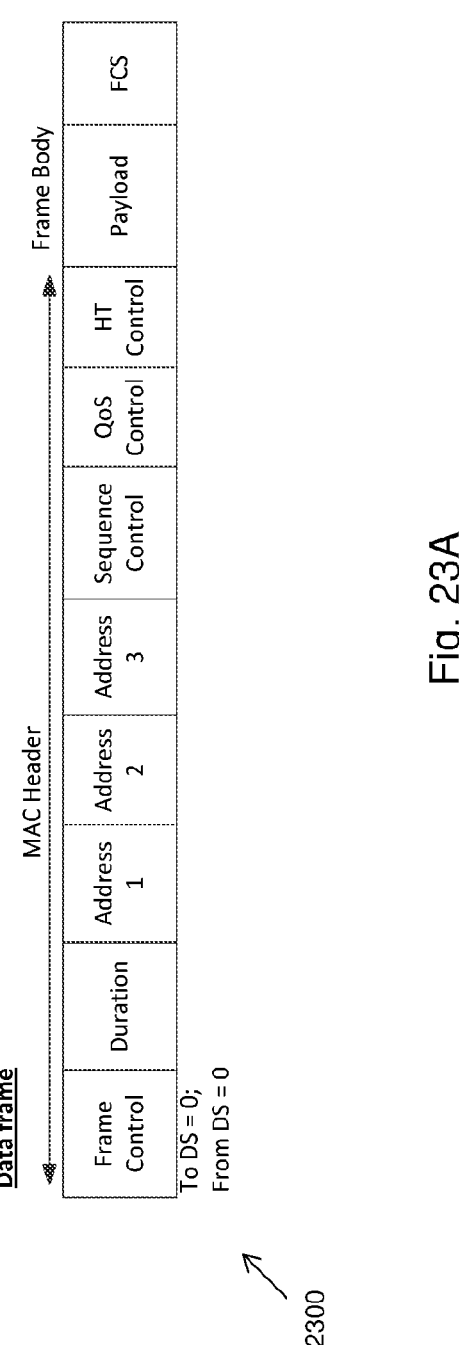
FIG. 23A depicts an example format of data frame transmitted over a direct link between two non-AP MLDs.

FIG. 23 depicts an example format of data frame 2300 transmitted over a direct link between two non-AP MLDs. The data frame 2300 comprises a Frame Control field, a Duration field, an Address 1 field, an Address 2 field, an Address 3 field, a Sequence Control field, a QoS Control field, a HT field, a Payload field and an FCS. The Frame Control field, the Duration field, the Address 1 field, the Address 2 field, the Address 3 field, the Sequence Control, the QOS Control field and the HT Control field may be grouped as MAC header; and the Payload field is the Frame Body. The Frame Control field comprises a To DS field and a From DS field, both set to 0.

Figure 23C:
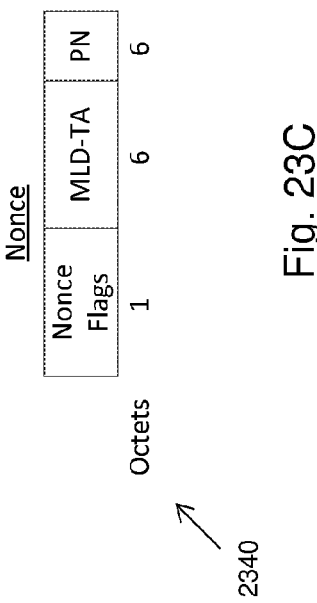
FIG. 23C depicts an example MLD MAC address based Nonce construction 2340 used for encapsulation or decapsulation of frames under a counter mode with CCMP or GCMP.
Figure 23B:
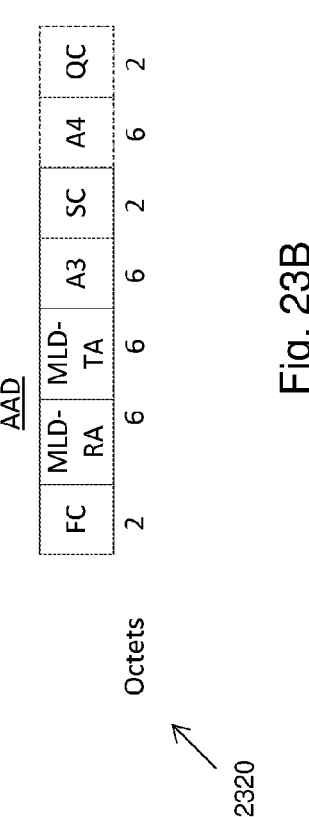
FIG. 23B depicts an example MLD MAC address based ADD construction used for encapsulation or decapsulation of frames under a counter mode with Cipher Block Chaining Message Authentication Code Protocol (CCMP) or a Galois/Counter Mode Protocol (GCMP).

FIG. 23B depicts an example MLD MAC address based ADD construction 2320 used for encapsulation or decapsulation of frames under a counter mode with CCMP or GCMP. The ADD comprises a total of 30 octets. The ADD comprises Frame Control (FC) field (2 octets), an MLD-RA field (6 octets), an MLD-TA field (6 octets), Address 3 (A3) field (6 octets), a Sequence Control (SC) field (2 octets), Address 4 (A4) field (6 octets) and a QOS Control (QC) field (2 octets). Importantly, the MLD MAC Addresses of the receiving MLD and the transmitting MLD are used in the A1, A2 fields of the AAD respectively instead of the A1, A2 fields of the frames.

FIG. 23C depicts an example MLD MAC address based Nonce construction 2340 used for encapsulation or decapsulation of frames under a counter mode with CCMP or GCMP. The Nonce comprises a total of 13 octets. The Nonce comprises a Nonce Flags (1 octet), an MLD-TA field (6 octets) and a PN field (6 octets). Importantly, the MLD MAC Addresses of the transmitting MLD is used in the A2 field of the Nonce instead of the A2 fields of the frames.

The rules for ADD and Nonce calculation during CCMP/GCMP encapsulation/decapsulation for data frames 2300 exchanged between two non-AP MLDs over the direct link are as follows:

a) The MLD MAC address of the recipient MLD is used as the A1 field for the AAD construction.

b) The MLD MAC address of the transmitting MLD is used as the A2 field for the AAD and Nonce construction.

c) If the non-AP MLDs are associated with an AP MLD, the MLD MAC Address of the AP MLD is used as the A3 field for the AAD construction. Otherwise, the Address 3 field of the protected frame is used for A3.

Alternative, the addresses carried in the TDLS Initiator STA Address field, the TDLS Responder Address field and the BSSID field of the Link Identifier Element carried in the TDLS Setup frames may be used instead in the AAD and Nonce construction.

In an embodiment, a multi-link feature such as ML-TDLS link switching is available. A non-AP MLD may request its peer non-AP MLD to switch an existing direct link to another link if the peer MLD has indicated it supports TDLS Link Switching, e.g. with TDLS Link Switching Supported field set to "1" or "True". The TDLS Channel Switch Request/Response frame may be repurposed for TDLS Link Switching. The frames are encapsulated in Data frames and transmitted on the current direct link. Alternatively, new frames, e.g. TDLS Link Switching Request/Response frames may be defined for this purpose.

Figure 24:
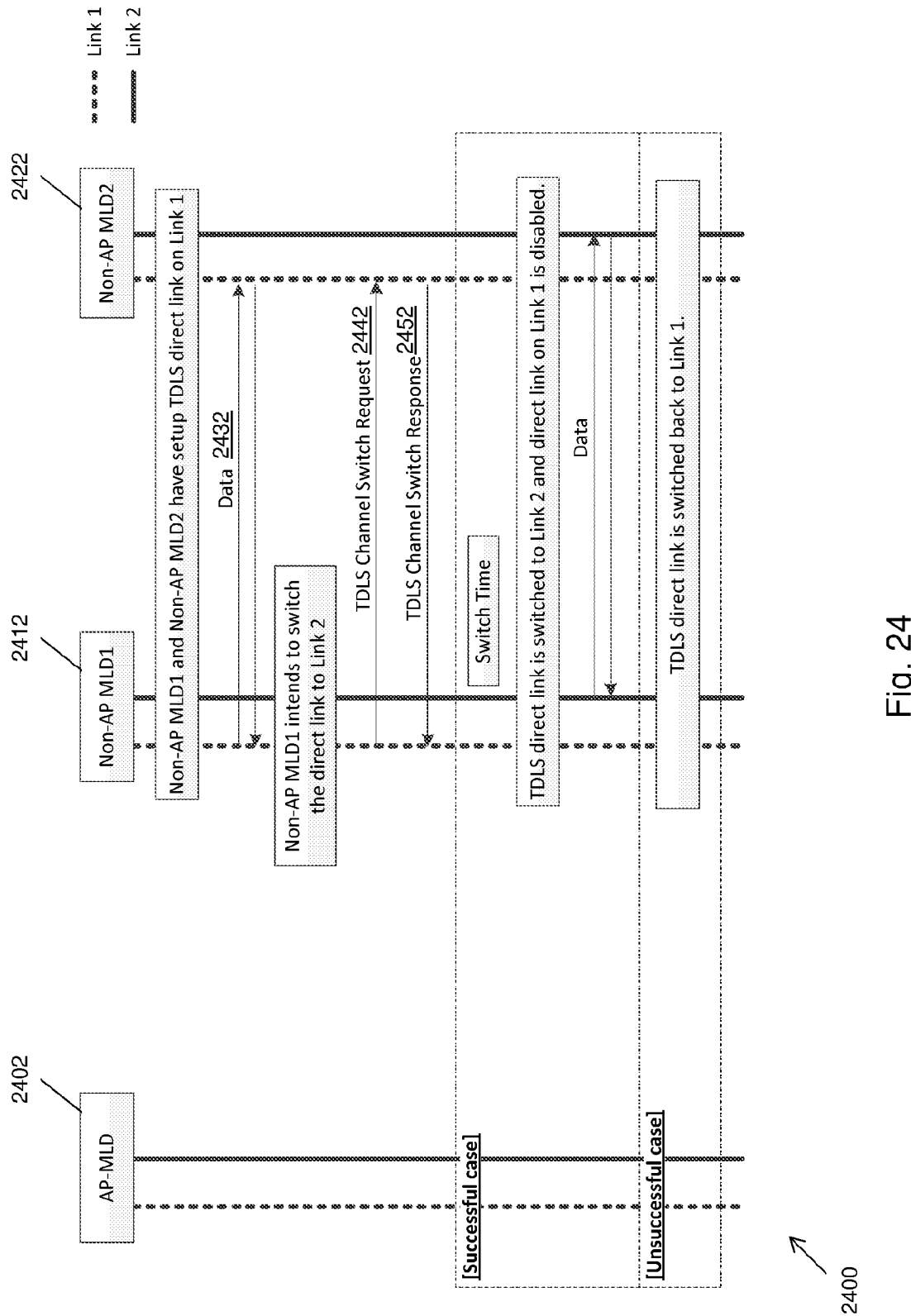
FIG. 24 depicts a flow chart illustrating multi-link peer-to-peer communications between two non-AP MLDs associated with an AP MLD according to an embodiment of the present disclosure.

FIG. 24 depicts a flow chart 2400 illustrating multi-link peer-to-peer communications between two non-AP MLDs 2412, 2422 associated with an AP MLD 2402 according to an embodiment of the present disclosure. It is assumed that non-AP MLD1 2412 has setup TDLS direct link with non-AP MLD2 2422 on Link 1 and data frames 2432 are transmitted between the two non-AP MLDs 2412, 2422 on Link 1. Non-AP MLD1 2412 may intend to switch its direct link (on Link 1) with non-AP MLD2 2422 by transmitting a TDLS Channel Switch Request 2442 to non-AP MLD2 2422 on the current direct link (Link 1). In one embodiment, non-AP MLD1 2412 has determined that non-AP MLD2 2422 supports TDLS Link Switching based on the indication in TDLS Link Switching Supported field in TDLS Discovery Response transmitted by non-AP MLD2 2422. Non-AP MLD2 2422, which receives such request 2442, may in response transmit a TDLS Channel Switch Response 2452 back to non-AP MLD2 2422 on the current direct link.

In one case, if the link switching is successful, after a switch time, the TDLS direct link will then be switched from Link 1 to Link 2 and the direct link on Link 1 will be disabled. On the other hand, if the link switching is unsuccessful, the TDLS direct link between the two non-AP MLDs 2412, 2422 remain on Link 1.

Figure 25:
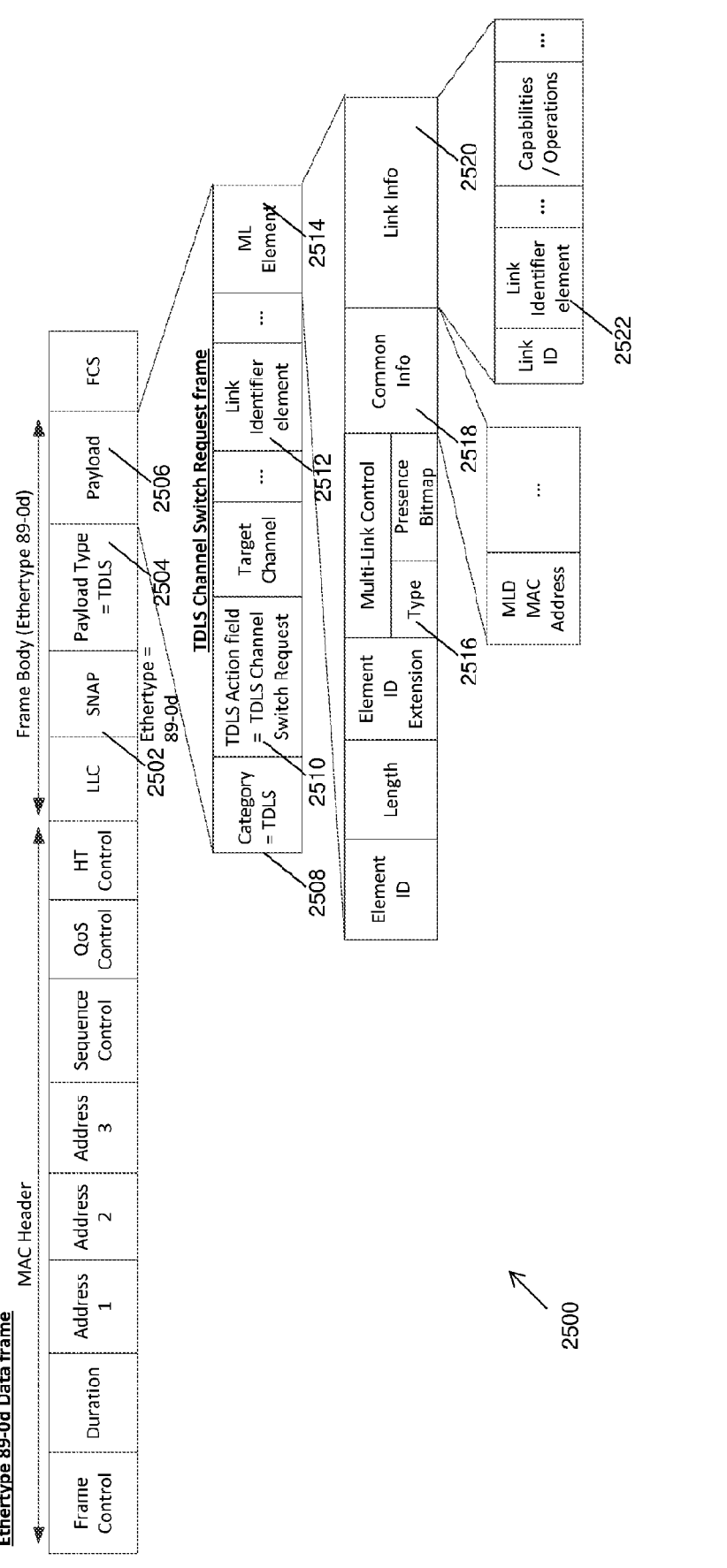
FIG. 25 shows an example format of an Ethertype 89-0d data frame used to carry a TDLS Channel Switch Request frame according to an embodiment of the present disclosure.

An encapsulated data frame (e.g. Ethertype 89-0d Data frame carrying TDLS payload) may be used as a TDLS Channel Switch Request frame. FIG. 25 shows an example format of an Ethertype 89-0d data frame 2500 used to carry a TDLS Channel Switch Request frame according to an embodiment of the present disclosure.

The Ethertype 89-0d data frame 2500 comprises a Frame Control field, a Duration field, an Address 1 field, an Address 2 field, an Address 3 field, a Sequence Control field, a QoS Control field, a HT field, a LLC field, a SNAP field 2502, a Payload Type field 2504, a Payload field 2506 and a FCS. The Frame Control field, the Duration field, the Address 1 field, the Address 2 field, the Address 3 field, the Sequence Control, the QOS Control field and the HT Control field may be grouped as MAC header; and the LLC field, the SNAP field 2502, the Payload Type field 2504 and the Payload field 2506 may be grouped as Frame Body. The SNAP field 2502 is set to an Ethertype of 89-0d, and the Payload Type field 2504 is set to correspond to a TDLS. The Payload field 2506 comprises a Category field 2508, a TDLS Action field 2510, a Target Channel field, a Link Identifier Element 2512 an ML Element 2514. The Category field 2508 is set to correspond to a TDLS. The TDLS Action field 2510 is set to correspond to a TLDS Channel Switch Request. The Link Identifier Element 2512 indicates the current link. The ML element 2514 comprises an Element ID subfield, a Length subfield, an Element ID Extension subfield, a Multi-Link Control subfield comprising a Type field 2516 and a Presence Bitmap field, a Common Info field 2518 and Link Info field 2520.

The Type field 2516 is set to correspond to a TDLS. The Common Info field 2518 comprises an MLD MAC Address subfield set to correspond to the transmitting non-AP MLD's MLD MAC address. The Link Info fields 2520 comprises a Link ID subfield, a Link Identifier Element subfield 2522 and a Capabilities/Operations subfield. The Link Identifier Element subfield 2522 indicates the target link to which the MLD intends to switch. Alternatively, the Link Identifier Element subfield 2522 may be absent and the Link ID field indicates the target link.

Figure 26:
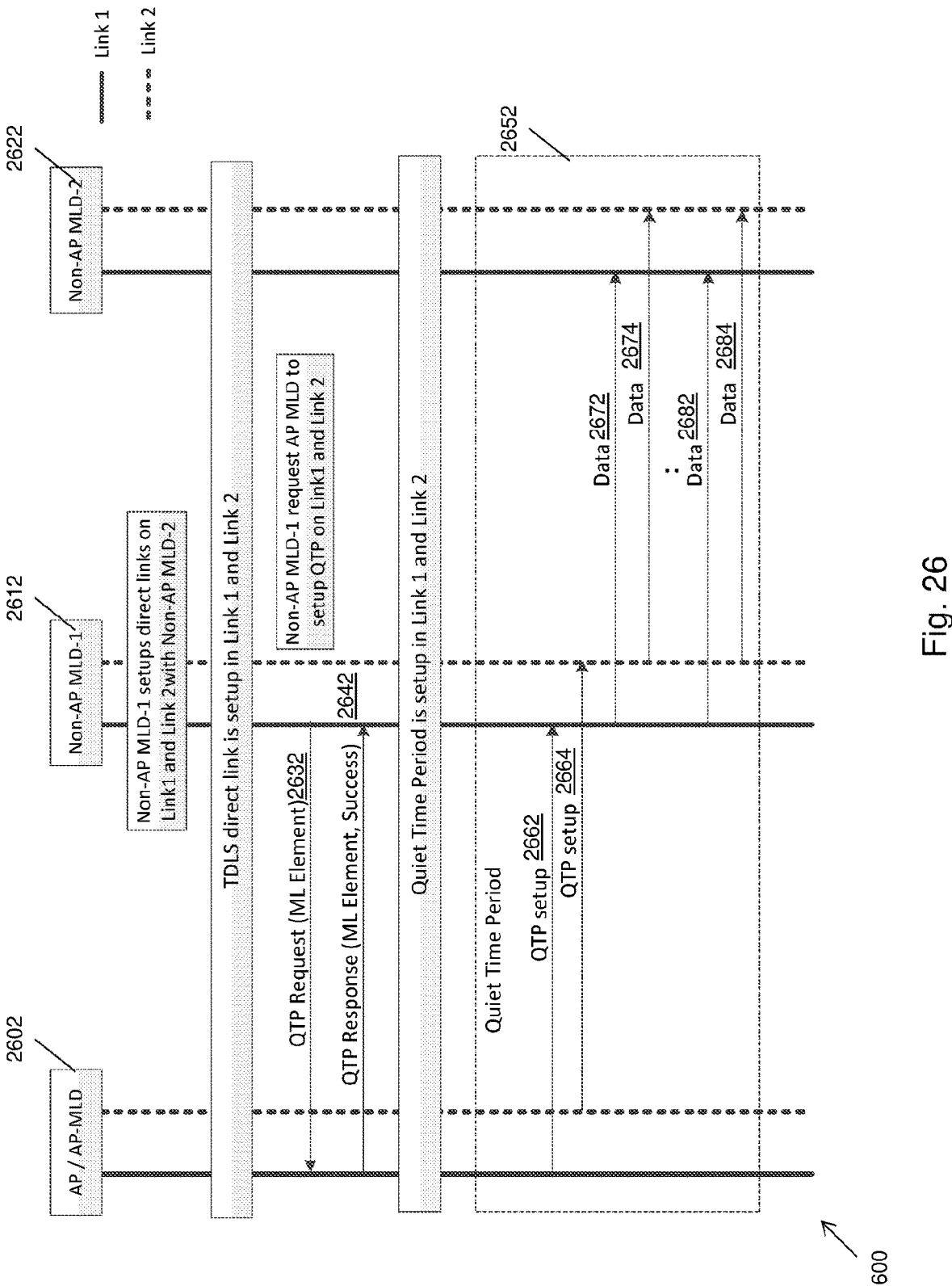
FIG. 26 depicts a flow chart illustrating setup of Quiet time period for multi-link peer-to-peer communications between two non-AP MLDs associated with an AP/AP MLD according to an embodiment of the present disclosure.

According to the present disclosure, a non-AP MLD may request AP or AP MLD to setup Quiet Time Periods (QTPs) on multiple links via a single request on one link. FIG. 26 depicts a flow chart 2600 illustrating multi-link peer-to-peer communications between two non-AP MLDs 2612, 2622 associated with an AP/AP MLD 2602 according to an embodiment of the present disclosure. It is assumed that non-AP MLD1 2612 has setup TDLS direct links with non-AP MLD2 2622 on Link 1 and Link 2. Non-AP MLD1 2612 may request AP/AP MLD 2602 to setup a quiet time period (QTP) on Link 1 and Link 2 by transmitting a QTP Request 2632 on Link 1, the QTP Request 2632 comprising an ML element. The ML element indicates the additional links (e.g. Link 2) supported by the MLD.

AP/AP MLD 2602, which receives the QTP Request 2632, may in response transmit a QTP Response 2642 indicating that the QTP Request is successful. As such, QTP feature is setup in Link 1 and Link 2. At the start of a QTP, AP/AP MLD 2602 may transmit QTP Setup frames 2662, 2664 on multiple links to protect the links for direct communication. Subsequently, non-AP MLD1 2612 now is able to transmit data frames 2672, 2674, 2682, 2684 to non-AP MLD2 2622 on both direct links, Link 1 and Link 2, within the QTP 2652.

Figure 27:
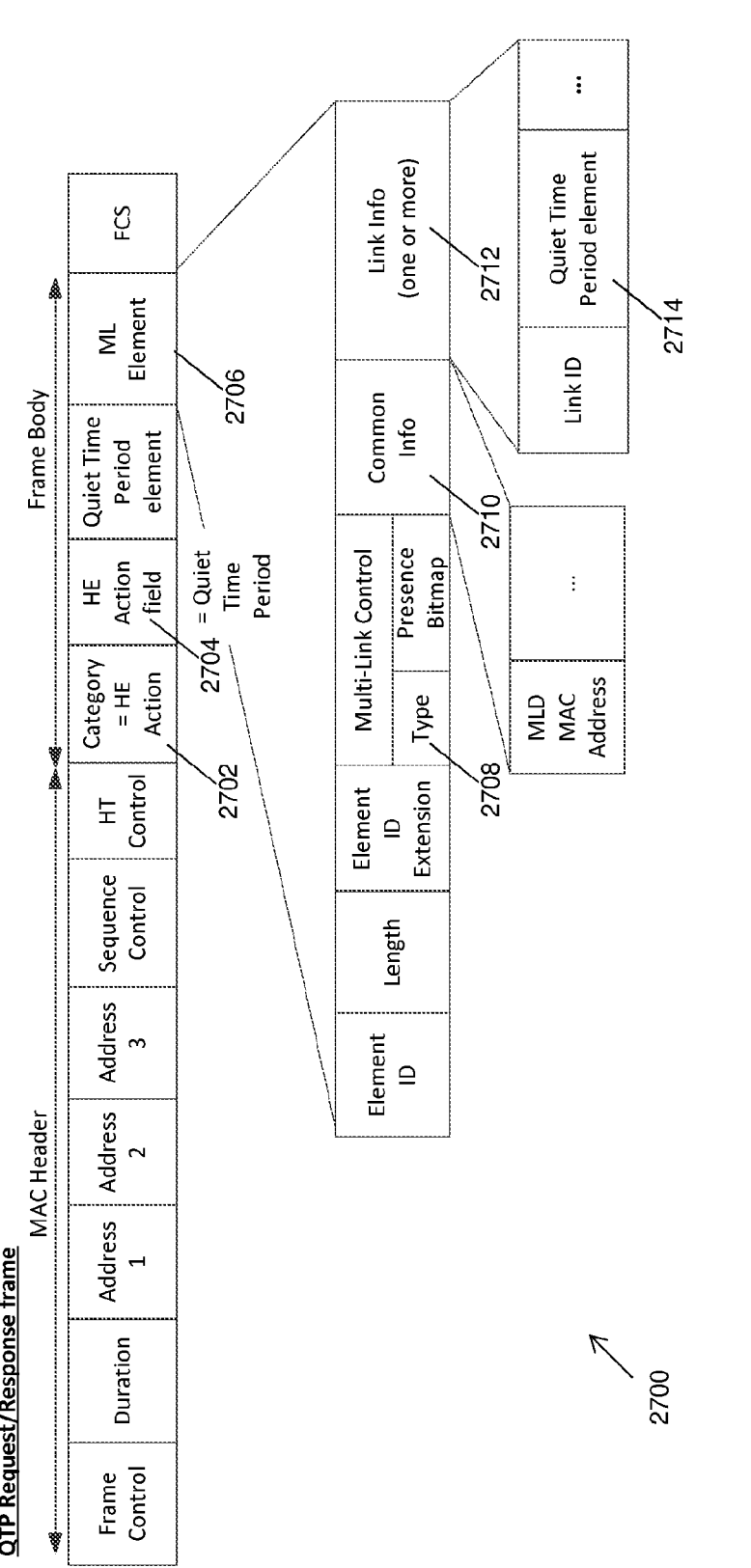
FIG. 27 shows an example format of a Quiet Time Period (QTP) Request/Response frame.

FIG. 27 shows an example format of a Quiet Time Period (QTP) Request/Response frame 2700. The QTP Request/Response frame 2700 comprises a Frame Control field, a Duration field, an Address 1 field, an Address 2 field, an Address 3 field, a Sequence Control field, a HT field, a Category field 2702, a HE Action field 2704, a QTP Element, an ML Element 2706 and a FCS. The Frame Control field, the Duration field, the Address 1 field, the Address 2 field, the Address 3 field, the Sequence Control and the HT Control field may be grouped as MAC header; and the Category field 2702, the HE Action field 2704, the QTP Element, the ML Element 2706 may be grouped as Frame Body. The Category field is 2702 is set to correspond to a HE action. The HE Action field 2704 is set to correspond to a QTP. The ML element 2706 comprises an Element ID subfield, a Length subfield, an Element ID Extension subfield, a Multi-Link Control subfield comprising a Type field

2708 and a Presence Bitmap field, a Common Info field 2710 and one or more Link Info fields 2712.

The Type field 2708 is set to correspond to a QTP. The Common Info field 2710 comprises an MLD MAC Address subfield set to correspond to the transmitting non-AP MLD's MLD MAC address. Each of the one or more Link Info fields 2712 comprises a Link ID subfield, a QTP Element 2714 which includes QTP parameters for other link identified by the Link ID in Link ID subfield.

Figure 28:
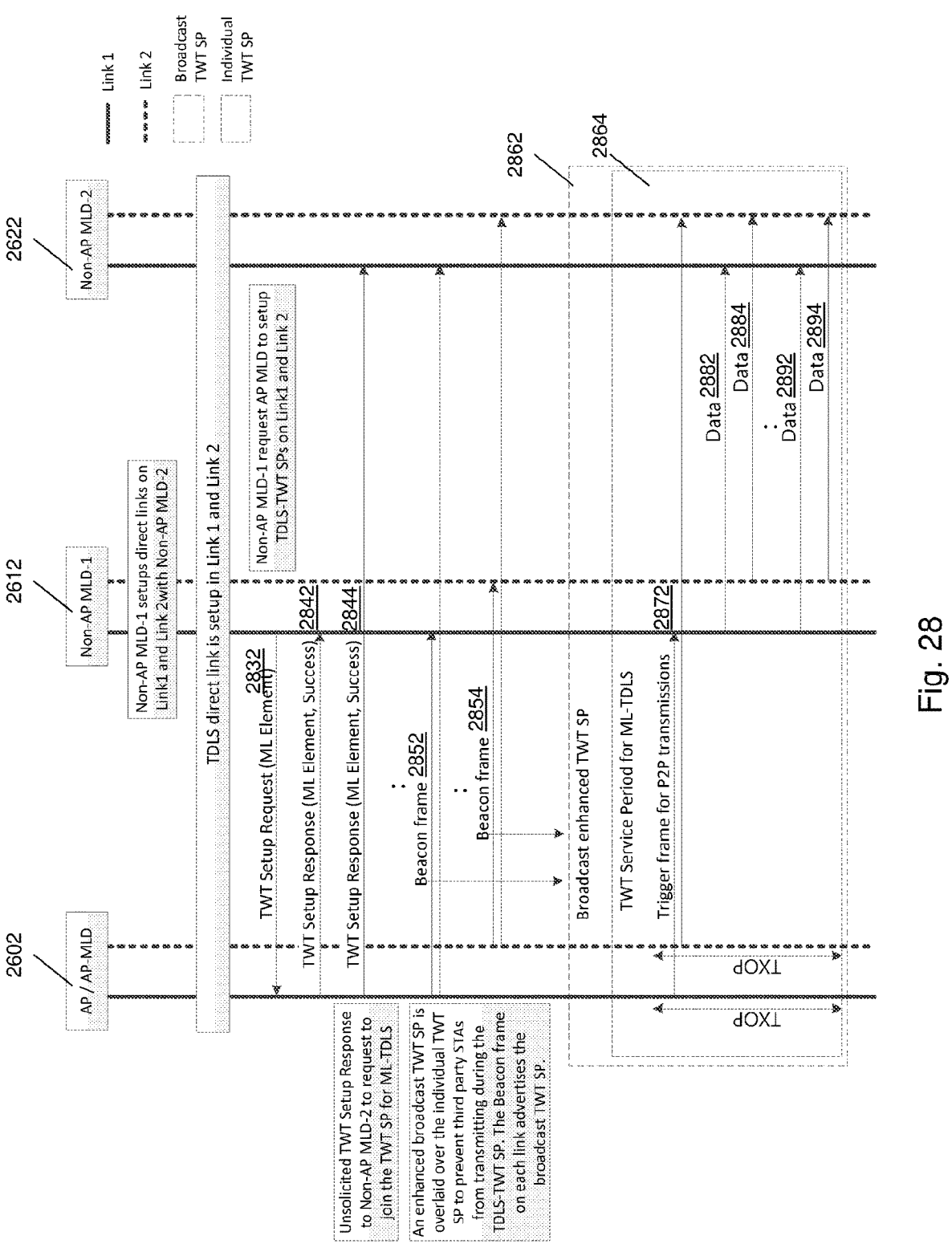
FIG. 28 depicts a flow chart illustrating setup of Target Wake Time periods for multi-link peer-to-peer communications between two non-AP MLDs associated with an AP/AP MLD according to an embodiment of the present disclosure.

According to the present disclosure, a non-AP MLD may request the AP MLD to setup TDLS-Target Wake Time (TWT) service periods (SPs) on one or more links for direct link communication on the links. FIG. 28 depicts a flow chart 2800 illustrating multi-link peer-to-peer communications between two non-AP MLDs 2812, 2822 associated with an AP/AP MLD 2802 according to an embodiment of the present disclosure. It is assumed that non-AP MLD1 2812 has setup direct links with non-AP MLD2 2822 on Link 1 and Link 2. Non-AP MLD1 2612 may request AP/AP MLD 2802 to setup TDLS-TWT SPs on Link 1 and Link 2 by transmitting a TWT Setup Request 2832 on Link 1, the TWT Setup Request 2832 comprising an ML element. The ML element indicate the additional link (e.g. Link 2) supported by the MLD.

AP/AP MLD 2802, which receives the TWT Setup Request 2832, may in response transmit a TWT Setup Response 2842 back to non-AP MLD1 2812 indicating the TWT Setup Request is successful. An unsolicited TWT Setup Response 2844 is also transmitted to another STA or MLD, e.g. non-AP MLD2 2822, to request to join the TWT SP on Link 1 and Link 2 for ML-TDLS. The TWT SP may be two separate TWT SPs on Link 1 and Link 2 having the same parameters (e.g. Start time, duration etc.).

Optionally, a restricted broadcast TWT SP is used to protect the TWT SPs for ML-TDLS and is overlaid (by AP/AP MLD) over each individual TWT SP to prevent third party STAs from transmitting during the TDLS-TWT SPs. A restricted broadcast TWT SP refers to a broadcast TWT SP in which only the STA that are members of the TWT SP are allowed to access the channel during the TWT SP while all other STAs are not allowed to access the channel during this time. This is achieved by transmitting beacon frames 2852, 2854 on each link advertising the restricted broadcast TWT SP. STAs other than the TDLS STA pair will avoid accessing the channel during the restricted broadcast TWT SP.

If such TWT SP is requested by a non-AP MLD, in this case non-AP MLD1 2812, at the start of a TWT SP for ML-TDLS 2864 within a broadcast restricted TWT SP 2862, AP/AP MLD 2702 may transmit trigger frames 2872 for peer-to-peer (P2P) transmissions to each of the direct links, i.e. Link 1 and Link 2. The Trigger frame for P2P transmission may be based on the MU-RTS Trigger frame defined in 11ax, or it may also be a new variant of the MU-RTS Trigger frame defined by 11be. Subsequently, non-AP MLD1 2812 now is able to transmit data frames 2882, 2884, 2892, 2894 to non-AP MLD2 2822 on both direct links, i.e. Link 1 and Link 2, within the TWT SP 2874.

Figure 29:
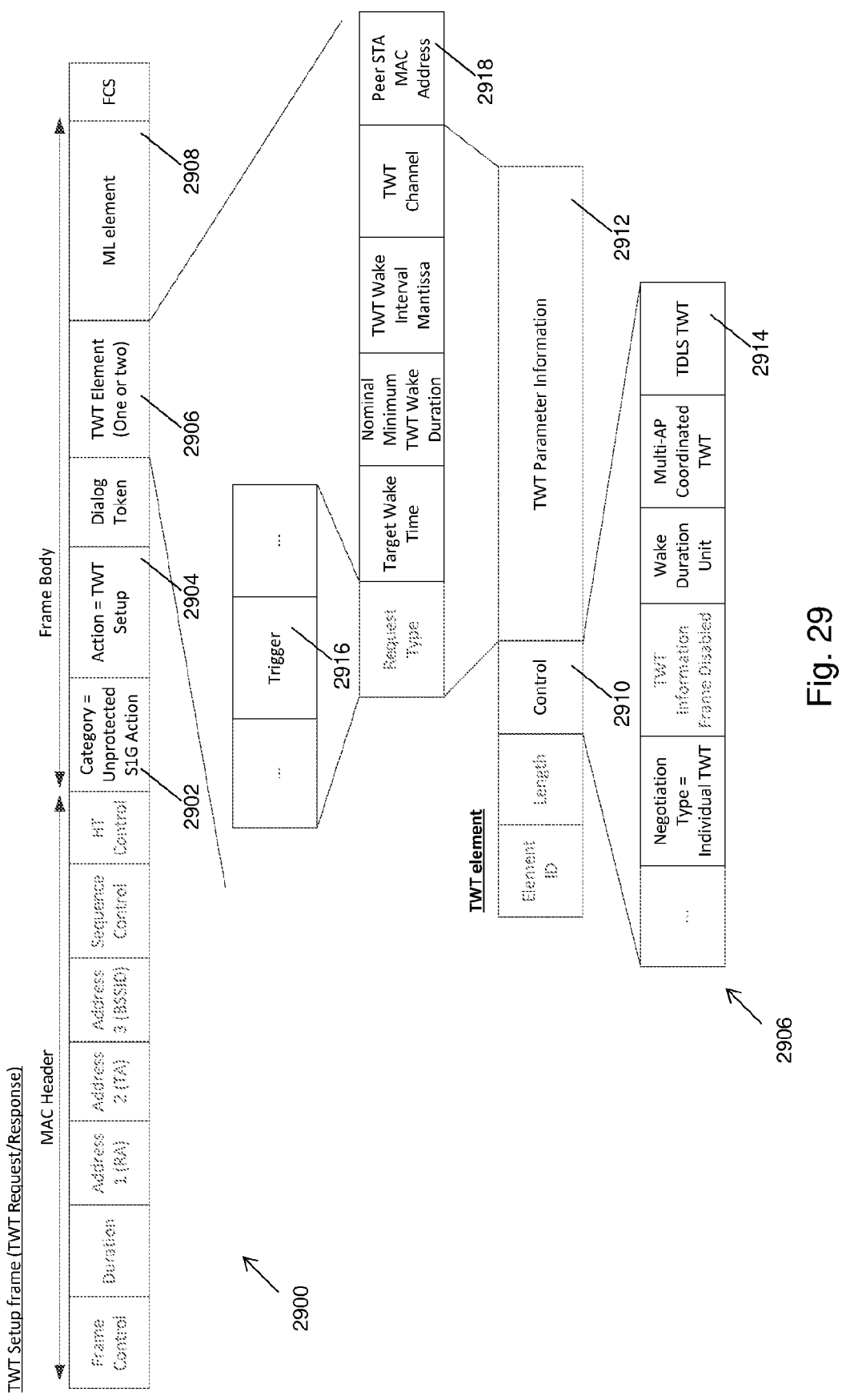
FIG. 29 shows an example format of a Target Wake Time (TWT) Setup frame and a TWT Element of the TWT Setup frame.

FIG. 29 shows an example format of a Target Wake Time (TWT) Setup frame 2900 and a TWT Element 2906 of the TWT Setup frame 2900. The TWT Setup frame 2900 may be used a TWT Request or TWT Response, comprises a Frame Control field, a Duration field, an Address 1 field, an Address 2 field, an Address 3 field, a Sequence Control field, a HT field, a Category field 2902, an Action field 2904, a TWT Element 2906, an ML Element 2908 and a FCS. The Frame Control field, the Duration field, the Address 1 field, the Address 2 field, the Address 3 field, the Sequence Control and the HT Control field may be grouped as MAC header; and the Category field 2902, the Action field 2904, the TWT Element 2906, the ML Element may be grouped as Frame Body. The Category field is 2902 is set to correspond to an unprotected SIG Action. The Action field 2904 is set to correspond to a TWT Setup. The ML element 2908 may carry TWT Elements for TWT SP on other links.

The TWT Element 2906 comprises an Element ID field, a Length field, a Control field 2910 and a TWT Parameter Information field 2912. The Control field 2910 comprises a Negotiation Type subfield, a TWT Information Frame Disabled subfield, a Wake Duration Unit subfield, a Multi-AP Coordinated TWT subfield and a TDLS TWT 2914 subfield. The TDLS TWT subfield 2914 is used to indicate TWT SP for TDLS.

The TWT Parameter Information field 2912 comprises a Request Type subfield comprising a Trigger field 2916, a Target Wake Time subfield, a Nominal Minimum TWT Wake Duration subfield, a TWT Wake Interval Mantissa subfield, a TWT Channel subfield and a Peer STA MAC Address subfield 2918. The Trigger field 2916 of the Request Type subfield include a request by the non-AP MLD to AP or AP MLD to transmit trigger frame at the start of a TWT SP on the direct links to provide transmission opportunities for direct link communication. The Peer STA MAC Address field 2918 comprises MAC Address of the TDLS Peer STA.

Advantageously, the present disclosure illustrates that the benefits of TWT protocol is extended to direct link communication. The MAC Address of the TDLS Peer STA included in the Peer STA MAC Address field in a TWT Setup Request frame may be used by the AP to transmit an unsolicited TWT Setup Response frame to the peer STA to invite it to also join the same TWT SP. Alternatively, the peer STA can also request the AP for TWT SP.

Figures 30A, 30B:
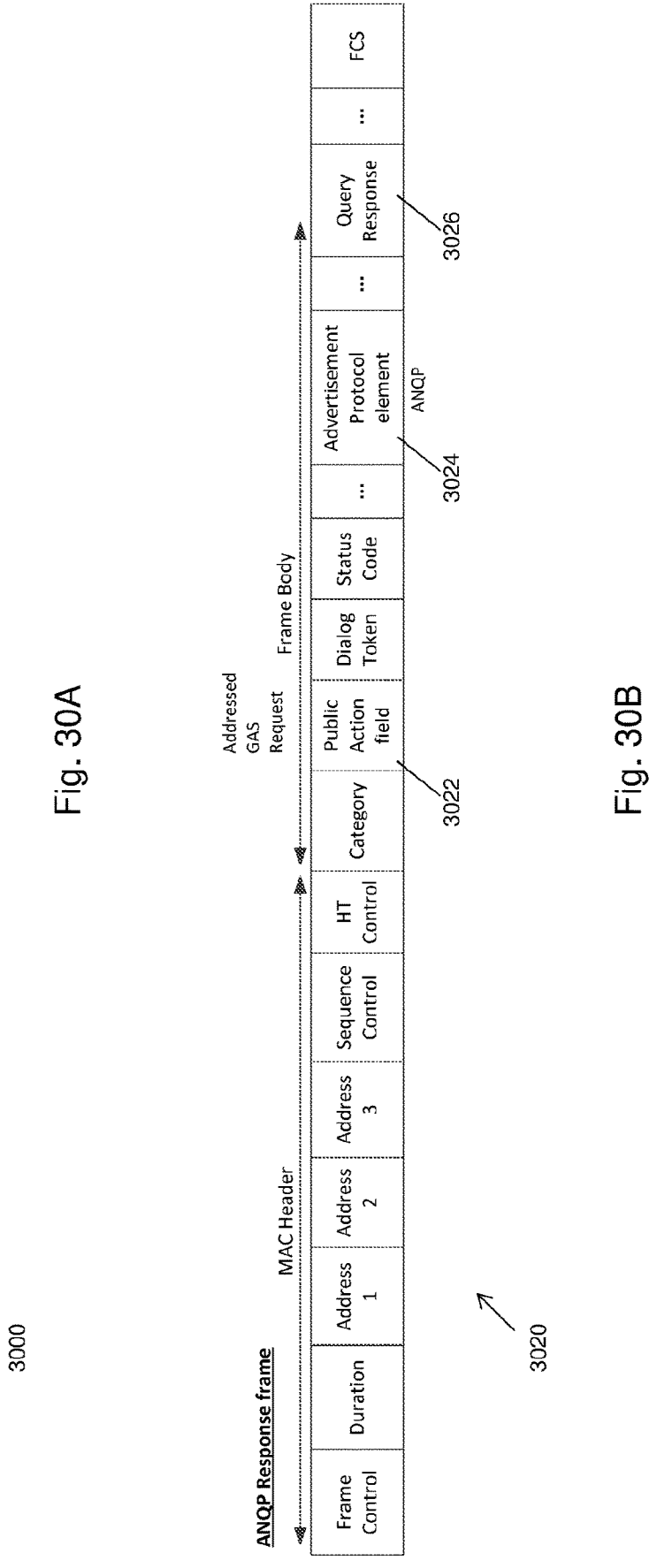
FIG. 30A shows an example format of an ANQP Request frame.
FIG. 30B shows an example format of an ANQP Response frame.

In various embodiments, as mentioned earlier in FIGS. 2A and 2B, ML-TDLS Discovery may also be performed by exchanging Access Network Query Protocol (ANQP) Request/Response frames (type of Group Address Generic Advertisement Service (GAS) Request/Response frames) over the direct path. FIG. 30A shows an example format of an ANQP Request frame 3000. The ANQP Request frame 3000 comprises a Frame Control field, a Duration field, an Address 1 field, an Address 2 field, an Address 3 field, a Sequence Control field, a HT field, a Category field, a Public Action field 3002, a Dialog Token field, an Advertisement Protocol Element 3004, a Query Request field 3006, and a FCS. The Frame Control field, the Duration field, the Address 1 field, the Address 2 field, the Address 3 field, the Sequence Control and the HT Control field may be grouped as MAC header; and the Category field, the Public Action field 3002, the Dialog Token field, the Advertisement Protocol Element 3004 and the Query Request field 3006 may be grouped as Frame Body. The Public Action field 3002 is set to correspond to a GAS Request and the Advertisement Protocol Element 3004 is set to correspond to an ANQP. The Query Request field 3006 comprises TDLS Capability ANQP Element which will be elaborated in FIG. 30C.

FIG. 30B shows an example format of an ANQP Response frame 3020. The ANQP Response frame 3020 comprises a Frame Control field, a Duration field, an Address 1 field, an Address 2 field, an Address 3 field, a Sequence Control field, a HT field, a Category field, a Public Action field 3022, a Dialog Token field, a Status Code field, an Advertisement Protocol Element 3024, a Query Response field 3026, and a FCS. The Frame Control field, the Duration field, the Address 1 field, the Address 2 field, the Address 3 field, the Sequence Control and the HT Control field may be grouped as MAC header; and the Category field, the Public Action field 3022, the Dialog Token field, the Status Code field, the Advertisement Protocol Element 3024 and the Query Response field 3026 may be grouped as Frame Body. Similarly, the Public Action field 3022 is set to correspond to a GAS Request and the Advertisement Protocol Element 3024 is set to correspond to an ANQP. The Query Response field 3026 comprises a TDLS Capability ANQP Element which will be elaborated in FIG. 30C.

Figure 30C:
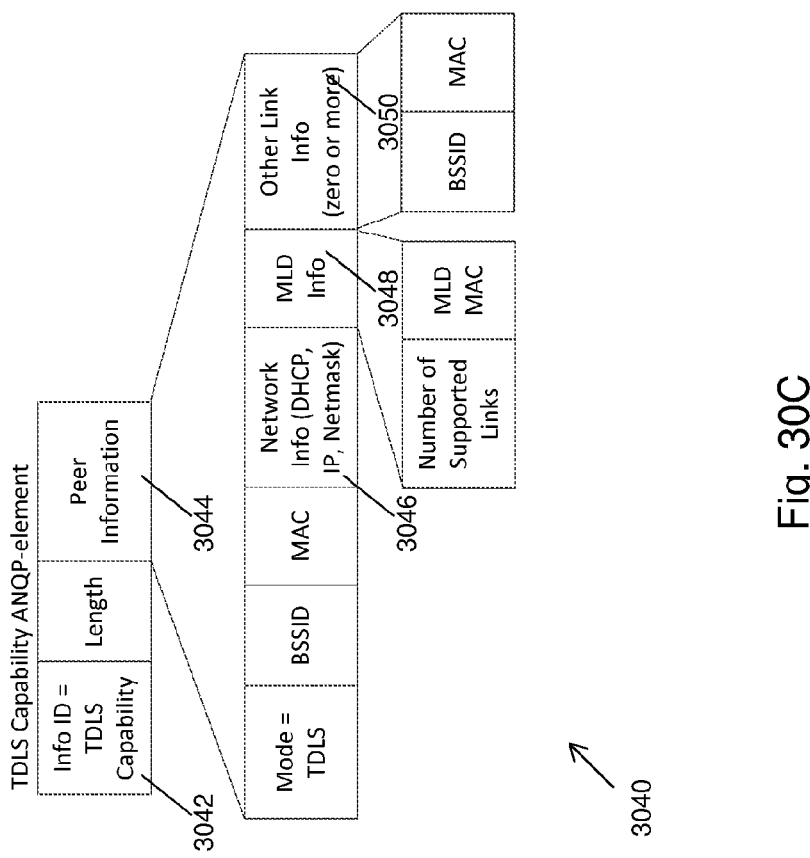
FIG. 30C shows an example format of a TDLS Capability ANQP Element that is used to carry Multi-link TDLS capabilities.

FIG. 30C shows an example format of a TDLS Capability ANQP Element 3040. The TDLS Capability ANQP Element 3040 is carried in the Query Request field 3006 and Query Response field 3026 and carries information of the MLD as well as the supported direct links. The TDLS Capability ANQP Element 3040 comprises Info ID field 3042, a Length field, a Peer Information field 3044. The Info ID field 3042 is set to correspond to TDLS Capability. The Peer Information field 3044 comprises a Mode field, a BSSID field and a MAC field, representing the BSSID and the MAC Address of the MLD operating on the link in which the ANQP frame is transmitted, a Network Info field 3046, an MLD Info field 3048 carrying information about the MLD, and an Other Link Info field 3050 carrying information of the other links of the MLD such as BSSID and MAC Address of the STA operating on the link.

The Network Info field 3046 indicates whether the network is DHCP, IP or Netmask. The MLD Info field 3048 carrying a Number of Supported Links field and MLD MAC address of the transmitting MLD. The TDLS Capability ANQP Element 3040 may comprise one or more Other Link Info fields 3050 carrying information about links other than the link in which the ANQP Response frame is transmitted. In an embodiment, the TDLS Capability ANQP Element 3040 does not comprises any of the Other Link Info fields 3050 in the ANQP Request frame. Advantageously, the present disclosure also enables ML-TDLS discovery using ANQP, and the Other Link Info field may carry information about the other links in the ANQP Response frame.

According to the present disclosure, when an ML-TDLS Discovery is initiated by a non-AP MLD (TDLS Initiator) by transmitting a TDLS Discovery Request frame, instead of carrying a TDLS ML element, the TDLS Discovery Request frame may carry an indication, for example a Link Identifier element, to identify that the transmitting STA is affiliated with a non-AP MLD. A non-AP MLD that receives the TDLS Discovery Request frame with the Link Identifier element can recognize that the TDLS Initiator is an MLD and will respond accordingly.

FIG. 31 shows an example format of a Link Identifier Element 3100 included in TDLS Discovery Request frame as an ML indication. The Link Identifier element 3100 comprises an Element ID field, a Length field, a BSSID field, a TDLS Initiator STA Address field, a TDLS Responder STA Address field, an MLD Info field comprising a Number of Supported Links field and an MLD MAC field. Advantageously, this reduces the signaling overhead for ML-TDLS discovery using TDLS Discovery Request frame.

Figure 32:
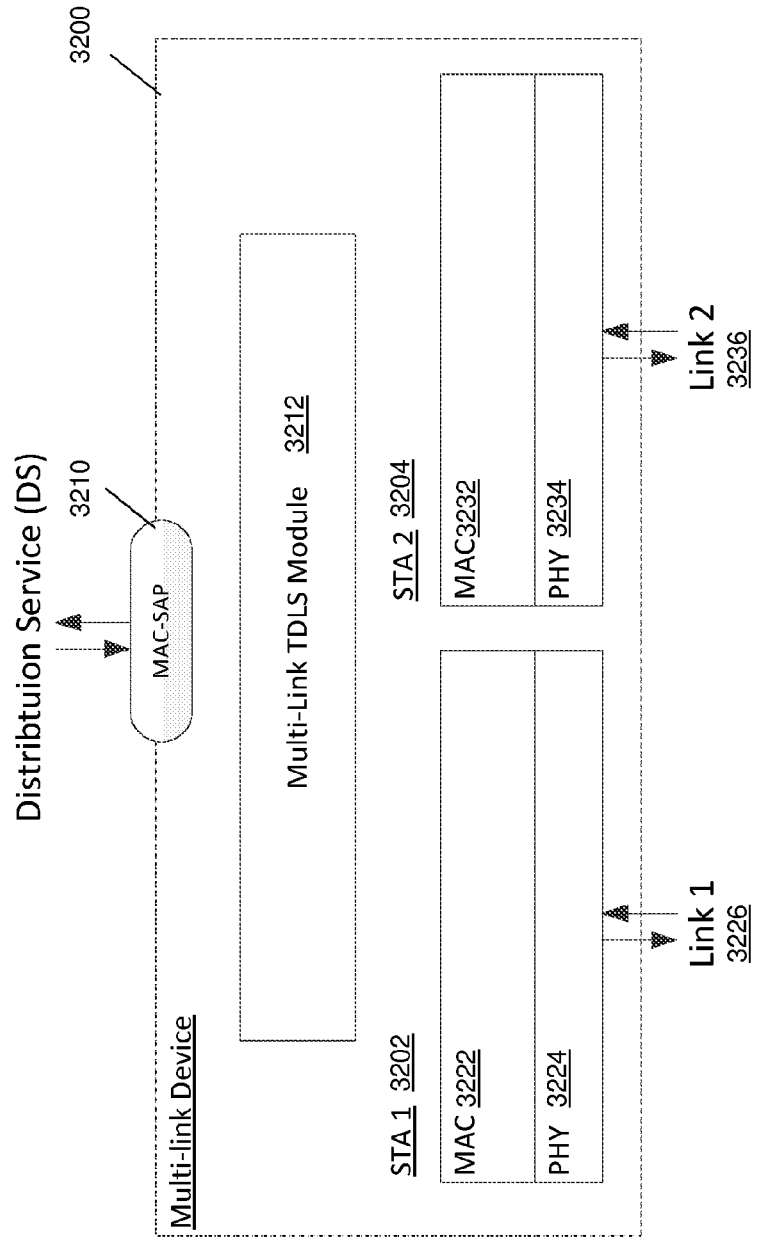
FIG. 32 shows an example configuration of a communication device and two communication apparatuses affiliated with the communication device. The communication device is implemented as an non-AP MLD and each of the affiliated communication apparatuses may be implemented as an STA configured for multi-link peer-to-peer communication in accordance with the present disclosure.

FIG. 32 shows an example configuration of a communication device 3200 and two communication apparatuses 3202, 3204 affiliated with the communication device 3200. The communication device 3200 is implemented as a non-AP MLD and each of the affiliated communication apparatuses 3202, 3204 may be implemented as a STA configured for multi-link peer-to-peer communication and multi-link TDLS discovery/setup according to various embodiments in the present disclosure. The communication device 3200 further comprises a multi-link TDLS Module 3212 config-ured for perform multi-link TDLS discovery/setup accord-ing to above-mentioned embodiments. The communication device 3200 further comprises a MAC SAP 3210 used for communicating with an Internet layer and/or Distribution Service (DS). Each of the communication apparatuses 3202, 3204 affiliated with the communication device offering a link 3226, 3236 to associate with and capable of transmit-ting/receiving signals to/from other external communication apparatuses/devices and/or the DS. Each affiliated commu-nication apparatus 3202, 3204 comprises a MAC layer 3222, 3232 and a PHY (physical) layer 3224, 3234, the PHY layer connecting with a radio transmitter, a radio receiver and an antenna used for transmitting/receiving signal to/from other communication apparatuses/devices through a correspond-ing link 3226, 3236. In an embodiment, the MAC layer 3222, 3232 comprises a storage module storing its STA MAC address and an optional STA MAC SAP for direct communication with the Internet layer and/or DS for traffic to/from legacy STAs.

Figure 33:
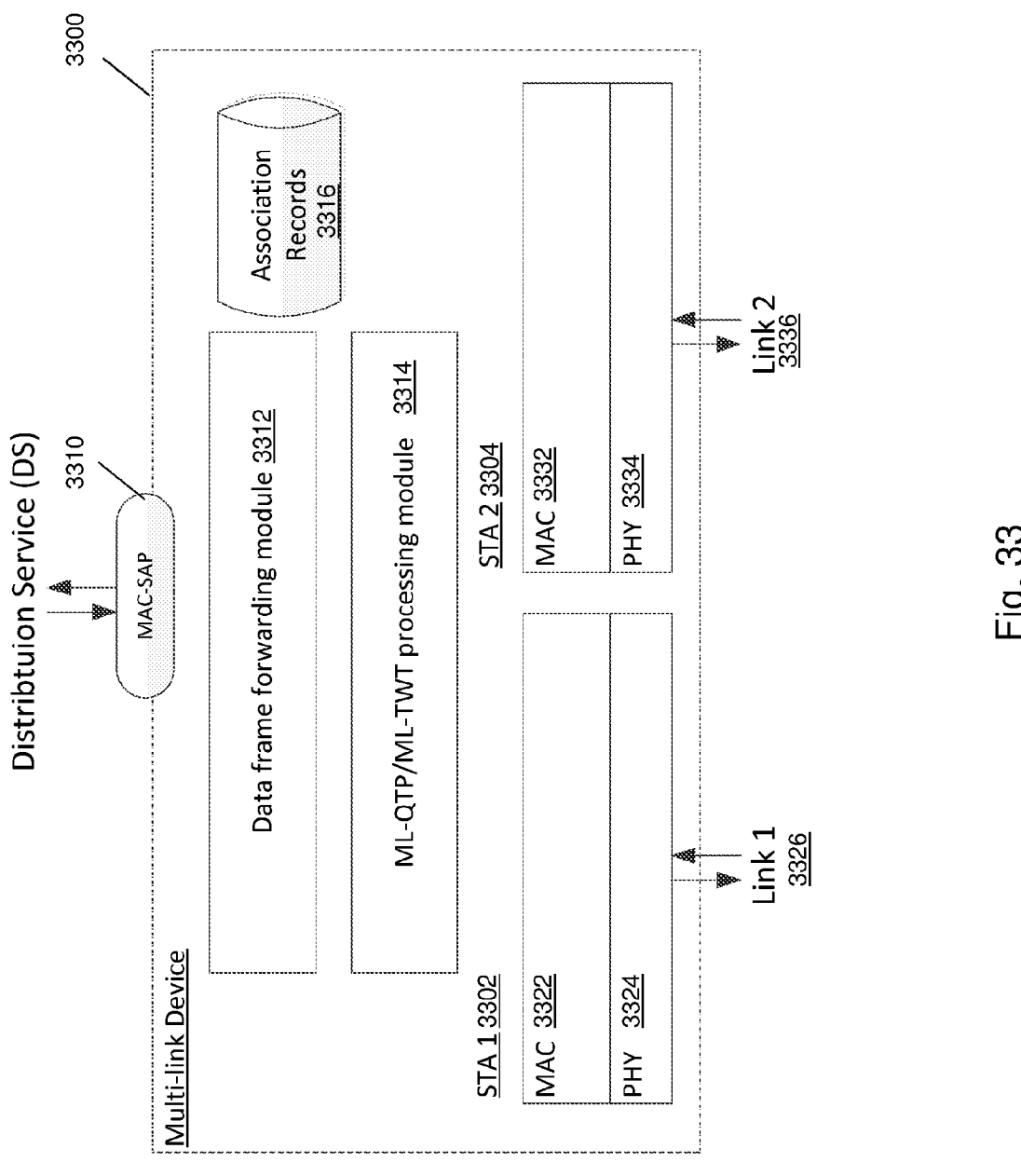
FIG. 33 shows an example configuration of a communication device and two communication apparatuses affiliated with the communication device. The communication device is implemented as an AP MLD and each of the affiliated communication apparatuses may be implemented as an AP configured for multi-link peer-to-peer communication in according with the present disclosure.

FIG. 33 shows an example configuration of a communi-cation device 3300 and two communication apparatuses 3302, 3304 affiliated with the communication device 3300. The communication device 3300 is implemented as an AP MLD and each of the affiliated communication apparatuses 3302, 3304 may be implemented as an AP configured for multi-link peer-to-peer communication and multi-link TDLS discovery/setup according to various embodiments in the present disclosure. The communication device 3300 comprises an association record module 3316 storing the MLD MAC addresses of each associated non-AP MLD and the MAC Addresses of the STAs affiliated with each asso-ciated MLD, the Association ID (AID) assigned to the non-AP MLD etc. The communication device 3300 further comprises a Data frame forward module 3312 for receiving a data frame from an associated STA, determining the destination address of the data frame relates to another associated STA or MLD, and forwarding the data frame to another associated STA or MLD accordingly and setting the SA field of the forwarded frame based on whether the receiving device is an MLD or a non-MLD STA. The communication device 3300 also comprises ML-QTP/ML-TWT processing module 3314 for setting up QTP functions (e.g. receiving QTP Request from and transmitting QTP Response and QTP Setup frame to an associated STA) and TWT functions (e.g. receiving TWT Setup Request from and transmitting TWT Setup Response, Beacon frame and Trig-ger frame to an associated STA) on direct link(s) between associated STAs and/or MLDs.

The communication device 3300 further comprises a MAC SAP 3310 used for communicating with an Internet layer and/or DS. Each of the communication apparatuses 3302, 3304 affiliated with the communication device offer-ing a link 3326, 3336 to associated with and capable of transmitting/receiving signals to/from other external com-munication apparatuses/devices and/or the DS. Each affili-ated communication apparatus 3302, 3304 comprises a MAC layer 3322, 3332 and a PHY (physical) layer 3324, 3334, the PHY layer connecting with a radio transmitter, a radio receiver and an antenna used for transmitting/receiving signal to/from other communication apparatuses/devices through a corresponding link 3326, 3336. In an embodiment, the MAC layer comprises a storage module storing its AP MAC address and an optional AP MAC SAP for direct communication with the Internet layer for traffic to/from legacy STAs.

The present disclosure can be realized by software, hard-ware, or software in cooperation with hardware. Each func-tional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be pro-grammed after the manufacture of the LSI or a reconfigur-able processor in which the connections and the settings of circuit cells disposed inside the LSI can be reconfigured may be used. The present disclosure can be realized as digital processing or analogue processing. If future integrated cir-cuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of commu-nication, which is referred as a communication device.

Some non-limiting examples of such communication device include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., auto-motive, airplane, ship), and various combinations thereof.

The communication device is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication device may comprise an apparatus such as a controller or a sensor which is coupled to a communication apparatus performing a function of commu-nication described in the present disclosure. For example, the communication device may comprise a controller or a sensor that generates control signals or data signals which are used by a communication apparatus performing a com-munication function of the communication device.

The communication device also may include an infra-structure facility, such as a base station, an access point, and any other apparatus, device or system that communicates with or controls apparatuses such as those in the above non-limiting examples.

A non-limiting example of a station may be one included in a first plurality of stations affiliated with a multi-link station logical entity (i.e. such as an MLD), wherein as a part of the first plurality of stations affiliated with the multi-link station logical entity, stations of the first plurality of stations share a common medium access control (MAC) data service interface to an upper layer, wherein the common MAC data service interface is associated with a common MAC address or a Traffic Identifier (TID).

Thus, it can be seen that the present embodiments provide communication devices and methods for operation over multiple links in order to fully realize the throughput gains of multi-link communication, in particular for multi-link secured retransmissions.

The following examples are described in the present disclosure:

1. A communication apparatus of a plurality of communication apparatuses affiliated with a first multi-link device (MLD), each of the plurality of communication apparatuses operating in a corresponding link of the first MLD, the communication apparatus comprising:

circuitry, which in operation, generates a request frame, the request frame being one of a discovery request frame to discover a peer-to-peer communication capability of another communication apparatus, or a setup request frame to request setup of one or more direct links, the request frame carrying a multi-link (ML) indication identifying that the communication apparatus is affiliated with the first MLD; and a transmitter, which in operation, transmits the request frame in a link.

2. The communication apparatus according to example 1, wherein the request frame is one of a Tunnelled Direct Link Setup (TDLS) Discovery Request frame, a TDLS Setup Request frame and an Access Network Query Protocol (ANQP) Request frame.

3. The communication apparatus according to example 1, wherein the ML indication is an ML element, the ML element carrying information about the first MLD and information of at least one other link supported by the first MLD.

4. The communication apparatus according to example 2, wherein the ML indication is included correspondingly in one of a Link Identifier element in the TDLS Discovery Request frame and a TDLS capability ANQP-element in the ANQP request frame.

5. The communication apparatus according to example 1, further comprising: a receiver, which in operation, receives, from the other communication apparatus, a TDLS Discovery Response frame carrying an ML element, the ML element carrying information about a second MLD with which the other communication apparatus is affiliated and information of at least one other link supported by the second MLD.

6. The communication apparatus according to example 1, further comprising: a receiver, which in operation, receives, from the other communication apparatus, an ANQP response frame carrying an ML field, the ML field carrying information about a second MLD with which the other communication apparatus is affiliated and information of at least one other link supported by the second MLD.

7. The communication apparatus of example 1, wherein the circuitry is further configured to generate at least one of a TDLS Setup Request frame and a TDLS Setup Confirm frame; the at least one of the TDLS Setup Request frame and the TDLS Setup Confirm frame carrying an ML element, the ML element carrying information about the first MLD and information of at least one other link supported by the first MLD; and the transmitter further transmits the at least one of the TDLS Setup Request frame and the TDLS Setup Confirm frame to a second MLD with which the other communication apparatus is affiliated.

8. The communication apparatus of example 1, further comprising:

a receiver, which in operation, receives, from the other communication apparatus, a TDLS Setup Response frame carrying an ML element, the ML element carrying information about a second MLD with which the other communication apparatus is affiliated and information of at least one other link supported by the second MLD.

9. The communication apparatus of example 7 or 8, wherein, in response to an exchange of the TDLS Setup Request frame, the TDLS Setup Response frame and the TDLS Setup Confirm frame, the circuitry is further configured to:

set up one or more direct links between the first MLD and the second MLD.

10. The communication apparatus of example 9, wherein the at least one of the TDLS Setup Request frame, the TDLS Setup Response frame and the TDLS Setup Confirm frame comprises TDLS PeerKey (TPK) handshake messages, and the circuitry is further configured to:

generate a TPK to encrypt one or more frames transmitted on the one or more direct link and/or decrypt one or more frames received on the one or more direct link.

11. The communication apparatus of example 10, wherein each of the at least one of the TDLS Setup Request frame, the TDLS Setup Response frame and the TDLS Setup Confirm frame comprises a corresponding ML element, and the circuitry is further configured to:

calculate a message integrity code of the each of the TDLS Setup Response frame and the TDLS Setup Confirm frame based on the corresponding ML element.

12. The communication apparatus of example 9, wherein common multi-link features supported by the first MLD and the second MLD are available in the one or more direct links; the common multi-link features including multi-link block ack, cross link retransmission of frames, MLD MAC address based Additional Authentication Data and Nonce construction during an encapsulation or a decapsulation of frames under a Counter Mode with Cipher Block Chaining Message Authentication Code Protocol (CCMP) or a Galois/Counter Mode Protocol (GCMP).

13. The communication apparatus of example 9, wherein the circuitry is further configured to generate a TDLS Channel Switch Request frame to switch from one to another one of the one or more direct links, the TDLS Channel Switch Request frame carrying an ML element, the ML element carrying information of the other one link of the one or more direct links; and the transmitter further transmits the TDLS Channel Switch Request frame to the second MLD.

14. The communication apparatus of example 9, wherein the circuitry is further configured to generate a Quiet Time Period (QTP) Request frame to setup a quiet time period on at least one link of the one or more direct links, the QTP Request frame carrying an ML element, the ML element carrying information of the at least one link of the one or more direct links; and the transmitter further transmits the QTP Request frame to an access point multi-link device (AP-MLD) associated with the first MLD.

15. The communication apparatus of example 1, further comprising:

a receiver, which in operation, receives, from the other communication apparatus, a request frame, the request frame being one of a discovery request frame to discover a peer-to-peer communication capability of the communication apparatus, or a setup request frame to request setup of one or more direct links, wherein the circuitry is further configured to:

determine if the received request frame carries an ML indication identifying that the other communication apparatus is affiliated with a second MLD;

in response to determining the received request frame carries the ML indication identifying that the other communication apparatus is affiliated with the second MLD, set a Transmitter Address (TA) field of frames transmitted over the one of the one or more direct links to an address carried in a TDLS Responder Station (STA) Address field of a Link Identifier element of the received request frame, and in response to determining the received request frame does not carry the ML indication identifying that the other communication apparatus is affiliated with the second MLD, set the TA field of the frames transmitted over the one of the one or more direct links to a media access control (MAC) address of an affiliated communication apparatus of the second MLD transmitting the frames over the one of the one or more direct links.

16. The communication apparatus of example 9, wherein the circuitry is further configured to generate a Target Wake Time (TWT) Setup Request frame to setup TWT service periods (SPs) on at least one link of the one or more direct links, the TWT Setup Request frame carrying a TWT element carrying information of the TWT SP for the at least one link of the one or more direct links; and the transmitter further transmits the TWT Setup Request frame to an AP-MLD associated with the first MLD.

17. The communication apparatus of example 16, wherein the TWT Setup Request frame carries an ML element, the ML element carrying information of the at least one link of the one or more links.

18. The communication apparatus of example 2, wherein the circuitry is further configured to:

set a transmitter address field of the TDLS Discovery Request frame to a MAC address of the communication apparatus when the other communication apparatus is not affiliated with a second MLD.

19. An access point (AP) of a plurality of APs affiliated with an AP MLD, each of the plurality of APs operating in a corresponding link of the AP MLD, the AP comprising:

a receiver, which in operation, receives in a link, from an associated communication apparatus affiliated with an MLD, a Data frame with a Destination Address (DA) field set to another associated communication apparatus that is not affiliated with an MLD;

circuitry, which in operation, sets a source address (SA) field of the Data frame as a MAC address of the associated communication apparatus; and a transmitter, which in operation, transmits the Data frame to the other associated communication apparatus.

20. A communication method comprising:

generating a request frame, the request frame being one of a discovery request frame to discover a peer-to-peer communication capability of a communication apparatus, or a setup request frame to request setup of one or more direct links, the request frame carrying an ML indication identifying that another communication apparatus transmitting the request frame is affiliated with an MLD; and transmitting the request frame in a link.

While exemplary embodiments have been presented in the foregoing detailed description of the present embodiments, it should be appreciated that a vast number of variations exist. It should further be appreciated that the exemplary embodiments are examples, and are not intended to limit the scope, applicability, operation, or configuration of this disclosure in any way. Rather, the foregoing detailed description will provide those skilled in the art with a convenient road map for implementing exemplary embodiments, it being understood that various changes may be made in the function and arrangement of steps and method of operation described in the exemplary embodiments and modules and structures of devices described in the exemplary embodiments without departing from the scope of the subject matter as set forth in the appended claims.

The invention claimed is:

1. A first non-Access Point (non-AP) multi-link device (MLD) including a plurality of affiliated stations (STAs), the non-AP MLD comprising:

a transmitter, which, in operation, transmits a Tunnelled Direct Link Setup (TDLS) Setup Request frame via an Access Point (AP) to a second non-AP MLD, the TDLS Setup Request frame including a first TDLS Multi-Link element that contains a first MLD MAC address information, wherein the first TDLS Multi-Link element includes a Type subfield that is set to indicate TDLS and a Common Information field that carries the first MLD MAC address information; and a receiver, which, in operation, receives a TDLS Setup Response frame via the AP from the second non-AP MLD.

2. The first non-AP MLD according to claim 1, wherein the TDLS Setup Request frame carries a first TDLS Peer Key (TPK) handshake message;

the TDLS Setup Response frame carries a second TPK handshake message; and the transmitter, in operation, transmits via the AP a TDLS Setup Confirmation frame that carries a third TPK handshake message.

3. The first non-AP MLD according to claim 2, wherein the TDLS Setup Request frame includes a Robust Security Network element (RSNE), a Timeout Interval element and a Fast BSS Transition element (FTE) added to the first TDLS Multi-Link element.

4. The first non-AP MLD according to claim 1, wherein prior to transmission of the TDLS Setup Request frame, the transmitter, in operation, transmits a TDLS Discovery Request frame via the AP to the second non-AP MLD; and the receiver, in operation, receives a TDLS Discovery Response frame on a direct link from the second non-AP MLD.

5. The first non-AP MLD according to claim 4, wherein the TDLS Discovery Request frame includes a Link Identifier element that contains a BSSID subfield.

6. The first non-AP MLD according to claim 4, wherein the TDLS Discovery Request frame includes a second Multi-Link element that contains a second MLD MAC address information.

7. The first non-AP MLD according to claim 4, wherein the transmitter, in operation, transmits a request frame indicating a quiet time period for protecting a direct link communication on the direct link.

8. A communication method for a first non-Access Point (non-AP) multi-link device (MLD) including a plurality of affiliated stations (STAs), the communication method comprising:

transmitting a Tunnelled Direct Link Setup (TDLS) Setup Request frame via an Access Point (AP) to a second non-AP MLD, the TDLS Setup Request frame including a first TDLS Multi-Link element that contains a first MLD MAC address information, wherein the first TDLS Multi-Link element includes a Type subfield that is set to indicate TDLS and a Common Information field that carries the first MLD MAC address information; and receiving a TDLS Setup Response frame via the AP from the second non-AP MLD.

9. The communication method according to claim 8, wherein the TDLS Setup Request frame carries a first TDLS Peer Key (TPK) handshake message;

the TDLS Setup Response frame carries a second TPK handshake message; and the communication method comprising:

transmitting via the AP a TDLS Setup Confirmation frame that carries a third TPK handshake message.

10. The communication method according to claim 9, wherein the TDLS Setup Request frame includes a Robust Security Network element (RSNE), a Timeout Interval element and a Fast BSS Transition element (FTE) added to the first TDLS Multi-Link element.

11. The communication method according to claim 8, wherein prior to transmission of the TDLS Setup Request frame, the communication method comprising:

transmitting a TDLS Discovery Request frame via the AP to the second non-AP MLD; and receiving a TDLS Discovery Response frame on a direct link from the second non-AP MLD.

12. The communication method according to claim 11, wherein the TDLS Discovery Request frame includes a Link Identifier element that contains a BSSID subfield.

13. The communication method according to claim 11, wherein the TDLS Discovery Request frame includes a second Multi-Link element that contains a second MLD MAC address information.

14. The communication method according to claim 11, comprising transmitting a request frame indicating a quiet time period for protecting a direct link communication on the direct link.

* * * * *